(12) United States Patent
Rieger

(10) Patent No.: US 10,936,344 B2
(45) Date of Patent: Mar. 2, 2021

(54) SYSTEM AND METHOD FOR PRESENTING AN OBJECT

(71) Applicant: Derek Rieger, Denver, CO (US)

(72) Inventor: Derek Rieger, Denver, CO (US)

(73) Assignee: Bionic Arts L.L.C., Golden, CO (US)

( * ) Notice: Subject to any disclaimer, the term of this patent is extended or adjusted under 35 U.S.C. 154(b) by 0 days.

(21) Appl. No.: 16/526,602

(22) Filed: Jul. 30, 2019

(65) Prior Publication Data

US 2019/0354385 A1 Nov. 21, 2019

Related U.S. Application Data

(63) Continuation of application No. 15/242,447, filed on Aug. 19, 2016, now Pat. No. 10,402,209.

(60) Provisional application No. 62/208,409, filed on Aug. 21, 2015, provisional application No. 62/354,759, filed on Jun. 26, 2016.

(51) Int. Cl.
| | |
|---|---|
| *G06F 3/048* | (2013.01) |
| *G06F 9/451* | (2018.01) |
| *A63F 13/216* | (2014.01) |
| *A63F 13/245* | (2014.01) |
| *A63F 13/837* | (2014.01) |
| *A63F 13/92* | (2014.01) |
| *G06F 3/01* | (2006.01) |
| *G06F 3/0346* | (2013.01) |

(Continued)

(52) U.S. Cl.
CPC ............ *G06F 9/451* (2018.02); *A63F 13/216* (2014.09); *A63F 13/245* (2014.09); *A63F 13/837* (2014.09); *A63F 13/92* (2014.09); *G06F 3/017* (2013.01); *G06F 3/0346* (2013.01); *G06F 3/04815* (2013.01); *G06F 8/38* (2013.01); *G06F 2203/04806* (2013.01)

(58) Field of Classification Search
None
See application file for complete search history.

(56) References Cited

U.S. PATENT DOCUMENTS

2011/0199479 A1* 8/2011 Waldman ................ G06T 11/60
 348/116
2016/0232182 A1* 8/2016 Harris .................... G06T 19/006

* cited by examiner

*Primary Examiner* — William C Trapanese
(74) *Attorney, Agent, or Firm* — The Juhasz Law Firm

(57) ABSTRACT

Method, system for presenting an object on a computing device. A metaphor application on a computing device organizes a user interface based upon a metaphor. The metaphor organizes a document, file, application, or combination thereof based on geospheric direction, geolocation, or both. The metaphor may also organize a document, file, application, data, or a combination thereof based on a solid geometrical figure in three-dimensional Euclidean space. A document, file, application, or any combination thereof may be associated with geophysical direction, a geolocation, or both. The document, file, application, data, or any combination thereof may further be associated with a solid geometrical figure. A presentation object containing data on the document, file, application, data, or combination thereof, and the geospheric direction, geolocation, or both is formatted into data blocks for rendering on a display. The display may be the display screen of the computing device. The metaphor application causes the presentation object to be rendered on the display when the computing device is pointing in the geospheric direction, in the geolocation or both associated with the presentation object.

20 Claims, 40 Drawing Sheets

(51) Int. Cl.
*G06F 3/0481* (2013.01)
*G06F 8/38* (2018.01)

Memory Map associated with sphere having radius = 3 meters

| Geospheric Direction Coordinate | Point on metaphor | Application or File | Coordinate | Point on metaphor | Application or File |
|---|---|---|---|---|---|
| $X_1, Y_1, Z_1$ | 541 | Folder 1 | $X_{16}, Y_{16}, Z_{16}$ | 571 | PPT 2 |
| $X_2, Y_2, Z_2$ | 542 | Folder 2 | $X_{17}, Y_{17}, Z_{17}$ | 572 | Folder 3 |
| $X_3, Y_3, Z_3$ | 543 | Word 1 | $X_{18}, Y_{18}, Z_{18}$ | 573 | Excel 4 |
| $X_4, Y_4, Z_4$ | 544 | Excel 1 | $X_{19}, Y_{19}, Z_{19}$ | 574 | You Tube |
| $X_5, Y_5, Z_5$ | 545 | Word 2 | $X_{20}, Y_{20}, Z_{20}$ | 575 | Pandora |
| $X_6, Y_6, Z_6$ | 551 | Word 3 | $X_{21}, Y_{21}, Z_{21}$ | 581 | Word 6 |
| $X_7, Y_7, Z_7$ | 552 | Word 4 | $X_{22}, Y_{22}, Z_{22}$ | 582 | - |
| $X_8, Y_8, Z_8$ | 553 | Word 5 | $X_{23}, Y_{23}, Z_{23}$ | 583 | Facebook |
| $X_9, Y_9, Z_9$ | 554 | Pdf 1 | $X_{24}, Y_{24}, Z_{24}$ | 584 | - |
| $X_{10}, Y_{10}, Z_{10}$ | 555 | Pdf 2 | $X_{25}, Y_{25}, Z_{25}$ | 585 | Doodle Jump |
| $X_{11}, Y_{11}, Z_{11}$ | 561 | Excel 2 | $X_{26}, Y_{26}, Z_{26}$ | 591 | Word 7 |
| $X_{12}, Y_{12}, Z_{12}$ | 562 | 77 | $X_{27}, Y_{27}, Z_{27}$ | 592 | PPT 3, Folder 4, application |
| $X_{13}, Y_{13}, Z_{13}$ | 563 | Skype | $X_{28}, Y_{28}, Z_{28}$ | 593 | Word 8 |
| $X_{14}, Y_{14}, Z_{14}$ | 564 | Word 6 & Excel 3 | $X_{29}, Y_{29}, Z_{29}$ | 594 | Folder 5 |
| $X_{15}, Y_{15}, Z_{15}$ | 565 | PPT 1 | $X_{30}, Y_{30}, Z_{30}$ | 595 | Folder 6 |
| ⋮ | ⋮ | ⋮ | ⋮ | ⋮ | ⋮ |
| $X_n, Y_n, Z_n$ | | ... | $X_o, Y_o, Z_o$ | | ... |

| Platonic Solids | | | | |
|---|---|---|---|---|
| 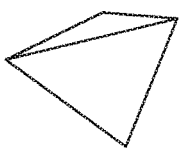 | 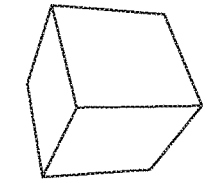 | 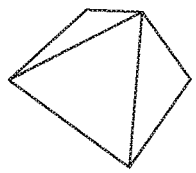 | 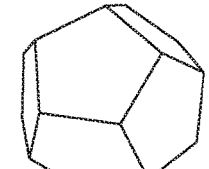 | 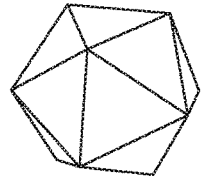 |
| Tetrahedron {3, 3} | Cube {4, 3} | Octahedron {3, 4} | Dodecahedron {5, 3} | Icosahedron {3, 5} |
| $\chi = 2$ | $\chi = 2$ | $\chi = 2$ | $\chi = 2$ | $\chi = 2$ |
| Kepler-Poinsot polyhedra | | | |
|---|---|---|---|
| 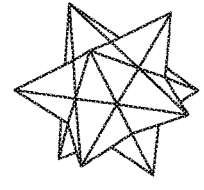 | 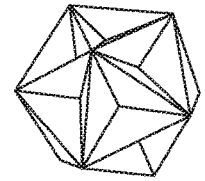 | 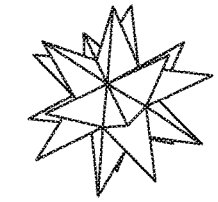 | 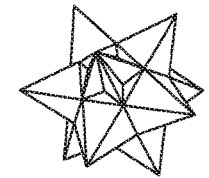 |
| Small stellated dodecahedron {5/2, 5} | Great dodecahedron {5, 5/2} | Great stellated dodecahedron {5/2, 3} | Great icosahedron {3, 5/2} |
*FIG. 10*

FIG. 12

SYSTEM AND METHOD FOR PRESENTING AN OBJECT

CROSS-REFERENCE

The present application is a continuation of U.S. non-provisional application Ser. No. 15/242,447, filed Aug. 19, 2016; non-provisional application Ser. No. 15/242,447 claims the benefit U.S. provisional application 62/208,409, filed Aug. 21, 2015 and also claims the benefit of U.S. provisional application 62/354,759, filed Jun. 26, 2016; all three of these U.S. patent documents are hereby incorporated by reference in their entirety.

BACKGROUND

A user interface is a collection of features designed into a computing device which allows a user to interact with the computing device. They include hardware such as a display screen, a keyboard, a mouse, a light pen, and so on. They also include software that allows the user to interact with the hardware or the software that resides on the computing device or is accessed by the computing device over a network such as from a cloud server.

Software user interfaces may be part of an operating system or an application. They typically serve to enable a user to interact with the operating system or an application. The user interface may also serve as a proxy application that enables a user to interact in a specified way with the operating system or other applications on or accessed by the computing device. Illustrative operating systems include Apple®, Android®, Linux®, and Windows®. Illustrative applications include Skype®, Pandora® Box, and so on. These software user interfaces are designed to allow users to interact with user interface hardware, software residing on or accessed by the computing device, and data collected by or generated by the computing device for some intended purpose such as setting the time for an electronic alarm on the computing device to sound or playing a game.

The interaction of a user with the software user interface may occur in several ways. For example, the software user interface may display a menu and the user may interact with the menu by scrolling through the menu to locate an object. Selection of the object once located may open a file, an application, or other object. If the object is an application, when executed, the application executes instructions that may display a window, a menu, or render some other display on the display screen. If a window is rendered, the user may enter data into the window. If a menu is rendered, the user may navigate the displayed menu and select an object in the menu to execute. The display rendered may also be messages or other data, such as an alert that a user won a game or a display of the number of points won, or both. An item on a menu may be selected by touch activation such as by touching active buttons or areas on the display screen of the computing device. Selection may also occur manually such as by keystroke entry. In another illustrative example, selection may be by voice activation.

In one illustrative example, a menu may allow a user to navigate through cabinets, file folders, sub file folders, and so on, located in a memory on or off the computing devices in order to locate a document. Once located, the user interface may allow a user to open the document so that it may be rendered on the display screen of the computing device. As another example, a menu may allow a user to navigate through different tasks that a gamer might be presented when running a gaming application. For example, a menu rendered by the Pac-Man® gaming application may allow a user to activate the game application. The menu may recognize user activations of a touch screen or virtual buttons on the display screen and/or keyboard or game console key entries and in response thereto move the Pac-Man across an electronic game board rendered on the display screen based on the user selections.

One of the challenges to user interface design is how to help a user quickly and proficiently navigate through the myriad of data, files, and applications that may be accessible from a computing device. These data, files, and applications may be stored on the computing device or a piece of hardware connected to the computing device or on a cloud server or elsewhere on a network or a combination thereof. Systematic, information-oriented visual or graphic designing of user interfaces is an important part of helping the user with this navigation.

There are many components of a user interface including mental models, navigation, presentation, interaction, and metaphors.

Metaphors are particularly helpful to a user and are defined as herein explained. Metaphors are fundamental concepts, terms and images by which and through which information is easily recognized, understood, and remembered. They are used in software user interface design to facilitate interpretation and to provide a vehicle for easily recognizing, understanding, and remembering where a data, file, or application may be stored and how the data, file, or application may be accessed or manipulated. Metaphors include the essential ways by which choices for command or control may be communicated and the status of data and functions may be depicted.

The metaphor allows a comparison between two objects, often seemingly unrelated subjects. For example, a metaphor may draw a comparison between a data, file, or application and an object in the real world. Metaphors typically achieve their effectiveness through comparisons based on organization or operation. Illustrative organizational associations may include nouns like structures, classes, attributes, and so on. Illustrative operational associations may include verbs like processes, algorithms, recipes, and so on.

Illustrative examples of an organizational association may include drawers, files, folders, and like, such as used in a Windows operation system. For example, a user may put a related category of documents into the same file and then put a related category of by files into the same drawer. This allows the user to easily organize large groups of files by drawers in a way that allows documents to be easily located through the association of related documents, files, and drawer. Other examples of organizational associations may include an album which a user may associate with photos; a program, channel, or network which a user may associate with content; a tree, root, or trunk which a user may associate with an organizational structure. Hence, a user may put photos of a family vacation into an album titled family vacation; organize programs by channels and channels by networks; use a tree, root or trunk to visual an organizational structure for content on the computer.

Illustrative examples of operational metaphors may include operators like move, browse, select, create, delete, and so on which a user may associate with like operations. For example, a menu including operators like move, browse, select, create, delete, and so on can be activated by a user to perform an operation that a user may associate with the operator such as move a selected document when the move operator is activated.

Hence, an organizational structure of drawers, files, folders, and like depicted by the software user interface on the display allows a user to understand where and how to easily store, access, and manipulate textual, photo, or video documents or applications arranged according to this structure. Similarly, a menu command such as move or delete allows a user to easily understand operations such as moving or deleting data, a file, or an application. These and other metaphorical contexts and associated familiar physical objects are used to communicate to the user the documents, files, application, and data that are available to the user through the computing device.

As processors and software become more powerful, they allow for development of more powerful user interfaces. At the same time, users are accessing and manipulating ever increasing amounts of documents, files, applications, and data. These user access and manipulations are putting downward pressure on, challenging, and in some cases slowing down existing user interfaces. The increasing tension on the architecture of conventional user interfaces accommodating the many activities going on in the human brain point to shortcomings in conventional interfaces.

There is a need for more powerful components of a user interface including mental models, navigation, presentation, interaction, and metaphors that will allow a user to more quickly and proficiently navigate through the myriad of document, files, applications and data that may be accessible from a computing device.

SUMMARY

Methods, systems, and computer program products for presenting an object on a computing device.

In an illustrative method, a method of presenting an object on a computing device disclosed may include the steps of: providing a metaphor application for installation on a computing device, the metaphor application configured to organize at least one user interface based upon a metaphor, the metaphor organizing a document, a file, an application, data, or any combination thereof based upon geospheric direction; receiving a document, a file, an application, data, or any combination thereof from a data source; associating the document, the file, the application, data, or any combination thereof with a geospheric direction setting of the computing device; generating a presentation object for the document, file, application, data, or any combination thereof, the presentation object containing the document, the file, the application, the data, or any combination thereof, and the predetermined geospheric direction setting; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction associated with the presentation object.

The metaphor may further organize a document, a file, an application, data, or any combination thereof on a surface of a solid geometrical figure in three-dimensional Euclidean space; and the document, the file, the application, the data, or any combination thereof may be further associated with a point on the surface of the solid geometrical figure in three-dimensional Euclidean space associated with the geospheric direction setting of the computing device.

In another illustrative method, a method of presenting an object on a computing device may include the steps of: providing a metaphor application for installation on a computing device, the metaphor application configured to organize at least one user interface based upon a metaphor, the metaphor organizing a document, a file, an application, data, or any combination thereof based upon geolocation; receiving a document, a file, an application, data, or any combination thereof from a data source; associating the document, the file, the application, the data, or any combination thereof with a geolocation setting of the computing device; generating a presentation object for the document, the file, the application, the data, or any combination thereof, the presentation object containing the data, the file, the application, the data, or any combination thereof, and the predetermined geolocation; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is in the geolocation associated with the presentation object.

In another embodiment, the metaphor may further organize a document, a file, an application, data, or any combination thereof on a surface of a solid geometrical figure in three-dimensional Euclidean space; and the document, the file, the application, the data, or any combination thereof with a geolocation setting of the computing device may be further associated with a solid geometrical figure in three-dimensional Euclidean space.

In an illustrative system, a system for presenting an object may include: a display device; one or more processors; and at least one memory coupled to the one or more processors. The at least one memory includes computer-readable instructions for execution by the one or more processors to cause said one or more processors to perform operations comprising: executing instructions of a metaphor application, the metaphor application configured to organize at least one user interface based upon a metaphor, the metaphor organizing a document, a file, an application, data, or any combination thereof based upon geospheric direction, geolocation, or both; associating the document, the file, the application, the data, or any combination thereof with a geospheric direction setting of the computing device, a geolocation setting of the computing device, or both; generating a presentation object for the data, the file, the application, the data, or any combination thereof, the presentation object containing the data, the file, the application, the data, or any combination thereof, and the geospheric direction setting of the device, the geolocation setting of the computing device, or both; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction, in the geolocation, or both associated with the presentation object.

In another embodiment, the metaphor may further organize a document, a file, an application, data, or any combination thereof on a surface of a solid geometrical figure in three-dimensional Euclidean space; and the document, the file, the application, the data, or any combination thereof with a geospheric direction setting of the computing device, a geolocation setting of the computing device, or both may be further associated with a point on the surface of a solid geometrical figure in three-dimensional Euclidean space associated with the geospheric direction setting of the computing device, a solid geometrical figure in three-dimensional Euclidean space associated with the geolocation of the computing device, or both.

In an illustrative computer program computer product, a computer program product for use with a computer system is disclosed. The computer program product includes a computer usable medium having program code embodied in the medium, the program code comprising: program code that provides a metaphor application for installation on a computing device, the metaphor application configured to organize at least one user interface based upon a metaphor, the metaphor organizing a document, a file, an application, or any combination thereof on a surface of a solid geometrical figure in three-dimensional Euclidean space; receives a document, a file, an application, data, or any combination thereof from a data source; associates the document, the file, the application, the data, or any combination thereof with a point on the surface of the solid geometrical figure in three-dimensional Euclidean space based upon a predetermined geospheric direction setting, a predetermined geolocation setting, or both of the computing device; generates a presentation object for the document, the file, the application, the data, or any combination thereof, the presentation object containing the data, the file, the application, or any combination thereof, and the predetermined geospheric direction setting, the predetermined geolocation setting, or both; formats the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction, in the predetermined geolocation, or both associated with the presentation object.

In another embodiment, in the computer program product, the metaphor may further organize a document, a file, an application, data, or any combination thereof on a surface of a solid geometrical figure in three-dimensional Euclidean space; and the association of the document, the file, the application, the data, or any combination thereof with a geospheric direction setting of the computing device, a geolocation setting of the computing device, or both may be further associated with a point on the surface of the solid geometrical figure in three-dimensional Euclidean space associated with the geospheric direction setting of the computing device, the geolocation of the computing device, or both.

DESCRIPTION OF DRAWINGS

The drawings attached to this disclosure depict various embodiments of this disclosure.

FIG. 7 depicts an illustrative metaphor information library 410 of this disclosure.

FIG. 10 depicts a number of illustrative shapes that the metaphor of this disclosure may take.

FIG. 12 shows an iPhone so oriented that its geospheric coordinates are 45.37°, −75.9°, 81.5° as well as other data that represents geospheric direction.

DETAILED DESCRIPTION

Figure 1:
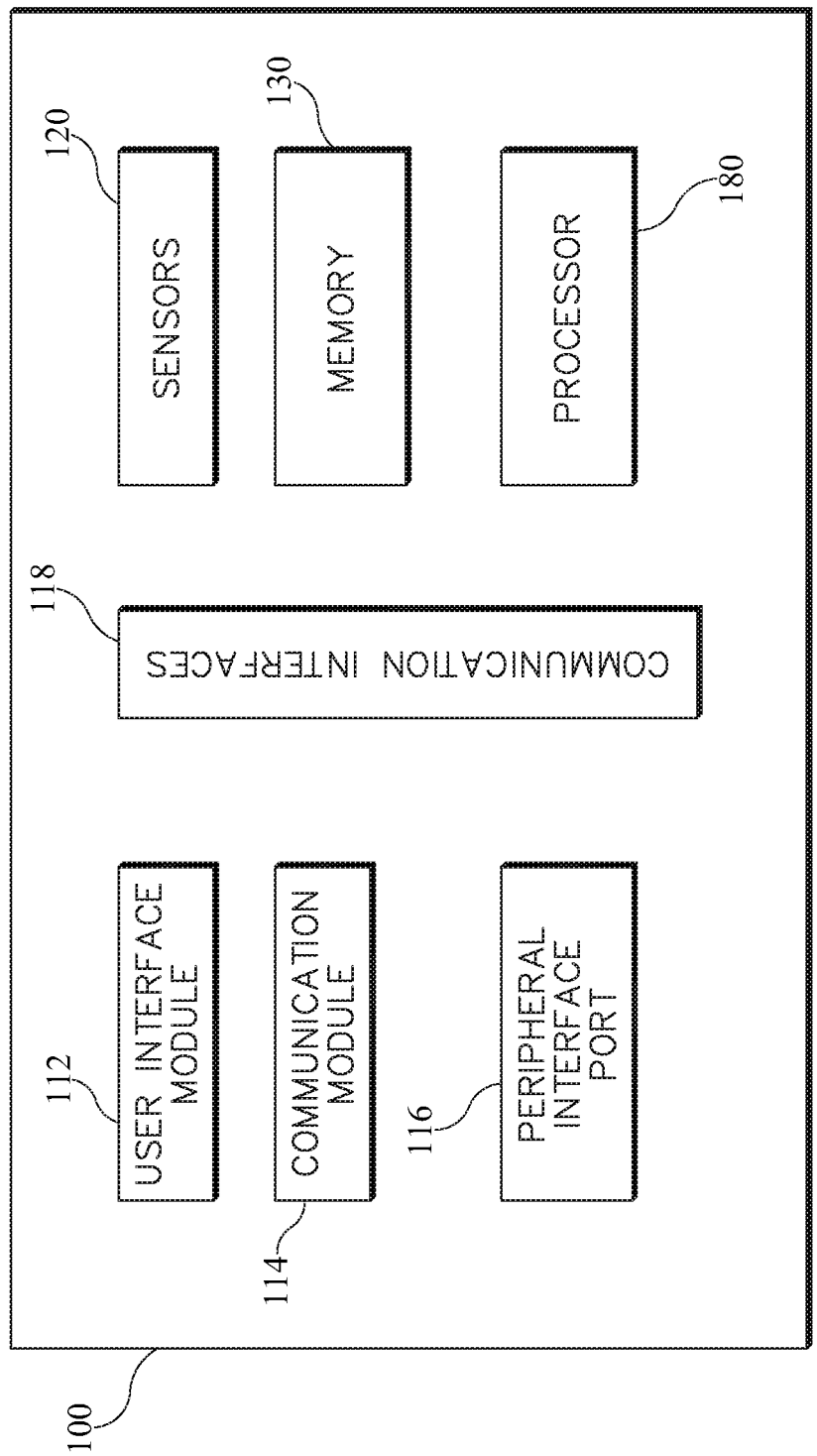
FIG. 1 is an illustrative computing device according to this disclosure.

Various embodiments will be further clarified by the following examples.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Broadly speaking, disclosed are methods, systems, and computer program products for presenting an object on a computing device. A metaphor application on a computing device organizes a user interface based upon a metaphor. The metaphor organizes a document, file, application, data or combination thereof based on geospheric direction, geolocation, or both. The metaphor may also organize a document, file, application, or combination thereof based on a solid geometrical figure in three-dimensional Euclidean space. A document, file, application, data or any combination thereof may be associated with geophysical direction, a geolocation, or both. The document, file, application, data or any combination thereof may further be associated with a solid geometrical figure. A presentation object containing data on the document, file, application, data or combination thereof, and the geospheric direction, geolocation, or both is formatted into data blocks for rendering on a display of the computing device. The metaphor application causes the presentation object to be rendered on the display when the computing device is pointing in the geospheric direction, in the geolocation or both associated with the presentation object.

By the term "application" is meant any device program or group of programs that is designed for the end user. Application software includes systems software and end user programs. End user programs include such things as database programs, word processors, Web browsers, spread sheets, and gaming applications.

By the term "metaphor application download on the computing device" is meant a user download, a factory download, a combination thereof, or any other download of an application on the computing device in any way.

By the term "metaphor" is meant an organization of a data, a file, an application, or a combination thereof according to a fundamental concept, terms or image by which and through which information is easily recognized, understood, and remembered. The metaphor is used in software user interface design to facilitate interpretation and to provide a vehicle for easily recognizing, understanding, and remember where a data, file, or application may be stored and how the data, file, or application may be accessed or manipulated. Metaphors include the essential ways by which choices for command or control may be communicated and the status of data and functions may be depicted.

By the term "computing device" is meant any computer (e.g., end user device or server) including servers, intermediary servers, personal computers, cellular phones, smart phones, wireless computers, wireless lap-top computers, mobile devices such as tablet computers, pad computers, personal digital assistant, and wireless sensors or networks of sensors, such as mesh network sensors. These examples are not intended to be limiting, and the present disclosure is not limited to these examples of computing device. In one illustrative embodiment, the computing device may be a user equipment such as a cellular phone, a smart phone, or other device, such as a tablet or a personal digital assistant containing a multi applications processor configured to execute a mobile application. In other embodiments, any computing device configured to execute an application to provide a data service according to this disclosure may be used as the computing device of this disclosure.

By the term "mobile computing device" is meant a computing device that is capable of operating while moving.

By the term "display device" is meant an output device for presentation of information in visual or tactile form including a CRT monitor, a flat-panel display, a liquid crystal display, (LCD), a projector including a laser projector, a television, and computing devices and mobile computing devices having a display. A display device may be a touch screen device. Alternatively, the display device may be a touch screen of a projector, a laser display screen, Google glasses, and so on.

By the term "display" is meant a display screen of a display device.

Turning now to the drawings, FIG. 1 depicts an illustrative computing device 100 according to this disclosure. The computing device 100 comprises a memory 130 which may be internal memory, external memory (not shown), or a combination thereof; a processor 180 configured for communication with the memory; a communication module 114 configured for communication with the processor, and sensors 120. The processor 180 is configured to execute instructions according to this disclosure. The instructions reside in internal memory 130 but may reside in external memory (not shown), or reside in both internal and external memory.

The processor 180 illustratively includes one or more core processors (not shown), a power management module (not shown) and one or more physical communication ports (not shown) and a plurality of peripheral interface ports (not shown). Processor 180 may also include one or more external memory interfaces (not shown) for connecting to external memory (not shown). The processor 180 is electrically connected to a communications interface 118 for connecting the components of the processor 180 to the memory 130, the communication module 114, sensors 120, and user interface module 112.

The communications module may be a cellular modem interface, a Bluetooth® modem interface, a Wi-Fi interface, or any other interface suitable for handling communications between the computer 100 and a network. Illustratively, the wireless service is selected from the group consisting of cellular, Wi-Fi, RFID, Satellite, Bluetooth, and ZigBee. Alternatively, the communications interface may be an Ethernet interface, an RS232 interface, a USB interface or any other interface suitable for handling wired communications between the computer 110 and a network. In an alternative embodiment, the communications module may be an interface for handling communications between the processor and other components internal or external to the computing device 100.

The communication module 114 may comprise one or more wireless service processors configured to send and receive wireless communications signals over respective antennas (not shown). Wireless service processors may be digital signal processors. The wireless service may be selected from the group consisting of Wi-Fi, Bluetooth, Ethernet, DSL, LTE, Wireless Access Points (WAPs), PCS, 2G, 3G, 4G, Remote Radio Heads (RRH), Radio over Fiber Optic Cable (RoF), WiMax, LAN, CDMA, TDMA, GSM, WDM and WLAN. As also previously indicated, the communication module may be an Ethernet interface, an RS232 interface, a USB interface, or other interface for handling wired communications between the computer 110 and a network. The communications module facilitates communicating application level information received through the communications interface 118 to a network. The communication module also facilitates the computer 100 being able to communicate application level information, wired or wirelessly, to other systems (not shown) outside the network, if desired.

With continuing reference to FIG. 1, the processor 180 handles all input and output communication of the computing device 100. The processor 180 may include multiple core processors or a multi-core processor. The processors execute applications of the processor. The applications may be mobile applications such as for call reception, call origination, Short Message Service (SMS) texting, Instant Messaging (IM), a data application, an email application, a word processing application, a camera application, a presence application, gaming application, a music playback application, a video playback application, a social media application, a voice command mode, and a hands-free mode. The applications may be applications typically found on computing devices such as include Word, Excel, PowerPoint, and other applications for office productivity. Applications may include gaming applications such as Pac-Man® gaming software. Applications may further include cloud server applications such as music storage, file storage, and cloud printing. The applications may be application program interfaces (APIs). Applications executable on a computing device may be used with this disclosure.

The application level information is stored by the processor in the internal memory. The power management module of the processor manages power consumption in the processor to achieve the desired performance levels. The one or more physical communications ports allow for wired communications to and from the computer, if desired. The external memory interfaces (not shown) may include memory card ports, USB ports, micro-USB ports, etc., for storing data from internal memory, including application level information. The peripheral interface ports enable the computing device to be connected to peripheral devices.

Figure 2:
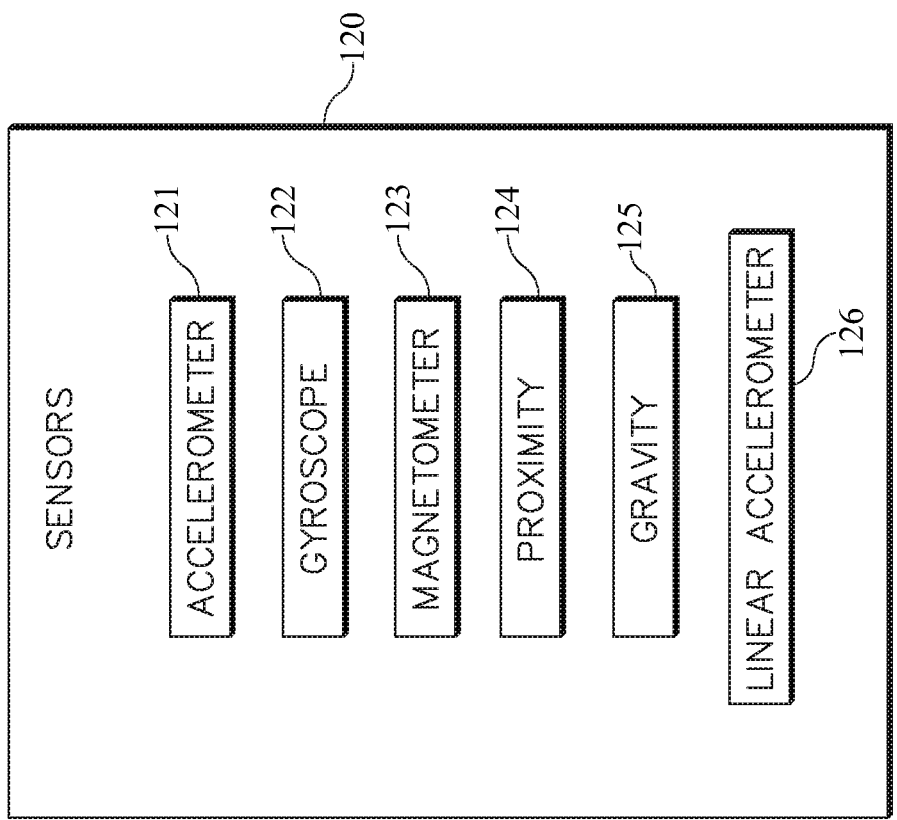
FIG. 2 depicts an illustrative embodiment of sensors that may be used with this disclosure.

Computing device 100 further includes one or more sensors 120, connected to the processor and memory through the communication interface. FIG. 2 depicts an illustrative embodiment of sensors that may be used with this disclosure. The sensors may include one or more of an accelerometer 121, a gyroscope 122, a magnetometer 123, a proximity sensor 124, a gravity sensor 125, and a linear accelerometer 126. Many mobile devices have other additional sensors such as a light sensor, camera sensors, microphone sensors, touch sensors, pressure sensor, temperature sensor, humidity sensor, and so on.

The accelerometer is illustratively a hardware component that measures the acceleration force in m/s$^2$ that is applied to a device on all three physical axes (x, y, and z), including the force of gravity. It is commonly used for motion detection (shake, tilt, etc.). The gyroscope may be a hardware component that measures a device's rate of rotation in rad/s around each of the three physical axes (x, y, and z). It is commonly used for rotation detection (spin, turn, etc.). The magnetic field sensor is illustratively a piece of hardware for measuring the ambient geomagnetic field for all three physical axes (x, y, z) in µT. It is commonly used for creating a compass.

A gravity sensor may be a hardware component or implemented in software to measure the force of gravity in m/s$^2$ that is applied to a device on all three physical axes (x, y, z). It is commonly used for motion detection (shake, tilt, etc.). A linear acceleration sensor may be a hardware component or implemented in software for measuring the acceleration force in m/s$^2$ that is applied to a device on all three physical axes (x, y, and z), excluding the force of gravity. It is commonly used for Monitoring acceleration along a single axis. A proximity sensor is illustratively a hardware component for measuring the proximity of an object in cm relative to the view screen of a device. This sensor is typically used to determine whether a handset is being held up to a person's ear. It is commonly used for phone position during a call.

The foregoing sensors are illustrative sensors that may be used with this disclosure. The sensors useable with this disclosure may be hardware, software, or both. An example of a software implemented software may an orientation sensor, which is illustratively implemented in software, to measure degrees of rotation that a device makes around all three physical axes (x, y, z). In some embodiments, the inclination matrix and rotation matrix for a device may be obtained by using the gravity sensor and a geomagnetic field sensor in conjunction with a getRotationMatrix( ) method. See for example, http://developer.android.com/guide/topics/sensors/sensors_overview.html It is commonly used for determining device position. A rotation vector sensor may be a hardware component or implemented in software to measure the orientation of a device by providing the three elements of the device's rotation vector. It is commonly used for Motion detection and rotation detection. See for example, http://developer.android.com/guide/topics/sensors/sensors_overview.html To further illustrate the sensors that may be used with this disclosure, the Android platform, for example, provides two sensors that let you determine the position of a device: the geomagnetic field sensor and the orientation sensor. The Android platform also provides a sensor that lets you determine how close the face of a device is to an object (known as the proximity sensor). The geomagnetic field sensor and the proximity sensor are hardware-based. Most handset and tablet manufacturers include a geomagnetic field sensor. Likewise, handset manufacturers usually include a proximity sensor to determine when a handset is being held close to a user's face (for example, during a phone call). The orientation sensor is software-based and derives its data from the accelerometer and the geomagnetic field sensor.

Position sensors are useful for determining a device's physical position in the world's frame of reference. For example, you can use the geomagnetic field sensor in combination with the accelerometer to determine a device's position relative to the magnetic North Pole. You can also use the orientation sensor (or similar sensor-based orientation methods) to determine a device's position in your application's frame of reference. Position sensors are not typically used to monitor device movement or motion, such as shake, tilt, or thrust (for more information, see Motion Sensors).

The geomagnetic field sensor and orientation sensor return multi-dimensional arrays of sensor values for each SensorEvent. For example, the orientation sensor provides geomagnetic field strength values for each of the three coordinate axes during a single sensor event. Likewise, the orientation sensor provides azimuth (yaw), pitch, and roll values during a single sensor event. The proximity sensor provides a single value for each sensor event.

Figure 3:
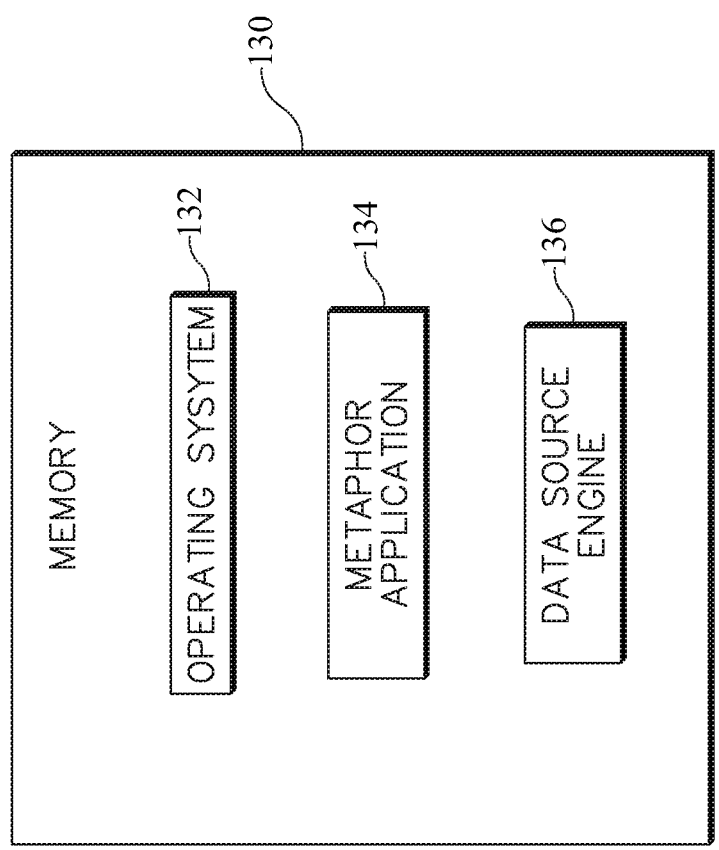
FIG. 3 depicts a memory as including instructions of an operating system 132, a metaphor application 134, and a data source engine 136.

Turning now to this disclosure, FIG. 3 depicts memory 130 as including instructions of an operating system 132, a metaphor application 134, and a data source engine 136. Operating system 132 is system software that manages computer hardware and software resources and provides common services for computer programs. The operating systems perform basic tasks, such as recognizing input from the keyboard, sending output to the display screen, keeping track of files and directories on the disk, and controlling peripheral devices such as disk drives and printers.

Metaphor application 134 is a computer program designed to permit the user to perform a group of coordinated functions, tasks, or activities as disclosed herein. Illustrative functions may include organizing at least one user interface based upon a metaphor, the metaphor organizing a document, a file, an application, data, or any combination thereof based upon geospheric direction. The metaphor application may receive or cause other software on the computing device to receive a document, a file, an application, data, or any combination thereof from a data source. The metaphor application may associate or cause other software on the computing device to associate the document, the file, the application, data, or any combination thereof with a geospheric direction setting of the computing device. The metaphor application may generate or cause other software on the computing device to generate a presentation object for the document, file, application, data, or any combination thereof, the presentation object containing the document, the file, the application, the data, or any combination thereof, and the predetermined geospheric direction setting. The metaphor application may format or cause other software on the computing device to format the presentation object into data blocks for rendering on a display of the computing device. The metaphor application may cause processor or controller to render or cause other software on the computing device to cause processor or controller to render the formatted presentation object on the display of the computing device. The metaphor application may cause the presentation object to be rendered or cause other software on the computing device to cause the presentation object to be rendered on the display of the computing device when the computing device is pointing in the geospheric direction associated with the presentation object.

The metaphor may further organize a document, a file, an application, data, or any combination thereof on a surface of a solid geometrical figure in three-dimensional Euclidean space; and the document, the file, the application, the data, or any combination thereof may be further associated with a point on the surface of the solid geometrical figure in three-dimensional Euclidean space associated with the geospheric direction setting of the computing device.

In another illustrative embodiment, the metaphor application organizes at least one user interface based upon a metaphor, the metaphor organizing a document, a file, an application, data, or any combination thereof based upon geolocation. The metaphor application may receiving or cause other software on the computing device to receive a document, a file, an application, data, or any combination thereof from a data source. The metaphor application may associate or cause other software on the computing device to associate the document, the file, the application, the data, or any combination thereof with a geolocation setting of the computing device. The metaphor application may generate or cause other software on the computing device to generate a presentation object for the document, the file, the application, the data, or any combination thereof, the presentation object containing the data, the file, the application, the data, or any combination thereof, and the predetermined geolocation; formatting the presentation object into data blocks for rendering on a display of the computing device. The metaphor application may cause the controller or processor to render or cause other software on the computing device to cause processor or controller to render the formatted presentation object on the display of the computing device. The metaphor application may cause the presentation object to be rendered or cause other software on the computing device to cause the presentation object to be rendered on the display of the computing device when the computing device is in the geolocation associated with the presentation object.

In another embodiment, the metaphor may further organize a document, a file, an application, data, or any combination thereof on a surface of a solid geometrical figure in three-dimensional Euclidean space; and the document, the file, the application, the data, or any combination thereof with a geolocation setting of the computing device may be further associated with a solid geometrical figure in three-dimensional Euclidean space.

In another embodiment, the metaphor application is configured to organize at least one user interface based upon a metaphor, the metaphor organizing a document, a file, an application, data, or any combination thereof based upon geospheric direction, geolocation, or both. The metaphor application may associate or cause other software on the computing device to associate the document, the file, the application, the data, or any combination thereof with a geospheric direction setting of the computing device, a geolocation setting of the computing device, or both. The metaphor application may generate or cause other software on the computing device to generate a presentation object for the data, the file, the application, the data, or any combination thereof, the presentation object containing the data, the file, the application, the data, or any combination thereof, and the geospheric direction setting of the device, the geolocation setting of the computing device, or both. The metaphor application may format or cause other software on the computing device to format the presentation object into data blocks for rendering on a display of the computing device. The metaphor application may cause the controller or processor to render or cause other software on the computing device to cause processor or controller to render the formatted presentation object on the display of the computing device. The metaphor application may cause the presentation object to be rendered or cause other software on the computing device to cause the presentation object to be rendered on the display of the computing device when the computing device is pointing in the geospheric direction, in the geolocation, or both associated with the presentation object.

In another embodiment, the metaphor may further organize a document, a file, an application, data, or any combination thereof on a surface of a solid geometrical figure in three-dimensional Euclidean space; and the document, the file, the application, the data, or any combination thereof with a geospheric direction setting of the computing device, a geolocation setting of the computing device, or both may be further associated with a point on the surface of a solid geometrical figure in three-dimensional Euclidean space associated with the geospheric direction setting of the computing device, a solid geometrical figure in three-dimensional Euclidean space associated with the geolocation of the computing device, or both.

The foregoing are illustrate functions of a metaphor application. However, it will be appreciated that some of these functions may be performed by other applications on a computing device.

The data source engine is illustratively hardware and software that captures geospheric and geolocation data for use with this disclosure as described below.

Figure 4:
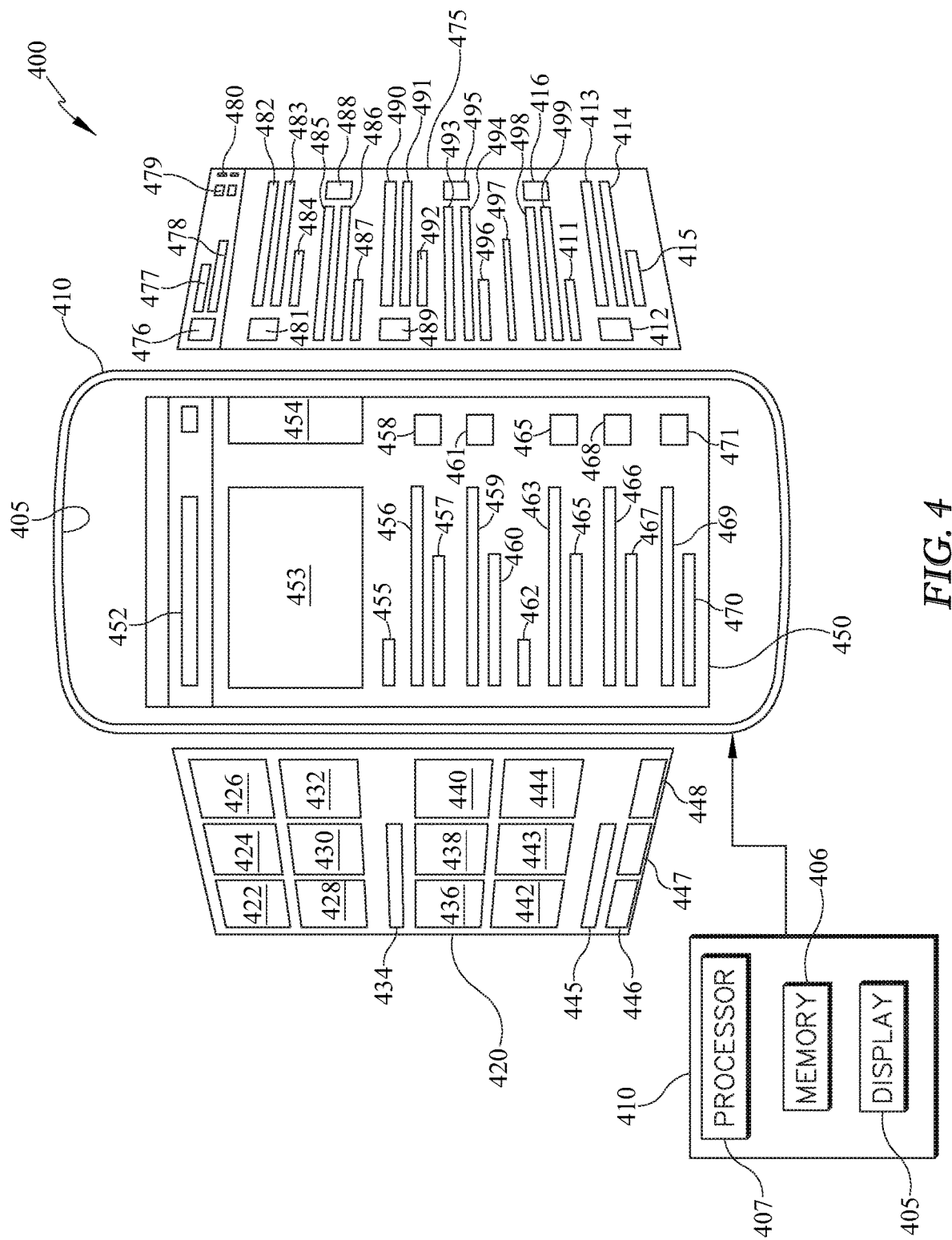
FIG. 4 illustrates a system 401 for presenting an object (such as Word, Excel, Pdf, PPT, and other applications) on a conventional interface 450.

FIG. 4 illustrates a system 400 for presenting an object (such as Word, Excel, Pdf, PPT, and other applications) on a conventional interface 450. The system comprises: a display 405; one or more processors 407; and at least one memory 408 coupled to the one or more processors, the at least one memory comprising computer-readable instructions for execution by the one or more processors to cause said one or more processors to perform operations, comprising: retrieving an object; and displaying the object on the display 405 according to the user interface 450. In this example, the user interface renders a display of a variety of variety of UI components such as structured layout objects and UI controls 452-470 on a display panel 405 of computing device 410. The object may be files or applications. It may also include special interfaces such as dialogs, notifications, and menus. Displays 420 and 475 illustrate other displays that a user may see on display panel 405 of computing device 410.

FIG. 4 further shows displays 420 and 475. Only display 450 is rendered on display panel 405. Displays 420 and 475 are additional displays that may be rendered on display panel 405 by, for example, activating a memory command that renders displays 420 or 475 instead of display 450 on the display. Displays other than those illustrated (not shown) may also be rendered on display panel.

Each of displays 420 and 475 and other displays illustratively include a variety of UI components such as structured layout objects and UI controls. The object may be files or applications. It may also include special interfaces such as dialogs, notifications, and menus. While in FIG. 4, only display 450 is depicted as being rendered on display 450, a user may cause displays 420 and 475 or other displays to be seen on display panel 405 in place of display 450. Alternatively, one or more other displays may be displayed contemporaneously with display 450 on display panel 405 after appropriate scaling. In another embodiment, portions of one or more other displays may be displayed contemporaneously with display 450 or portions of display 450 after appropriate scaling. A user may toggle between display 450, 420 and 475 using an active button, such as the start button on an iPhone. Alternatively, one or more objects displayed on displays 450, 420, and 475 may actively provide navigation functionality to allow a user to navigate between displays to render on the display panel 405.

Figure 5:
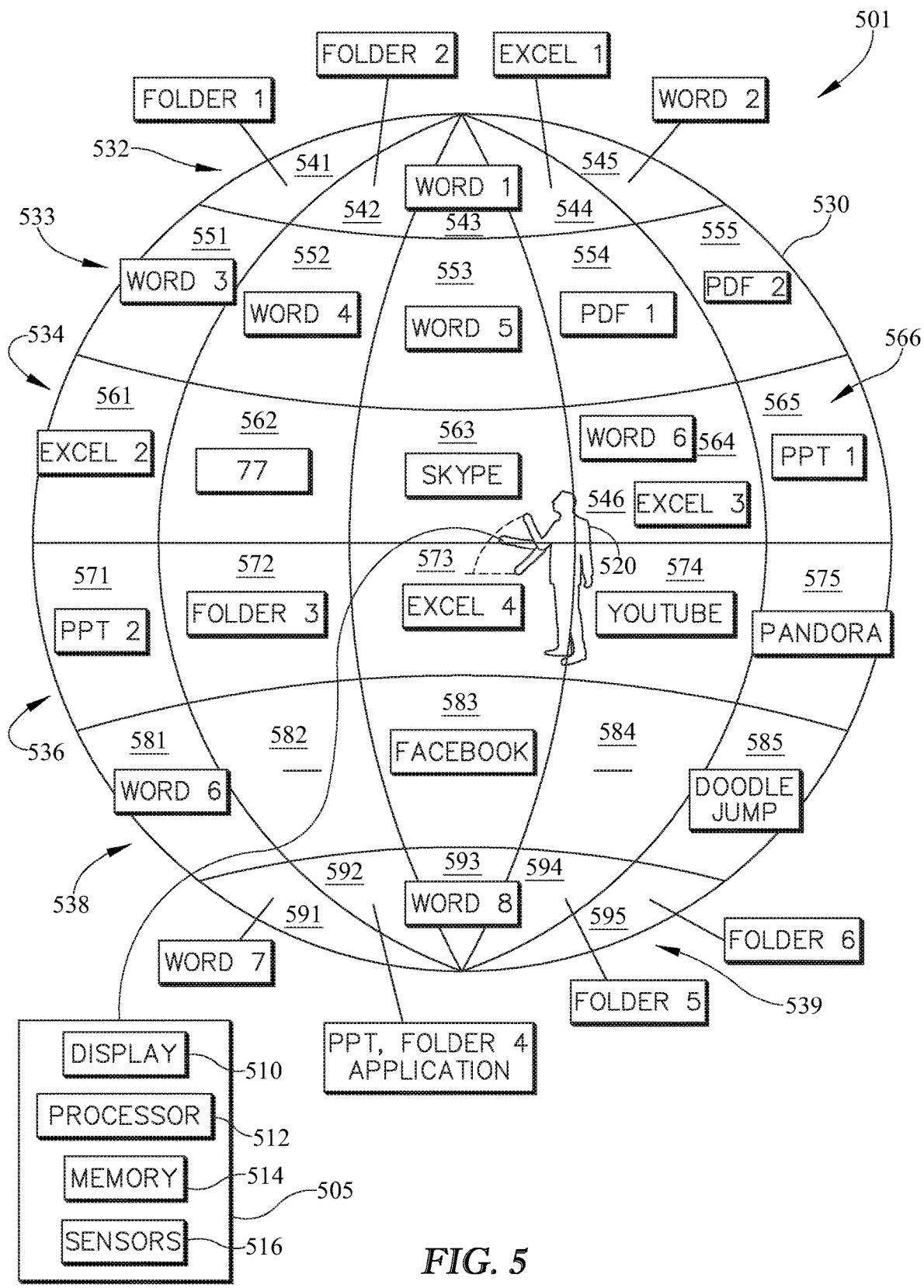
FIG. 5 illustrates a system 501 for presenting an object (shown as Word, Excel, Pdf, PPT, and other applications in FIG. 5) according to this disclosure.

FIG. 5 illustrates a system 501 for presenting an object (e.g., Word, Excel, Pdf, PPT, file folders, and other applications depicted in FIG. 5) according to this disclosure. The system comprises: a display device 505; one or more processors 512; and at least one memory 514 coupled to the one or more processors, the at least one memory comprising computer-readable instructions for execution by the one or more processors to cause said one or more processors to execute the metaphor application previously explained and to perform operations comprising: retrieving an object; and displaying the object according to a metaphor 530. Display device 505 is a computing device of the kind and may have the same form and function and operation as described in connection with computing device 100 in FIG. 1. Similarly, processor 512, memory 514, and sensors 516 are a processor, memory and sensors of the kind and may have the same form and function and operation as described in connection with processor 180, memory 130 and sensors 120 in FIG. 1. As mentioned, the object in FIG. 5 is shown as Word, Excel, Pdf, PPT, file folders, and other applications. Alternatively, the object comprises a document, a file, an application, data, or any combination thereof. As shown, the objects are located at points or groups of points on a surface of the metaphor 530.

As previously explained, the metaphor application 134 (shown in FIG. 3) of this disclosure is a computer program designed to permit the user to perform a group of coordinated functions, tasks, or activities as disclosed herein. Illustrative functions may include a computer program designed to permit the user to perform a group of coordinated functions, tasks, or activities as disclosed herein. Illustrative functions may include organizing at least one user interface based upon a metaphor, the metaphor organizing a document, a file, an application, data, or any combination thereof according to geospheric direction of the computing device, geolocation of the computing device, or combination thereof. Illustrative functions may be organizing one or more objects on a surface of a solid geometrical figure in three-dimensional Euclidean space. Other functions of the metaphor application are as disclosed herein.

The metaphor application is illustratively separate from the operating system. Alternatively, the application may be included in the operating system.

Figure 6:
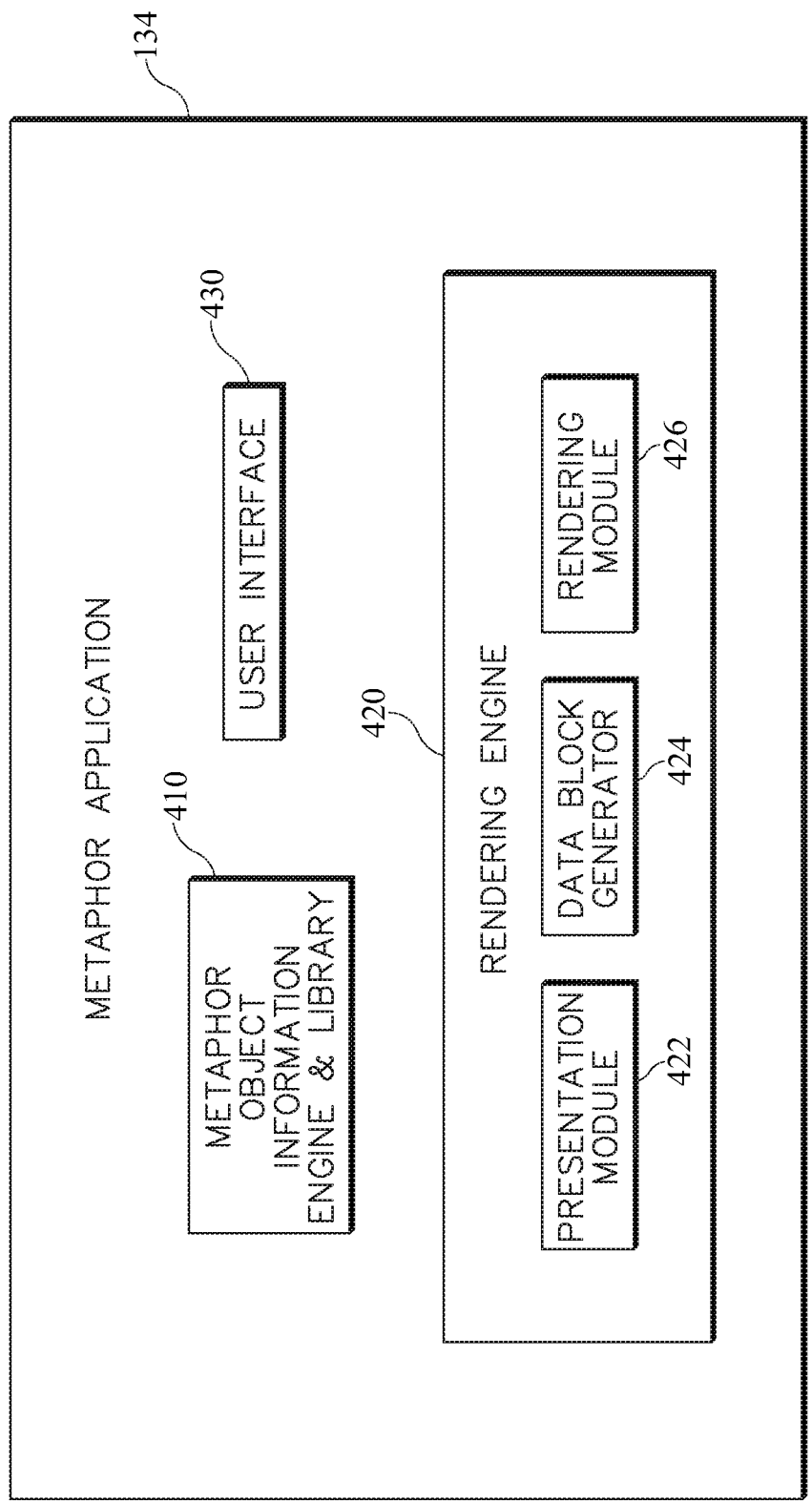
FIG. 6 depicts an illustrative metaphor application 134 of this disclosure.

FIG. 6 depicts an illustrative metaphor application 134 of this disclosure. Metaphor application 134 comprises a metaphor object engine & information library 410, a rendering engine 420, and a user interface 430. The rendering engine 420 further comprises a presentation module 422, a data block generator module 424, and a rendering module 426. The metaphor object engine & information library 410 illustratively associates or causes other software on the computing device to associate a document, a file, an application, data, or any combination thereof with a geospheric direction setting of the computing device, a geolocation setting of the computing device, or both. The metaphor object engine & information library 410 may further organize a document, a file, an application, data, or any combination thereof on a surface of a solid geometrical figure in three-dimensional Euclidean space; and the document, the file, the application, the data, or any combination thereof with a geospheric direction setting of the computing device, a geolocation setting of the computing device, or both may be further associated with a point on the surface of a solid geometrical figure in three-dimensional Euclidean space associated with the geospheric direction setting of the computing device, a solid geometrical figure in three-dimensional Euclidean space associated with the geolocation of the computing device, or both. The metaphor object engine & information library 410 of the metaphor application may also cause the presentation object to be rendered on the display of the computing device when the computing device is pointing in the geospheric direction associated with the presentation object, in a geolocation associated with the presentation object, or both.

The metaphor object engine & information library 410 also illustratively stores information concerning the location of various documents, files or applications. More specifically, the metaphor may illustratively define a three dimensional space such that objects depicted in the metaphor are associated with a unique latitude, longitude, and altitude, for example in that space. Alternatively, the objects may be represented in the three dimensional space using other techniques such as Euler angles, orientation matrix, orientation quaternion, or in other ways. The metaphor object engine & information library 410 illustratively stores information concerning the location of objects in the three-dimensional space defined by the metaphor. As will be discussed in detail below, such information is used to display the objects depicted in the metaphor on a computer display.

The rendering engine 420 comprises a presentation module 422, a data block generator module 424, and a rendering module 426. The presentation module 422 is hardware and software configured to illustratively generate a presentation object for the data, the file, the application, the data, or any combination thereof, the presentation object containing the document, the file, the application, the data, or any combination thereof, and the geospheric direction setting, the geolocation setting, or both. The presentation object may also contain a contain indicia on an associated solid geometrical figure in three-dimensional Euclidean space, indicia on an associated point on a surface of a solid geometrical figure in three-dimensional Euclidean space.

The data block generator 424 is hardware and software configured to format the presentation object into data blocks for rendering on a display of the computing device.

The rendering module 426 is hardware and software configured to render the formatted presentation object on the display of the computing device.

The user interface 430 is hardware and software configured to allow user interaction with the metaphor application. The user interface includes instructions, prompts and so on that may be rendered on the display screen by the metaphor application for user interaction as well as user inputs to the metaphor application through the user interface of the computing device. The interactions can be visual, audible, or both. The interactions include user input of data and selection of items in a menu displayed on the screen of a computing device by or for the metaphor application.

FIG. 7 depicts an illustrative architecture for a metaphor object information library of the metaphor object engine & information library 410 of this disclosure. In one aspect, the metaphor object information library stores values representing the geospheric positions (orientation) of the objects in the three dimensional space of the metaphor. In that regard, a separate value can be stored for each object of the metaphor where the value represents the geospheric position of the object in the metaphor. For instance, a geospheric position may be represented by yaw, pitch, and roll information. The yaw, pitch, and roll information pertains to the orientation of the computing device and is shown in FIG. 7 as X, Y, Z. When associated with a particular document, file, application, or combination thereof, the yaw, pitch and roll information can be seen to associate the particular document, file, application, or combination thereof to a geospheric setting of the computing device.

In an alternative example, the metaphor defines a solid geometrical figure in three-dimensional Euclidean space. The figure shown in FIGS. 5 and 7 is a sphere defined by the metaphor of the metaphor application as explained herein. In this embodiment, the document, file, application, data, or combination thereof depicted in FIG. 7 is associated with a sphere having a radius of 3 meters. Hence, each document, file, application, data, or combination thereof has associated with it an indicia indicative of a radius of 3 meters. In this way, when a user wants a document, file, application, data, or combination thereof rendered to be those in the sphere having a radius of 3 meters, the metaphor application will call up those documents, files, applications, data, or combination thereof associated with that sphere of that radius and then allow only those documents, files, applications, data, or combination thereof to be rendered when the computing device is pointing in a specific geospheric direction. The radius of the sphere may be set by a user or be preprogrammed. A user may change the setting of the radius to 4 meters for example which may be associated with the same or different set of documents, files, applications, data, or combination thereof. The metaphor application may also be configured to organize a document, file, application, data, or combination thereof in other solid geometrical figures according to this disclosure. The metaphor application may also be configured to organize a document, file, application, data, or combination thereof in other ways in three dimensional space.

Hence, in the embodiment illustrated in FIG. 7, the yaw, pitch, and roll information may be used by the metaphor to place the particular document, file, application, data or combination thereof in space. It may also place the document, file, application, data or combination thereof on a point on the surface of the sphere.

While yaw, pitch, and roll information of the computing device is the illustrative manner of orienting document, file, application, data or combination thereof, it will be appreciated that y, the objects may be represented in the three dimensional space using other techniques such as Euler angles, orientation matrix, orientation quaternion, or in other ways.

FIG. 7 also shows illustrative objects as file folders; word, excel, PowerPoint, pdf documents; and applications such as Skype, You Tube, and Doodle Jump. FIG. 7 is also seen to provide a memory map of associations for the particular document, file, application, or combination thereof that may be displayed on a sphere in accordance with the metaphor of FIG. 5. In this regard, the particular coordinates shown in FIG. 7 also appear in FIG. 5 to illustrate how the coordinates shown in FIG. 7 associated with particular documents, files, applications, data or combination thereof may be located on a surface of a sphere organized by the metaphor of this disclosure as shown in FIG. 5. At each coordinate in FIG. 5 is located the particular document, file, application, data or combination thereof associated with that coordinate appearing in the memory map of FIG. 7. As explained herein, when the computing device is pointing in the direction of a particular coordinate, then the metaphor application may display or cause to be displayed on the computer the particular document, file, application, or combination thereof in accordance with the teachings of this disclosure.

Figure 8:
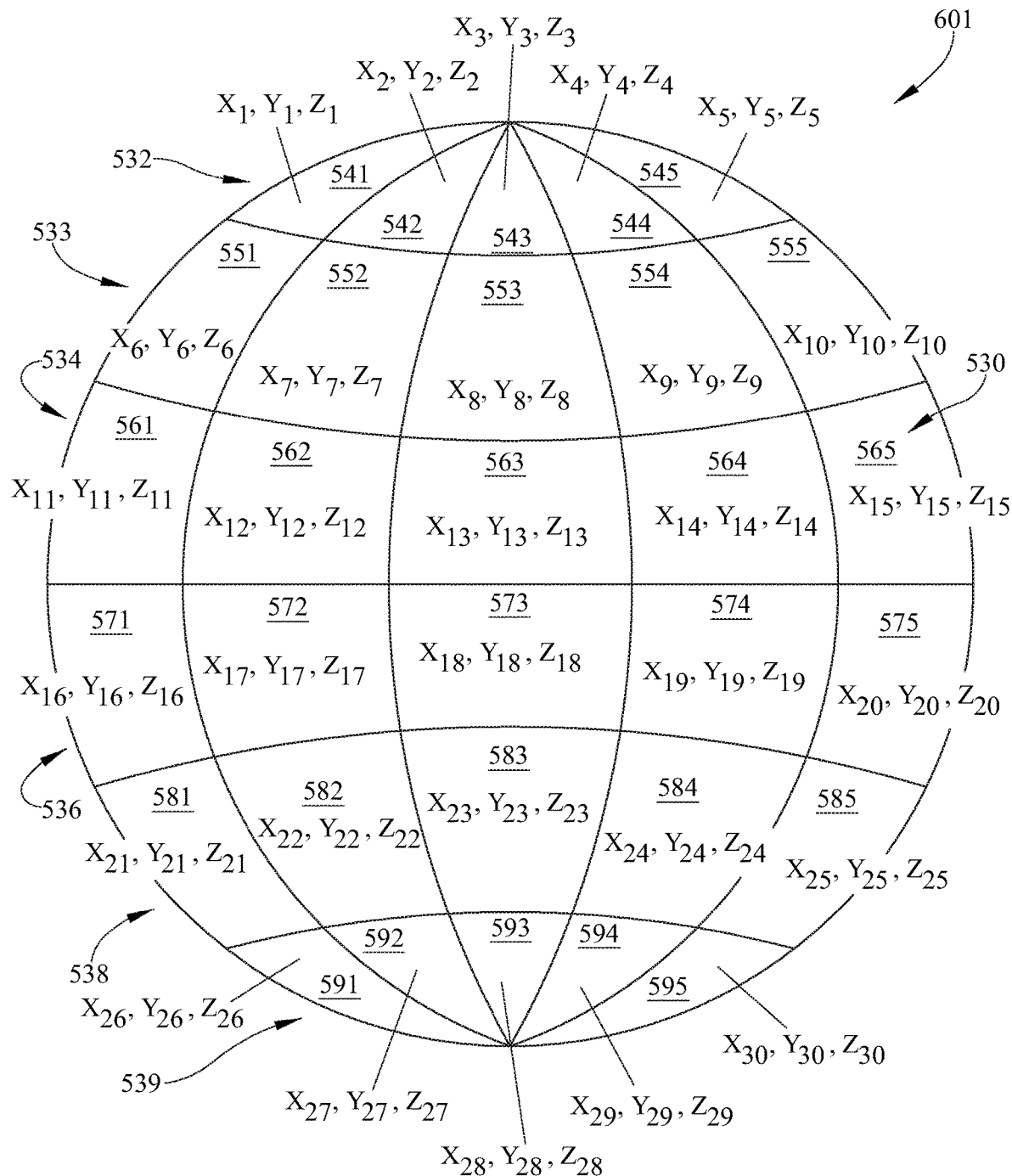
FIG. 8 depicts the FIG. 5 metaphor with the XYZ geospheric locations associated with the objects depicted in FIG. 5.

FIG. 8 depicts more clearly the coordinates associated with documents, files, applications, data or combination thereof shown in the memory map of FIG. 7, with the documents, files, applications, data or combination thereof organized by the metaphor of this disclosure in accordance with FIG. 5, as they appear in connection with the sphere or bubble as shown in FIG. 8 In FIG. 8, the solid geometrical figure in three-dimensional Euclidean space is a spherical metaphor. That is to say, the spherical metaphor is a round body whose surface is at all points equidistant from a center. FIG. 8 depicts the XYZ coordinates denoted in the memory map of the metaphor object engine & information library 410 with respect to locations on the surface of the metaphor which in this example has a spherical shape. More specifically, in the example of FIG. 7 where each document, file, application, data or combination thereof is associated with a sphere having a radius of 3, the document, the file, the application, data, or any combination thereof associated with coordinates XYZ are displayed at the point along the surface of the sphere having a 3 meter radius organized by the metaphor of this application as depicted in FIG. 8.

In yet another aspect, the memory map of the metaphor object engine & information library 410 may include geolocation data that represents the geolocation of a particular metaphor. As depicted in FIG. 5, the center of the spherical metaphor may be defined by the geolocation of the computing device (e.g., where the man is standing). Hence, each geolocation of the computing device may represent a different sphere or bubble or other solid figure. For instance, a one geolocation may be associated with a first metaphor which may organize documents, files, applications, data, or combinations thereof along the surface of a first sphere and a second geolocation may be associated with a second metaphor which may organize documents, files, applications, data, or combinations thereof along the surface of a sphere. Objects that are not associated with a particular metaphor may be displayed on a screen of a computer according to conventional techniques. Alternatively, they may be placed into a holding bin in which they are associated with a null value. In another embodiment, they may be given default surface value and be placed in a default metaphor.

Figure 9:
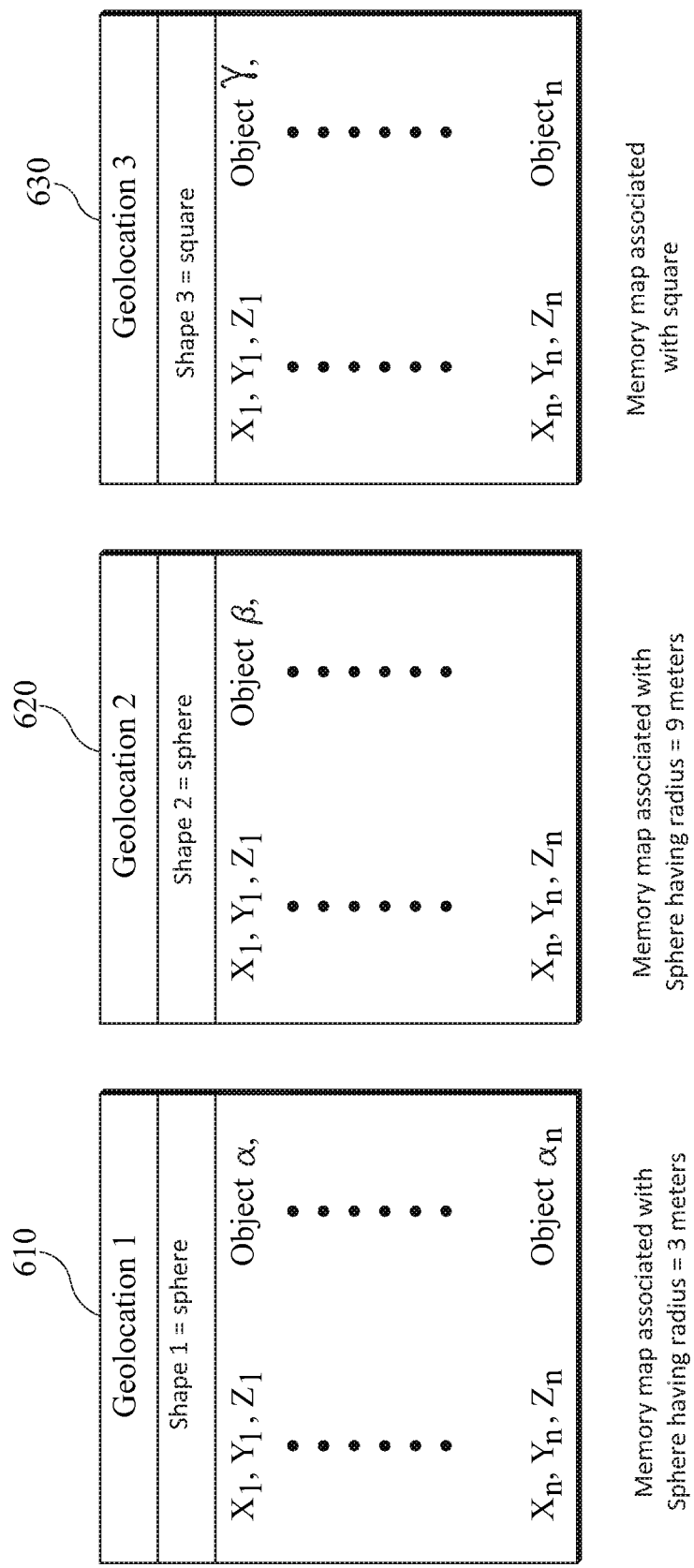
FIG. 9 depicts three metaphors 610, 620, 630 each having a unique geolocation—namely, geolocation 1, 2, 3, respectively.

FIG. 9 depicts three metaphors 610, 620, 630 each having a unique geolocation—namely, geolocation 1, 2, 3, respectively. Metaphors 610 and 620 organize documents, files, applications, data and combinations thereof on the surface of a sphere whereas metaphor 630 organizes them on the surface of a square. Illustratively each metaphor may have a different geolocation in order to differentiate between metaphors. Alternatively, the metaphors may have the same geolocation and differentiated between the two in other words. For example, the document, file, application, data, and combination in FIG. 7 is associated with a radius=3 meters and may be organized by a first metaphor. Another metaphor having the same geolocation (e.g., the user is located in the same location) may have a radius=9 meters for the sphere in which the metaphor may organize another set of documents, files, applications, data, and combinations thereof. Hence, in the same geolocation a user may display the first metaphor or the second metaphor depending on whether the radius is configured to equal 3 or 9 meters. For example, user may set the radius of a metaphor based on a menu selection.

FIG. 10 depicts the metaphor object engine & information library 410 organizing documents, files, applications, data, or combinations thereof along points along the surface of a solid geometrical figure in three-dimensional Euclidean space. In particular, a surface of a metaphor can be defined as a platonic solid or a Kepler-Poinsot polyhedral for example. The metaphor object engine & information library 410 may generate these shapes according to well-known formulas and associate particular documents, files, applications, data, or combinations thereof on a point along a surface of a shape according to the formula. The metaphor application may generate more than one metaphor. A user may use metaphors that generate the same shape or different shapes for the organization and display of documents, files, applications, data or combinations thereof. A particular document, file, application, data, or combinations thereof may be displayed when the computing device is pointing in the geospheric direction, in the geolocation, or both associated with the particular document, file, application, data or combinations thereof.

There are a number of other illustrative shapes that the metaphor of this disclosure may take. As previously explained, the metaphor may be a solid geometric figure. A sphere may be defined by the equation $x^2+y^2+z^2=r^2$ where x, y, z are three coordinates in a three-dimensional Euclidean space and r is the radius of the solid geometrical figure. The radius of the sphere may be either a predetermined or a configurable setting associated with the document, file, the application, or any combination thereof. The metaphor may be a solid geometric figure having a surface area defined by $S=4\pi r^2$; and wherein the radius of the solid geometrical figure is either a predetermined or configurable setting associated with the file, the application, or any combination thereof. The metaphor may be a solid geometrical figure in three-dimensional Euclidean space selected from the group consisting of a platonic solid and a Kepler-Poinset polyhedra. The platonic solid may be selected from the group consisting of a tetrahedron, a cube, an octahedron, a dodecahedron, and an icosahedron. The Kepler-Poinset polyhedral may be selected from the group consisting of a small stellated dodecahedron, a great dodecahedron, a great stellated dodecahedron, and a great icosahedron. The geometry of the figure used by the metaphor may take on other shapes, such as a cylinder. The metaphor may organize documents, files, applications, data or combinations thereof in three dimensional space in these and other ways.

Other formats for storing surface information in the memory map architecture for a metaphor object information library of the metaphor object engine & information library 410 may also be used. For instance, rather than being associated with absolute position values, such as latitude, longitude, and altitude, the values can be relative and in any scale. Moreover, even if a first type of information is used (such as storing latitude, longitude, and altitude information for the surface) information of another type may be generated from the first type of information (such as differences between positions to calculate distances).

Referring again to FIG. 3, the data source engine may be hardware and software configured to collect the geospheric and geolocation information of the computing device which may be mapped against the memory map such as shown in FIG. 7 by the metaphor application to determine whether a particular document, file, application, data, or combination thereof may be rendered on the display of the computing device. The document, file, application, data or combination thereof in the memory map that matches the geospheric direction setting of the computing device may be the document, file, application, data or combination thereof rendered on the computing device when the computing device is pointing in that geospheric direction. If a document, file, application, data or combination thereof is associated with a geolocation, then a match between the geolocation setting of a computing device and the geolocation association on a memory map of documents, files, applications, data, or combinations thereof may be what gets rendered.

A variety of systems and methods can be used to collect the geospheric and geolocation information. For instance, hardware and software can be used. Alternatively, geospheric and geolocation data can be generated using a variety of known techniques. For instance, orientation techniques can be used to analyze data from an x sensor to determine orientation of the computing device.

With the foregoing description of the metaphor of this disclosure, we refer back to FIG. 5 for further disclosure. As indicated, in FIG. 5 metaphor 530 organizes the document, the file, the application, data. or any combination thereof which can be displayed on the surface of a solid geometrical figure in three-dimensional Euclidean space in the shape of a sphere. In this example, the metaphor is referred to as a spherical metaphor. The spherical metaphor is a round body whose surface is at all points equidistant from a center. In FIG. 5, the center of the display is the computing device 505 held by a user 520 in this example. The display device 505 provides a center point for the spherical shape used by metaphor 530 of this disclosure to organize documents, file, applications, data, or combinations thereof. Using the location of the user (e.g., the position of the computing device) as the center point, the processor 512 of the computing device 505 computes the shape this metaphor is organizing the documents, file, applications, data, or combinations thereof. This is done by the metaphor application using instructions illustratively in memory 514. In one illustrative embodiment, this disclosure computes a spherical metaphor that may be a solid geometric figure defined by the equation $x^2+y^2+z^2=r^2$ where x, y, z are three coordinates in a three-dimensional Euclidean space and r is the radius of the solid geometrical figure. In this example, the radius of the solid geometrical figure is either a predetermined or configurable setting associated with the document, the file, the application, or any combination thereof. In other words, the radius may be a default value configured into the system. Alternatively, the radius may be a setting that is programmed into the system by the user. Illustratively, the radius may be defined to be 3 meters in which case $x^2=3$, $y^2=3$, and $z^2=3$ such that $x^2+y^2+z^2=9$. In this case, this disclosure associates documents, files, applications, data, or combinations with points on the solid geometrical figure having a radius of 3. The sphere will have a certain surface area allowing for the posting of a finite number of documents, files, applications, data, or combinations thereof along the surface of the sphere. In this example, the document, file, application, data, or combinations thereof are associated with an x,y,z geospheric direction coordinate. To illustrate, taking the memory map of FIG. 7, each document, file, application, data, or combination thereof may be associated with a point on the surface of a predetermined solid geometrical figure in three-dimensional Euclidean space. For example, if the predetermined solid geometrical figure in three-dimensional Euclidean space is a sphere of radius 3 meters, then each document, file, application, data, or combination thereof depicted in FIG. 7 may be further associated with X, Y, Z values that may satisfy the equation $x^2+y^2+z^2=9$ where x, y, and z correlate to the geospheric direction setting depicted in FIG. 7 that has been associated with the particular document, file, application, data, or combination thereof. If a user wants to be able to present more documents, files, applications, data, or combinations thereof at a point along the surface of the sphere (or a sector of the surface represented by a point), the user may configure the metaphor to organize the documents, files, applications, data, or combinations thereof on a bigger sphere. For example, the user may associate the equation $x^2+y^2+z^2=48$ for use with each document, file, application, data, or combination thereof depicted in FIG. 7. In this instance, each document, file, application, data, or combination thereof may be further associated with X, Y, Z values that may satisfy the equation $x^2+y^2+z^2=48$ where x, y, and z correlate to the geospheric direction setting. The manner in which documents, files, applications, data, or combinations thereof are organized by the metaphors of this disclosure facilitates the presentment of documents, files, applications, data, or combinations thereof.

In the embodiment depicted in FIG. 5, the sphere is depicted to contain 30 slices, sections, or sectors, on the side facing the reader. Since the depiction in FIG. 5 shows half of the sphere, the sphere in FIG. 5 is seen to contain 60 sectors. In FIG. 5 each point on the surface may provide a different location for a document, file, application, data, or combinations thereof. Alternatively, each sector may be associated with a single location on the surface of the sphere in that sector, such as a mid-point. In one illustrative embodiment, all documents, files, applications, data or combinations thereof in one sector may associated with that one location in that sector (e.g., one geospheric direction). In one example, different documents, files, applications, data or combination thereof may be associated with locations along the surface of the sphere in that sector and each of those associations may be further associated with a single or a plurality of locations along the surface of the sphere in that sector. Hence, the metaphor may organize documents, files, applications, data and combinations thereof according to different geospheric directions relevant to a sector and have all of these documents, files, applications, data and combinations called out by pointing to the single or plurality of locations along the surface of the sphere in that sector. Alternatively, any geospheric direction in the sector detected by the computing device may resolve into a single geospheric direction in that sector where some or all of the documents, files, applications, data or combinations may reside because they have been associated with that single geospheric direction. In another embodiment, a plurality of locations on a sphere may be clustered together so that when a computing device is pointing on any geospheric direction in a cluster, it may present objects associated with a plurality of locations on the surface of the geometric figure. This feature is explained below in connection with depiction of regions of locations such as in connection with a panorama of a picture. The number of points on the sphere associatable for organizing documents, files, and applications according to this disclosure is a matter of design choice.

In another example, the metaphor may be any solid geometrical figure in three-dimensional Euclidean space.

The solid geometrical figure may be selected from the group consisting of a platonic solid and a Kepler-Poinset polyhedra. The platonic solid may be selected from the group consisting of a tetrahedron, a cube, an octahedron, a dodecahedron, and an icosahedron. The Kepler-Poinset polyhedral may be selected from the group consisting of a small stellated dodecahedron, a great dodecahedron, a great stellated dodecahedron, and a great icosahedron.

Referring again to FIG. 7, there is shown an association of documents, files, applications, data, or combinations thereof with geospheric sectors (e.g., associated with specific geospheric directions) organized on a surface of the sphere. FIG. 5 shows how this disclosure organizes those documents, files, applications, data, or combinations on the sphere based on the geospheric direction of the computing device. Thus, for example, in a sector (or point) 532 of spherical metaphor 530 are displayed Folder1 at point 541 on the surface of spherical metaphor, Folder2 at point 542 on the surface of spherical metaphor, Word1 at point 543 on the surface of spherical metaphor, Excel1 at point 544 on the surface of spherical metaphor, and Word2 at point 545 on the surface of spherical metaphor. Sector 546 (point 564) depicts a combination Word6 and Excel3. Point 592 depicts a combination of PPT, folder, and application. Further, at any one or more points there may be no file or folder at each point as shown at point 584. On the back side of the spherical metaphor may be other documents, files, applications, or combinations.

The metaphor object engine & information library 410 may include the memory map 701 residing in memory 514 shown in computing device 505. Alternatively, the memory map 701 may reside external to memory 514 such as in a hard drive wired to the display device by USB cable or in a cloud server wireless connected to the display device.

Figure 11:
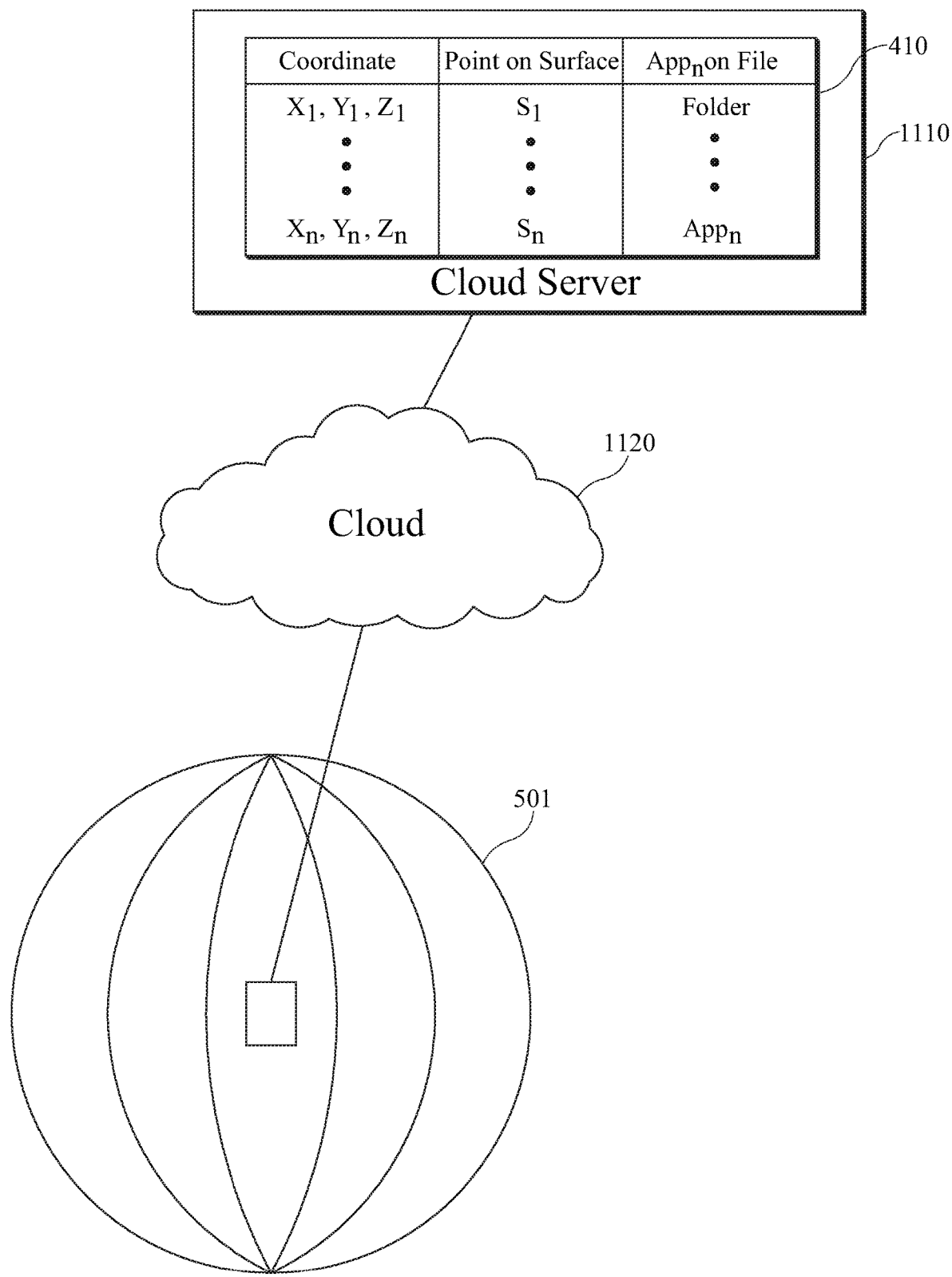
FIG. 11 shows library 410 of FIG. 7 residing on a server 1110 through which the metaphor 501 of this disclosure is in communication with through cloud 1120.

FIG. 11 shows a memory map of the metaphor object engine & information library 410 of FIG. 7 residing on a server 1110 through which the metaphor 501 of this disclosure is in communication with through cloud 1120. In this example, the memory map may be accessed by the computing device over the Internet. Alternatively, the memory map may be located on any computing device in a network. The network may be public or private or a combination of both.

Any of the previously explained steps of at least one of receiving, associating, generating and formatting may be performed by a transmission server, the transmission server comprising a processor and a memory, wherein the processor is configured to perform the at least one of receiving, associating, generating, and formatting steps. The method may include transmitting data from the at least one of the receiving, associating, generating and formatting over a communication channel to the computing device. In the method, the communication channel may be selected from the group consisting of a wireless communication channel, a wired communication channel, or combination thereof.

Computing device 100 may access the three-dimensional model to render the display. Computing device renders a display depending on the geospheric direction and geolocation of the computing device. The foregoing memory map of the geospheric direction and geolocation associations of documents, files, application, or combinations thereof may reside on a server 1110 or other computing device which can provide mapping information to a computing device over a network. The information may be provided to computing device in any suitable format. The information can include information in HTML code, XML messages, WAP code, Java applets, xhtml, plain text, voiceXML, VoxML, VXML, or other suitable format. The computing device 110 may display the information to the user in any suitable format. In one embodiment, the information can be displayed within a browser, such as Google Chrome or other suitable browser.

Operation

In a first illustrative embodiment, an iPhone was used as the computing device. An application Dweet My Phone application by Bug Labs was downloaded onto the iPhone to generate the orientation data on the mobile device. The Dweet My Phone application captures a variety of different 'sensors', ranging from phone brightness level, to phone orientation data, and GPS information. Once connected, the data can be visualized and shared. Dweet My Phone application allows the iPhone to be used as a data source allowing a user to use each sensor as he pleases. Below is the data generated by one illustrative embodiment.

Figure 12:
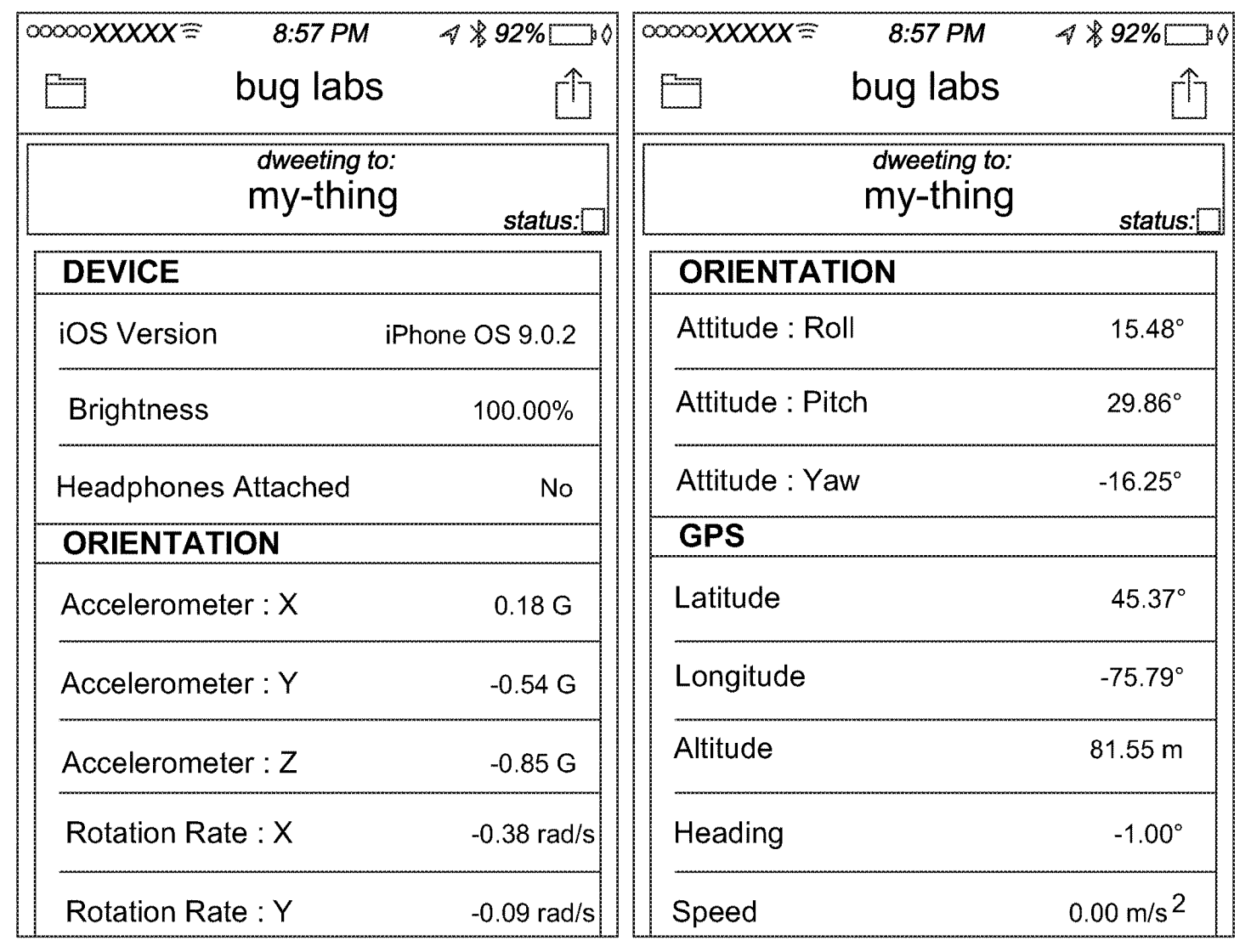

In this example, the attitude, pitch, and roll data provide the geospheric orientation of the phone. In this example, the iPhone is so oriented that its geospheric coordinates of latitude, longitude, and altitude are 45.37°, −75.9°, 81.5°, respectively, as shown in FIG. 12. The metaphor application of this disclosure causes the processor of the mobile computing device to compare these coordinates to a listing of geospheric coordinates appearing in the memory map for the metaphor object information library of the metaphor object engine & information library 410 previously described. On finding a match, the metaphor application causes the processor to access the document, file, application, data, or combination thereof that is associated with geospheric coordinates 45.37°, −75.9°, 81.5° and renders the document, file, application, data, or combination thereof on the display of the mobile computing device.

FIG. 12 illustrates other data that may be used to represent geospheric direction. The documents, files, applications, data or combinations may be associated with geospheric direction determined using any geospheric direction data in the practice of this disclosure. Advantageously, the geospheric orientation of the iPhone is illustratively used to configure, command and control the document, file, application, data, or combination thereof that is displayed on the mobile computing device.

Figure 13:
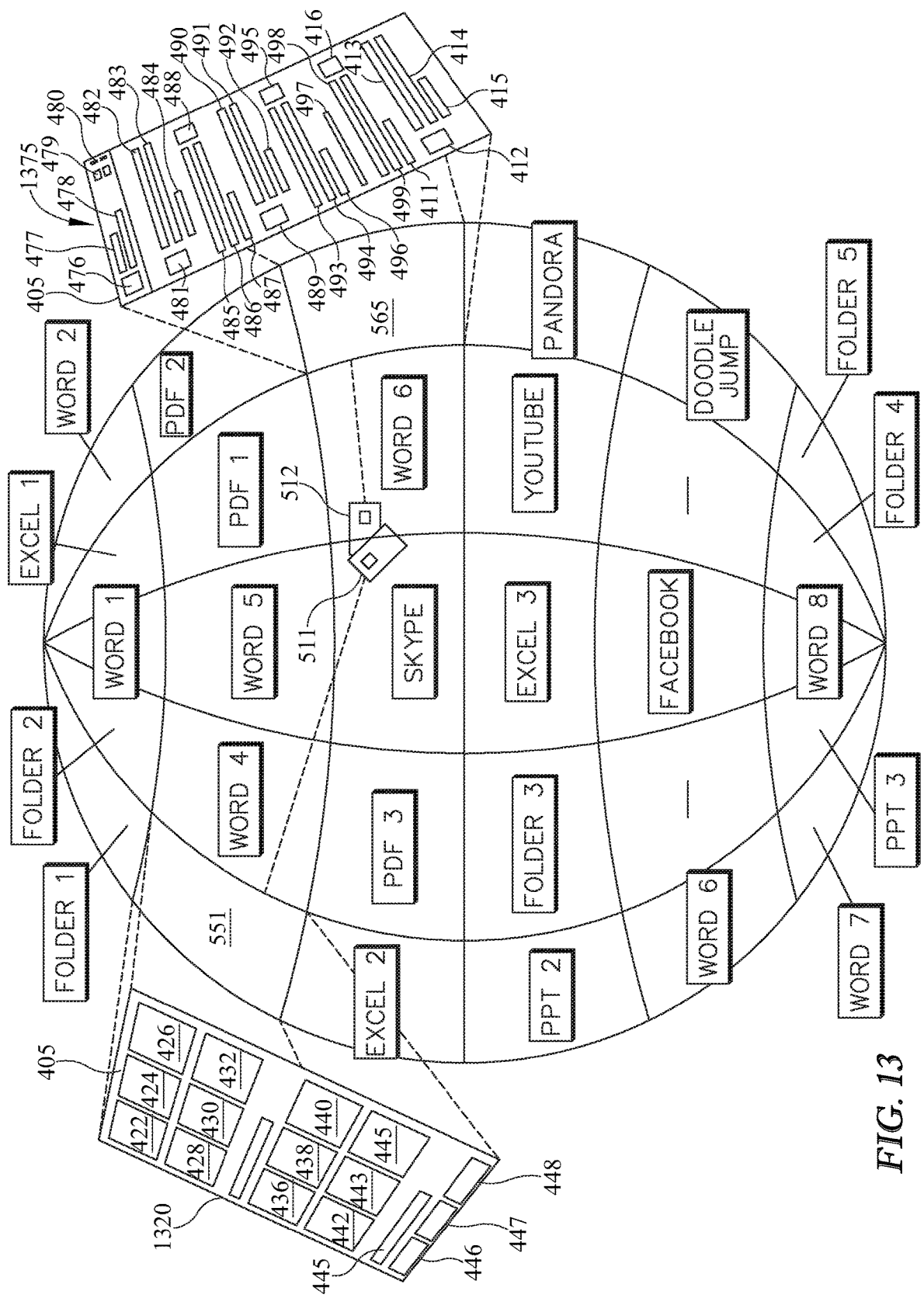
FIG. 13 visualizes how the metaphor of this disclosure displays documents, files, applications, or combinations.

FIG. 13 visualizes how the metaphor of this disclosure displays documents, files, applications, documents, or combinations thereof. FIG. 13 depicts a computing device pointing in a first geospheric direction 511 toward point 551 on the sphere used by the illustrative metaphor to organize the documents, files, applications, documents, or combinations thereof and is pointing in a second direction 512 toward point 565 on the surface of the sphere. When pointed at geospheric direction 511, the metaphor application of this disclosure causes the metaphor application to render presentation object 1320 on display 401 of the computing device. In contrast, when pointed in geospheric direction 512, the metaphor application causes presentation object 1375 to be displayed.

In an alternative embodiment, the disclosure makes use of the device orientation API specified by W3C, which is short for the World Wide Web Consortium. In this example, a web-enabled mobile device is enabled to determine its orientation; that is, they can report data indicating changes to their orientation with relation to the pull of gravity. In particular, the *W3C specification of the Device Orientation API* the API defines several new DOM events that provide information about the physical orientation and motion of a hosting device. The data provided by the API is obtained from various sources, such as the device's gyroscope, the accelerometer, and the compass. This differs from device to device, depending on which sensors are available.

There are two JavaScript events that handle orientation information. The first one is the DeviceOrientationEvent, which is sent when the accelerometer detects a change to the orientation of the device. By receiving and processing the data reported by these orientation events, this disclosure interactively responds to rotation and elevation changes caused by the user moving the device. The geospheric direction generated by the DeviceOrientEvent is used to determine which file or application the processor is to render on the mobile computer display.

In one typical operation, the event is fired on the window object, which means that the user needs to attach a handler to the window object. After registering the event listener (in this case, a JavaScript function called handleOrientation( )), the listener function periodically gets called with updated orientation data. The orientation event contains four values:
1. DeviceOrientationEvent.absolute
2. DeviceOrientationEvent.alpha
3. DeviceOrientationEvent.beta
4. DeviceOrientationEvent.gamma The event handler function may look something like this:
1. The deviceorientation event is fired when the accelerometer detects a change of the device orientation. The user listens for this event and respond to any changes by attaching an event handler to the window object. When the event handler is invoked, it will receive one argument of type DeviceOrientationEvent, which contains four properties:
2. alpha is the angle around the z-axis. Its value ranges from 0 to 360 degrees. When the top of the device points to the True North, the value of this property is 0.
3. beta is the angle around the x-axis. Its value range from −180 to 180 degrees. When the device is parallel to surface of the Earth, the value of this property is 0.
4. gamma is the angle around the y-axis. Its values ranges from −90 to 90 degrees. When the device is parallel to the surface of the Earth, the value of this property is 0.
5. absolute specifies whether the device is providing orientation data that's relative to the Earth's coordinate system, in which case its value is true, or to an arbitrary coordinate system.

So After registering the user's event listener (in this case, a JavaScript function called handleOrientation( )), the listener function periodically gets called with updated orientation data. The deviceorientation event, which the code is listening for, is fired when the device orientation changes. When this event is fired, the event handler, deviceOrientationListener( ) is invoked. A DeviceOrientationEvent object is the only argument passed to the handler. The previously mentioned alpha, beta, and gamma angles are defined as properties of the DeviceOrientationEvent.

The geospheric coordinates passed to the event handler for the deviceorientation event are applied to a web app that utilizes the device orientation according to this disclosure. In particular, the web app takes these coordinates to a listing of geospheric coordinates appearing in the memory map of the metaphor object engine & information library 410. On finding a match, the processor accesses the document, file, application, data or combination thereof that is associated with geospheric coordinates and renders the document, file, application, data or combination thereof on the display of the mobile computing device. Hence, the geospheric orientation of the iPhone is illustratively to configure, command and control the user interface that is displayed on the mobile computing device.

Hence, the metaphor application utilizes device orientation to display a document, file, application, data or combination thereof on the display of the mobile computing device. This application displays documents, files, applications, data, or a combination thereof on the display of the computing device according to the association of those files and applications to the geopspheric direction. The display on the mobile computing device changes in accordance the values of alpha, beta, and gamma.

The foregoing examples illustrate how information from accelerometers, rate gyros, and (in some cases) GPS taken from for example sensors 120 (see FIG. 1) may produce reliable geospheric measurements that are resistant to vibration and immune to long-term angular drift in accomplishing the purposes of the disclosure.

In another embodiment, geolocation data is used to expand the functionality of this disclosure. In this example, GPS latitude and longitude coordinate data are associated with the files and applications residing in the memory map. As the iPhone moves to a GPS location, GPS data provides a GPS location for the iPhone. In the example of FIG. 12, the GPS latitude and longitude coordinate data are 45.37 and −75.79. As previously described, the attitude, pitch, and roll data provide the geospheric orientation of the phone. In this example, both the geolocation and geospheric direction are used by the processor in determining the file and application to display. Specifically, the metaphor application of this disclosure may cause the processor of the computing device to compare the geolocation coordinate and the attitude, pitch, and roll coordinates to a listing of geolocation, attitude, pitch, and roll coordinates appearing in a memory map of the metaphor object engine & information library 410. On finding a match, the processor accesses the document, file, application, data or combination thereof that is associated with geolocation data 45.37 and −75.79 and geospheric coordinates 45.37°, −75.9°, 81.5° and renders the document, file, application, data or combination thereof on the display of the computing device.

In an alternative embodiment, a Geolocation API in the device orientation API specified by W3C allows you to pinpoint the user's location using the positioning capabilities of their device. Most of the time this will be done using GPS, but less accurate methods, such as WiFi-based positioning, may also be used. As in the previous example, the processor of the computing device compares the geolocation coordinate and the attitude, pitch, and roll coordinates to a listing of geolocation, attitude, pitch, and roll coordinates appearing in a memory map. On finding a match, the metaphor application causes the processor to access the file or application that is associated with geolocation data 45.37 and −75.79 and geospheric coordinates 45.37°, −75.9°, 81.5° and renders the file or application on the display of the computing device. Hence, the geospheric orientation of the iPhone may be used to configure, command and control the user interface that is displayed on the computing device.

Once the geospheric direction and/or geolocation of the computing device are known, the metaphor application of this disclosure uses that geospheric and/or geolocation to locate the document, file, application, data or combination thereof and display that document, file, application, data, or combination thereof on a display of the computing device. The metaphor application may further associate the document, file, application, data, or combination thereof with a point on the surface of a solid geometrical figure in three-dimensional Euclidean space that the metaphor may use to organize documents, files, applications, data or any combination thereof.

Figure 14A:
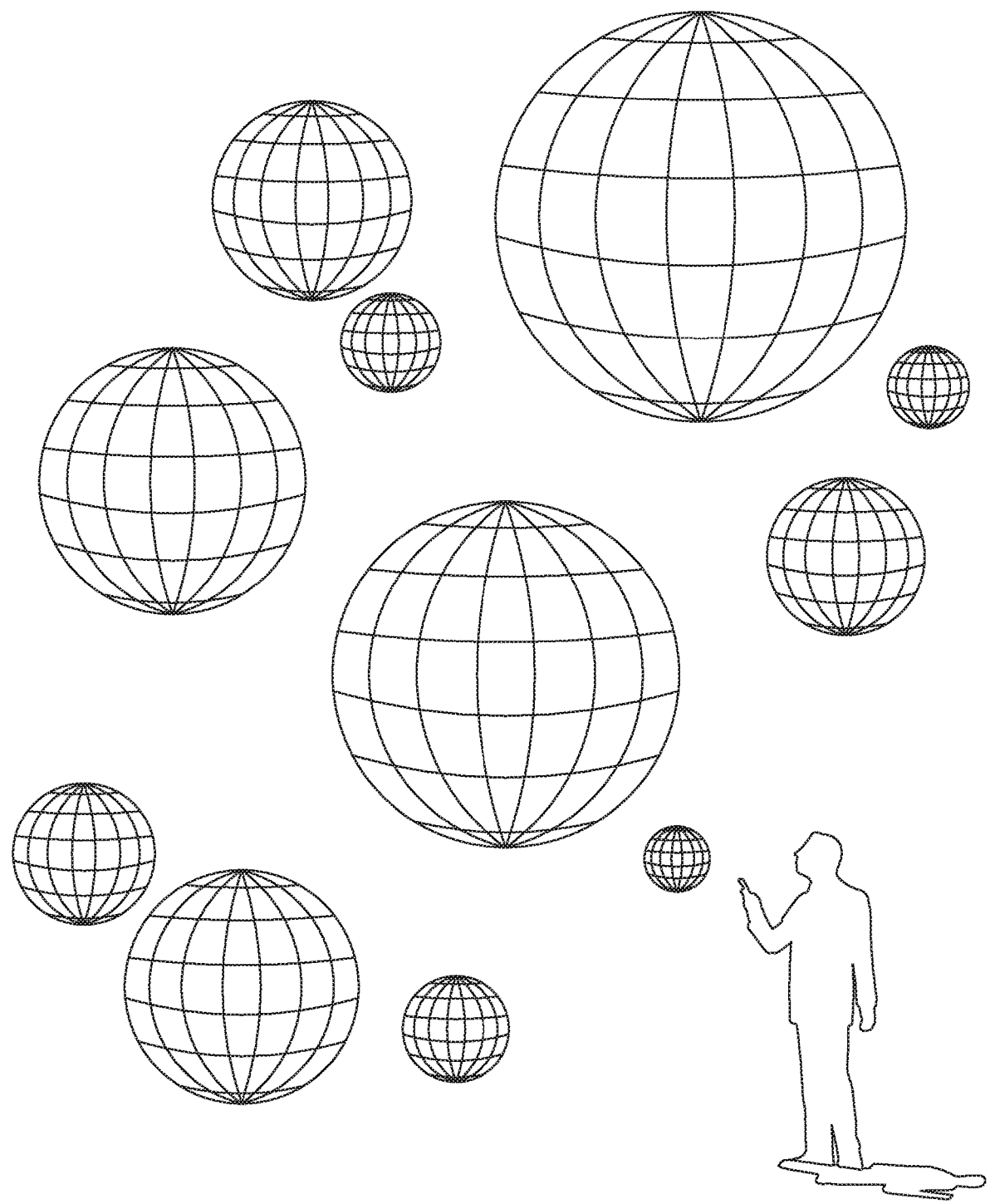
FIGS. 14A-F depict a user surrounded by a universe of spheres or bubbles.
Figure 14B:
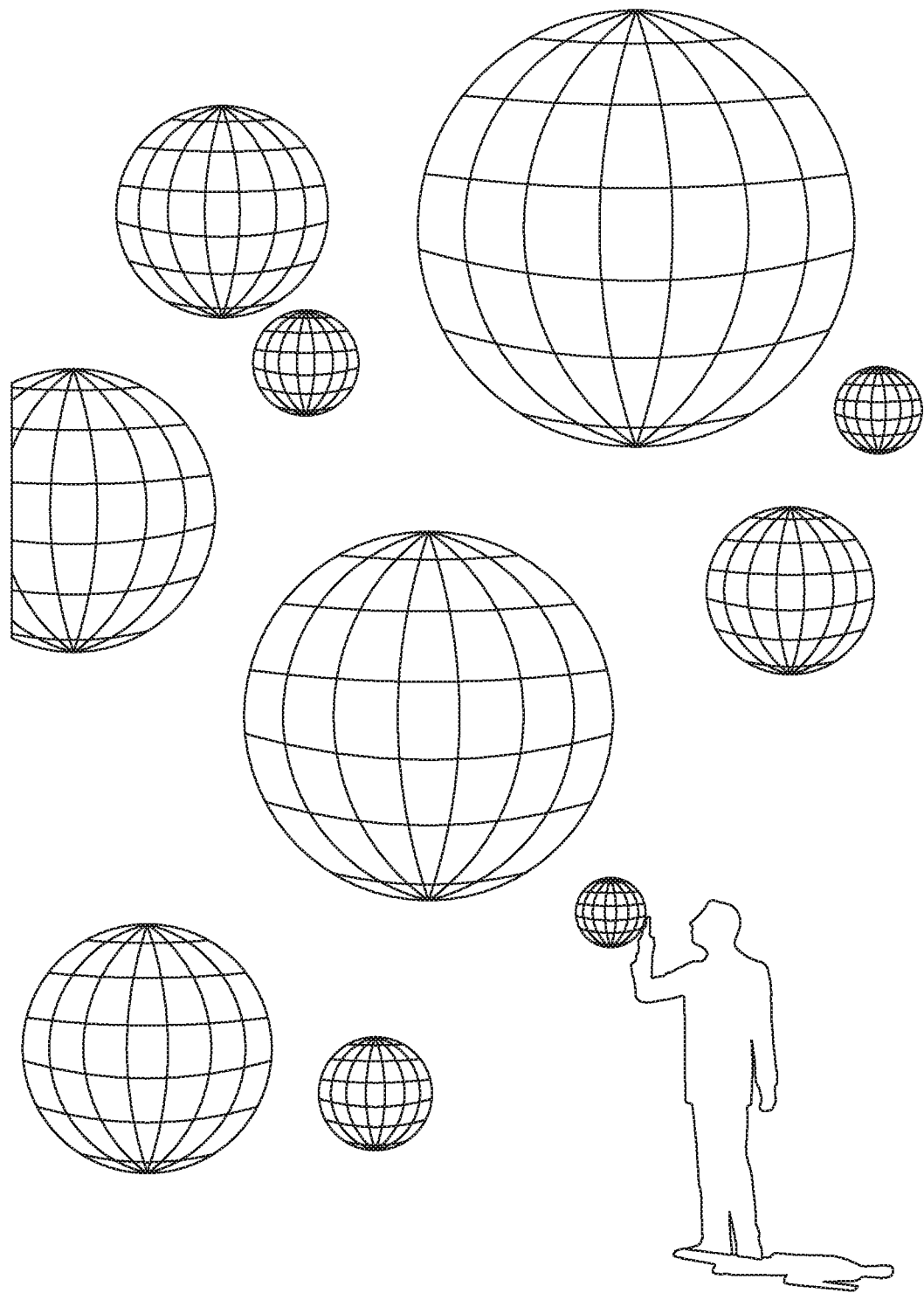
Figure 14C:
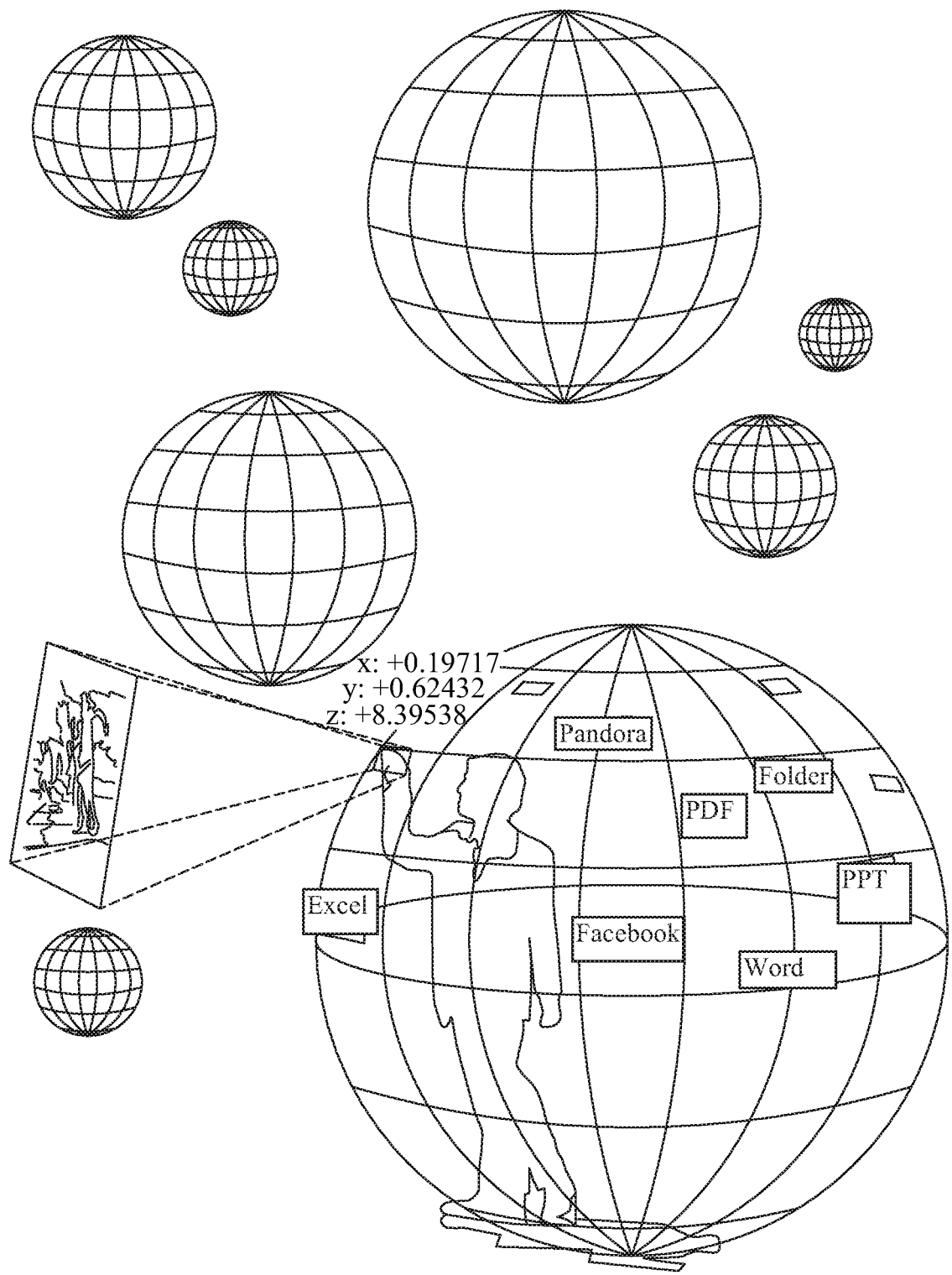

FIGS. 14A-F depict a user surrounded by a universe of spheres or bubbles generated by the metaphor of this disclosure. In FIGS. 14A-F, the metaphor is organizing a plurality of documents, files, applications, documents or any combination thereof on surfaces of a plurality of solid geometrical figure in three-dimensional Euclidean space depicted as the plurality of bubbles in FIGS. 14A-F. In FIG. 14B, a user has activated one of the bubbles in the universe of bubbles managed by the metaphor application of this disclosure. In FIG. 14C the user has pointed his computing device in a specific geospheric direction. The point on the surface of the sphere in FIG. 14C has been associated with a Netflix movie application which is streaming a movie. So long as the user maintains the geospheric direction of the computing device in the indicated direction, the user may view the movie associated with the indicated position on the bubble. As discussed later, the user may employ a lock feature of this disclosure to keep the Netflix movie streaming on the display of the computing device even when the computing device is pointed away from the indicated point toward another geospheric direction.

Figure 14D:
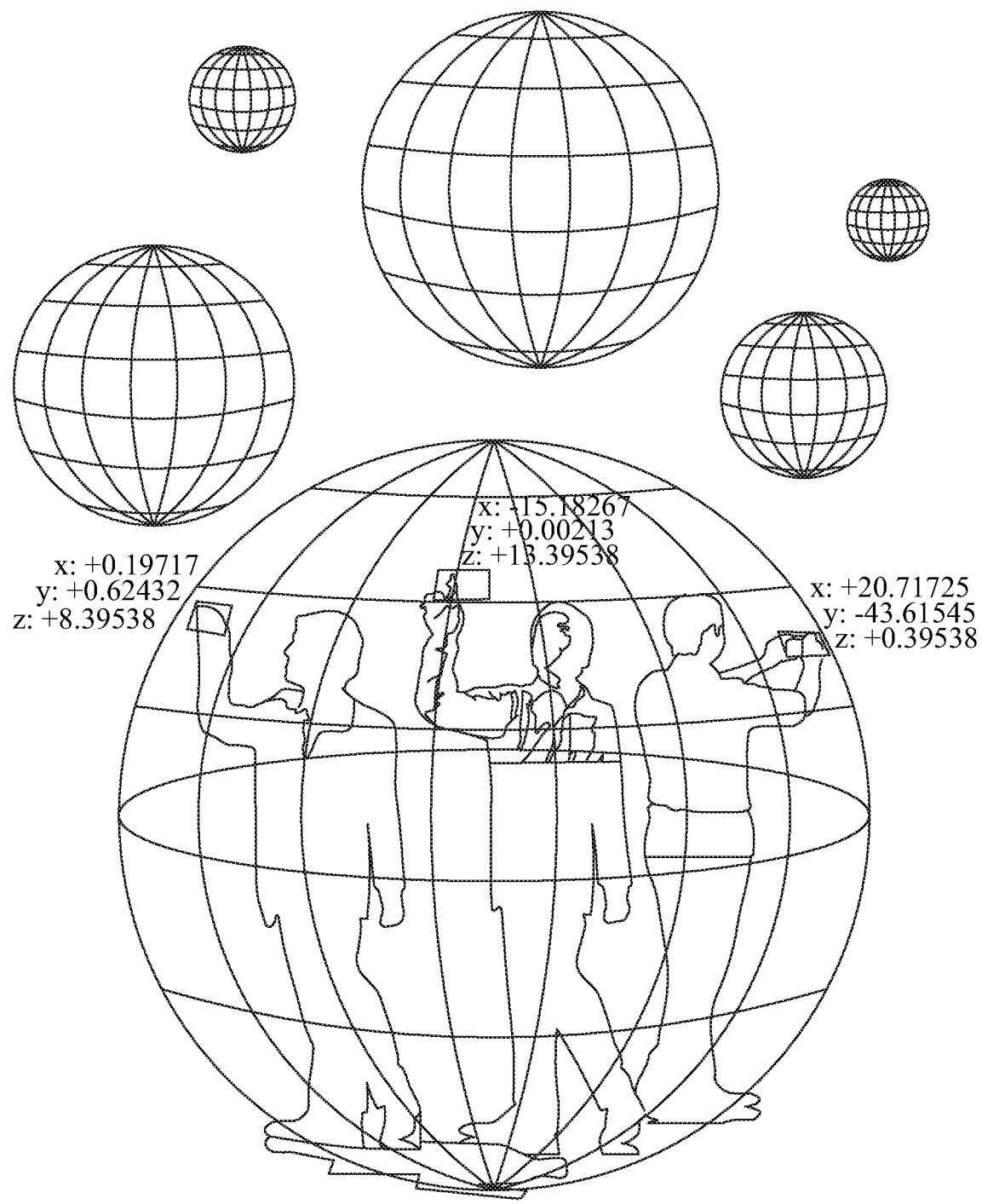

FIG. 14D shows the different geospheric directions a user may point the computing device each of which may have associated therewith a particular document, file, application, or combination thereof according to the teachings of this disclosure.

Figure 14E:
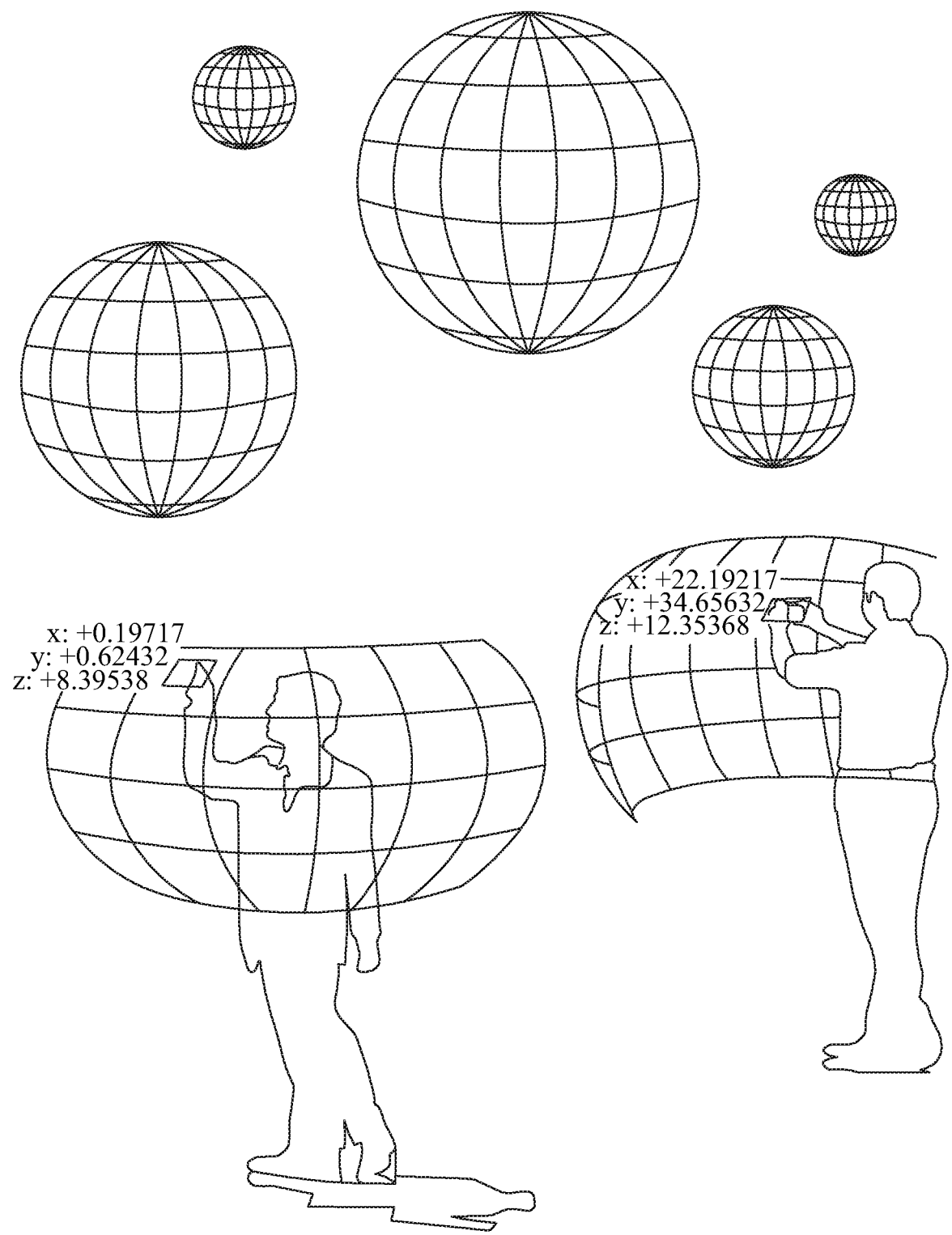

FIG. 14E shows a user manipulating the presentation object associated at two different points on the surface of the bubble. The FIG. shows what is happening virtually in the bubble that the metaphor is managing and on which the user is operating in this example. In the real world, the user would see the presentation object depicted in FIG. 14E on the display of this computing device. In the real world, the user may be manipulating the presentation as it is rendered on the display of the computing device since in the real world, the presentation object associated with the point on the surface of the sphere associated with the geospheric direction of the computing device is what gets generated, formatted, and rendered on the display of the computing device by the metaphor application of this disclosure. So the manipulations of the presentation object shown in FIG. 14E while occurring in the virtual world created by the metaphor application, at the same time the manipulations occurs on the real time renderings of the presentation object that the metaphor application generates, formats, and causes to be rendered on the display of the computing device.

Figure 14F:
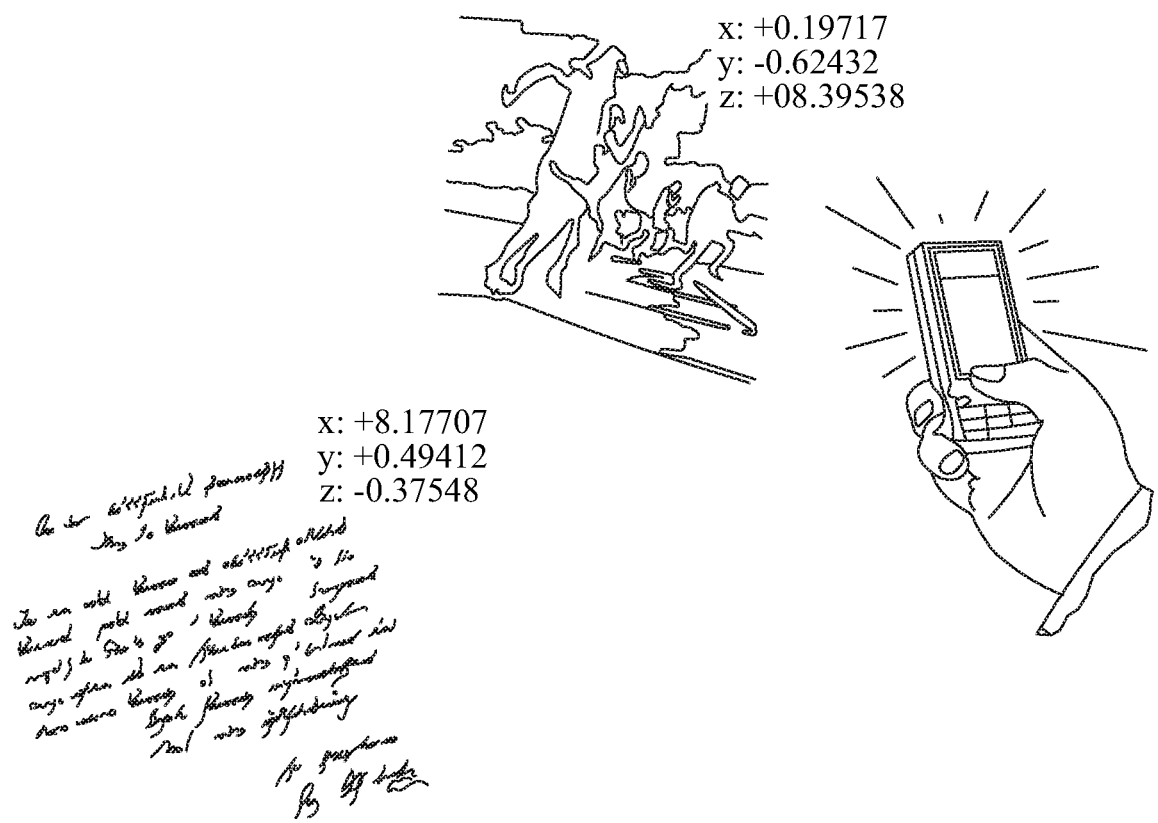

FIG. 14F illustrates illustrative presentation objects that a user sees on the display of his computing device and the manipulations the user may make to the displayed presentation objects.

Figure 15:
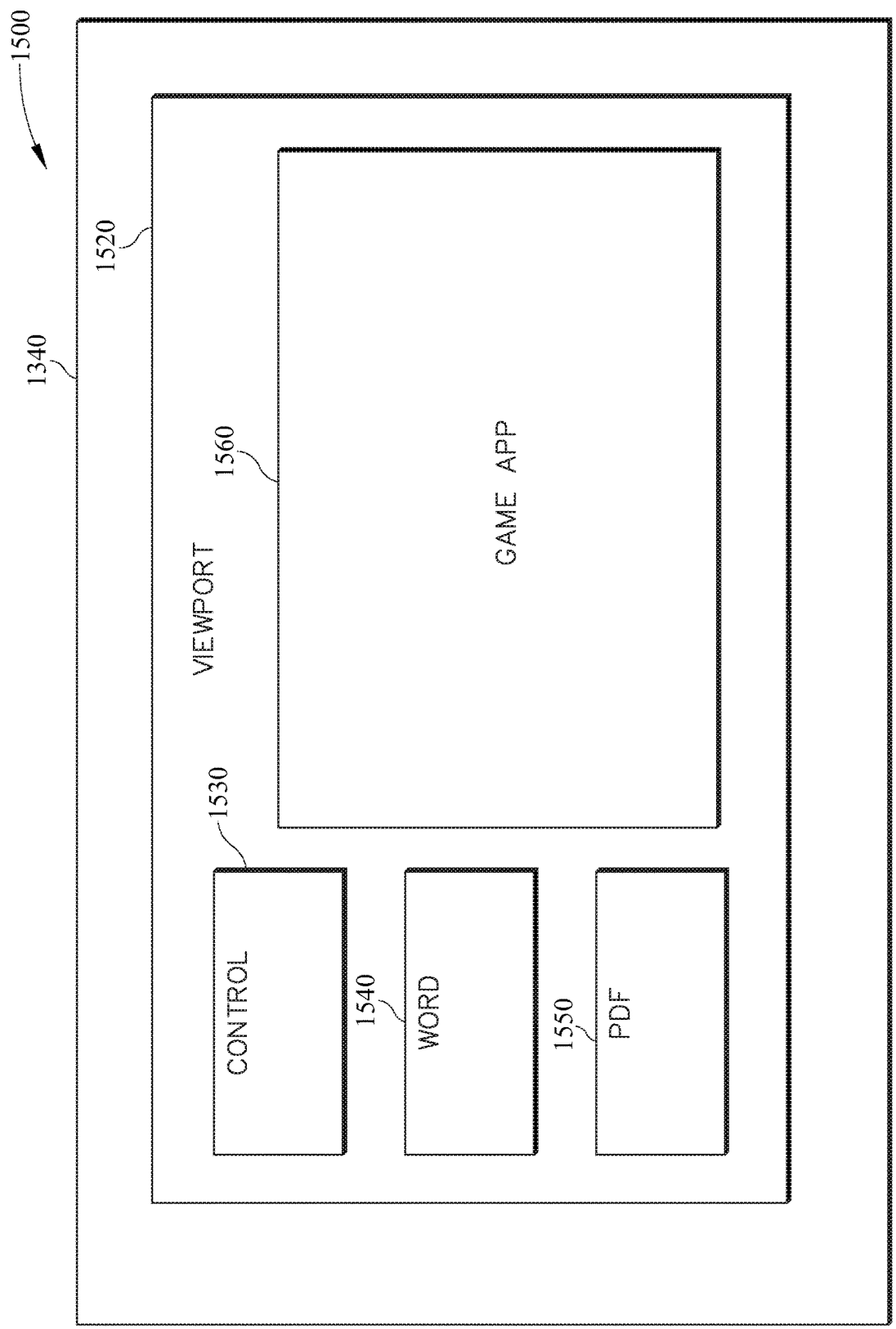
FIG. 15 shows an illustrative example how a metaphor application causes the presentation object to be rendered on the display of the computing device when the computing device is pointing in the geospheric direction associated with the presentation object.

FIG. 15 shows an illustrative example how a metaphor application causes the presentation object to be rendered on the display of the computing device when the computing device is pointing in the geospheric direction associated with the presentation object. The presentation object is displayed on a display 1520 of the computing device. The components of the presentation shown includes a control window 1530 and an arrangement of a word document 1540, a pdf document 1550, and a game application 1560.

Figure 16:
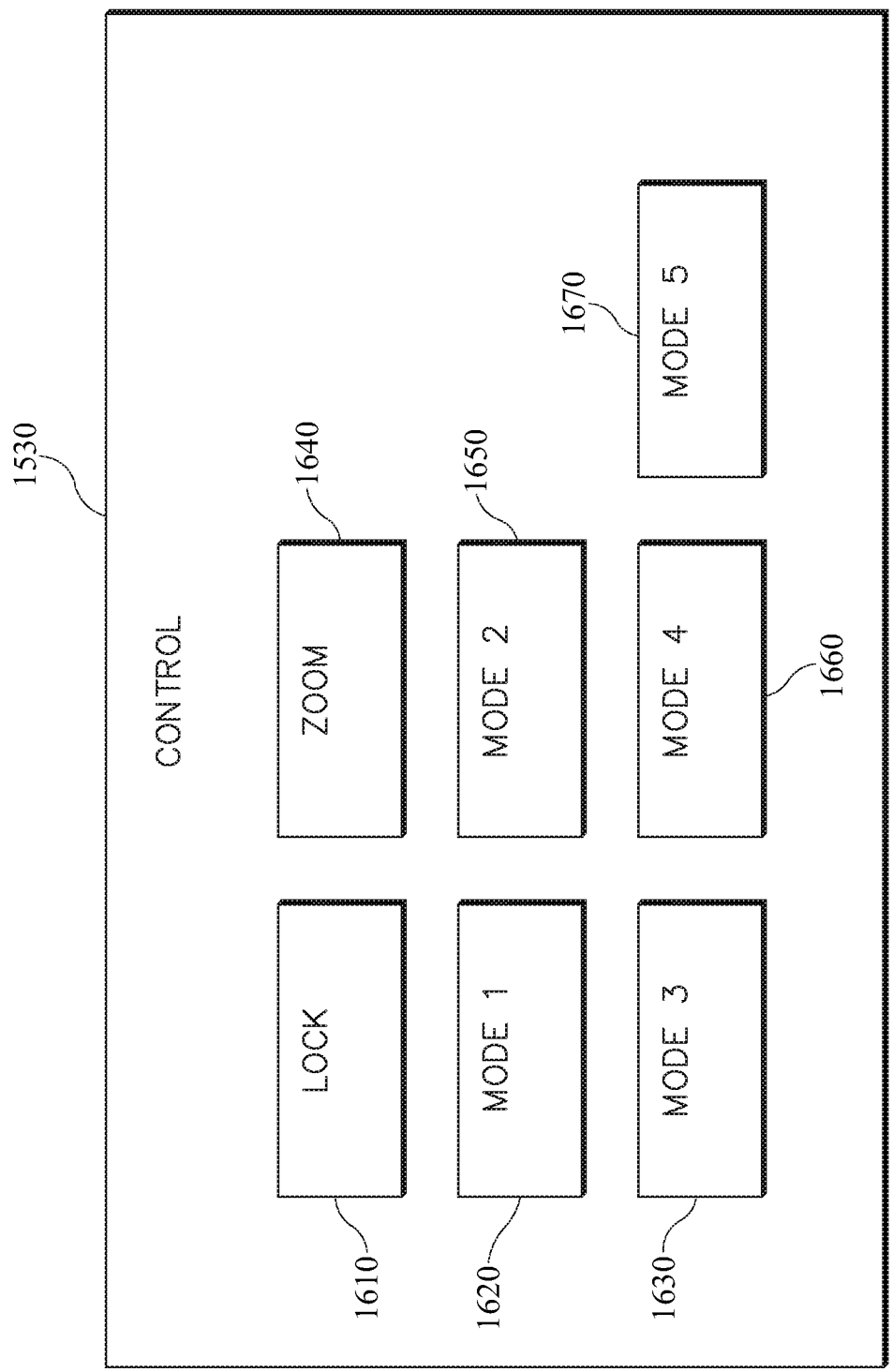
FIG. 16 depicts an illustrative control window 1430 comprising an active lock button or region 1510, mode 1, 2, 3, 4 and 5 buttons or regions 1520, 1530, 1550, 1560, 1570, and a zoom button or region 1540.

FIG. 16 depicts an illustrative control window 1530 comprising an active lock button or region 1610, mode 1, 2, 3, 4 and 5 buttons or regions 1620, 1630, 1650, 16560, 1670, and a zoom button or region 1640.

Figure 17:
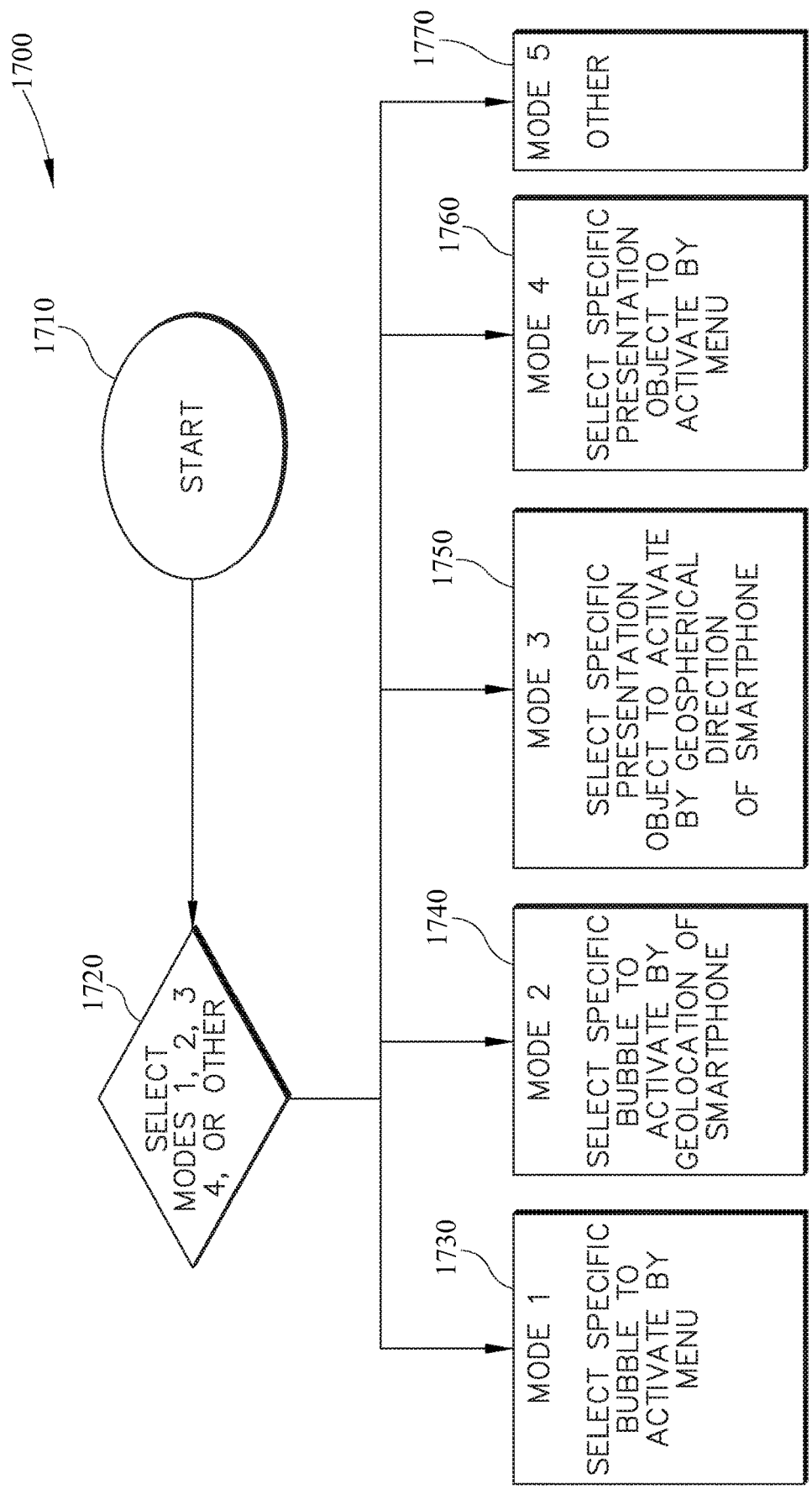
FIG. 17 illustrates a process 1700 for navigating to a bubble and to a presentation object within a bubble.

FIG. 17 illustrates a process 1700 for navigating to a bubble and to a presentation object within a bubble. The process begins at Start 1710 and advances to a selection 1720 of modes 1, 2, 3, 4, or other. If mode 1 1730 is selected, the user may select a specific bubble to activate by menu. If the user selects mode 2 1740, the user selects a specific bubble to activate by geolocation. For example, his present location may be geolocation A which may be associated with a bubble A. If bubble X is associated with geolocation X, the user may then walk to geolocation X in order to access bubble X. Effectively, the metaphor application of this disclosure may use geolocations to create cities of documents, files, applications, data, and combinations thereof. Each geolocation address in the city may be a single bubble like a house or an arrangement of bubbles like a cul-de-sac or high rise. With a cul-de-sac the metaphor may associate a house address to each bubble located on a particular street. With an apartment, the metaphor may associate apartment addresses to each floor of the vertical stack of bubbles located on a particular street.

If the user selects mode 3 1750, the user selects a presentation object by geospheric direction of the computing device. If the user selects mode 4 1760, the user selects a presentation object in a specific bubble by menu. If the user selects mode 5 1770, the user may select a bubble and/or a presentation object within a specific bubble by audible, gesture or other commands.

Figure 18:
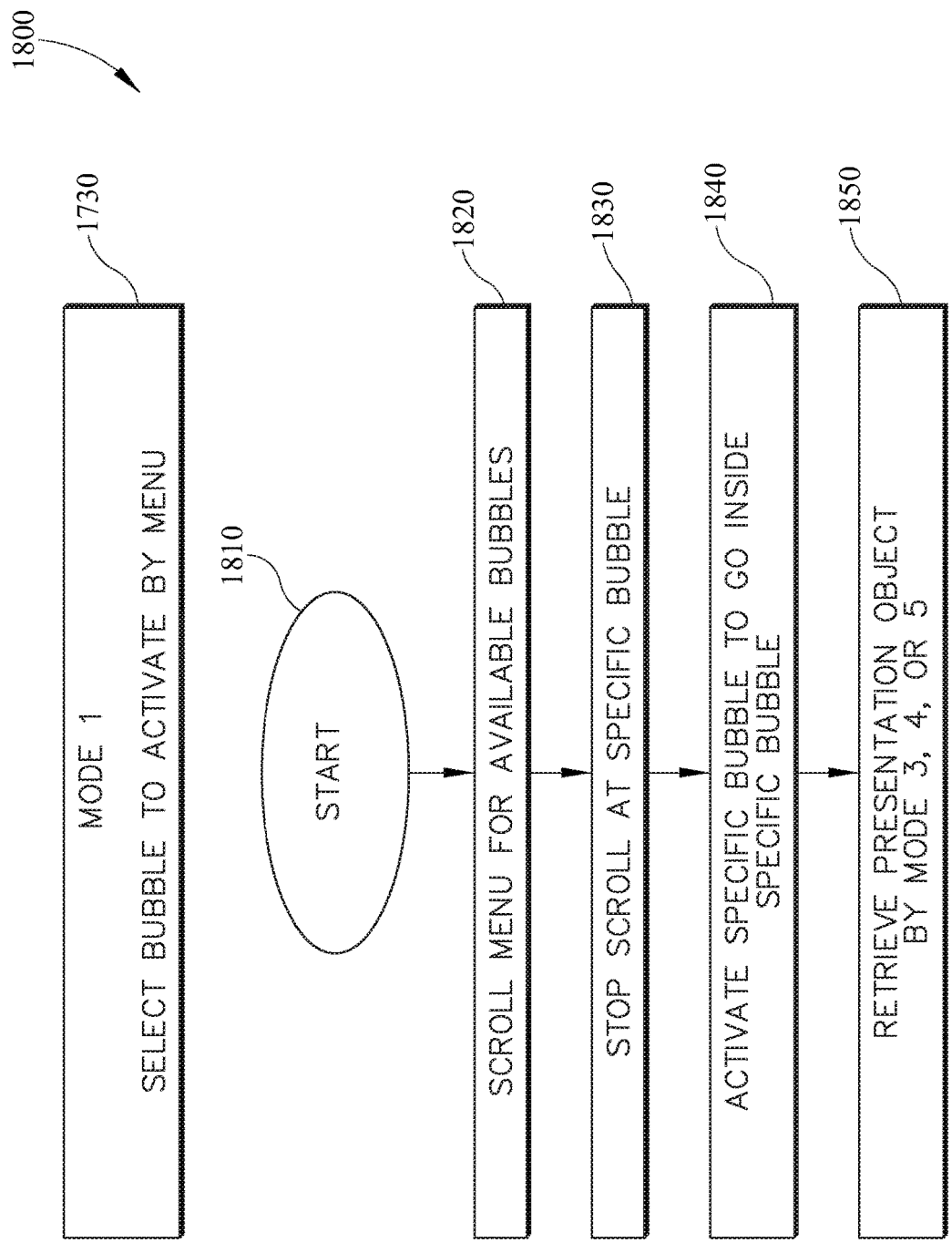
FIG. 18 illustrates a process 1800 for mode 1 1730 selection of bubble to activate by menu. The process begins at Start 1810.

FIG. 18 illustrates a process 1800 for mode 1 1730 selection of bubble to activate by menu. The process begins at Start 1810. The user scrolls 1820 the menu for available bubbles. At step 1830, the user stops scrolling at a specific bubble. At step 1840, the user activates the specific bubble to go inside that bubble. At step 1850, the user retrieves a presentation object in the selected bubble by activation of modes 3, 4, or 5, for example.

Figure 19:
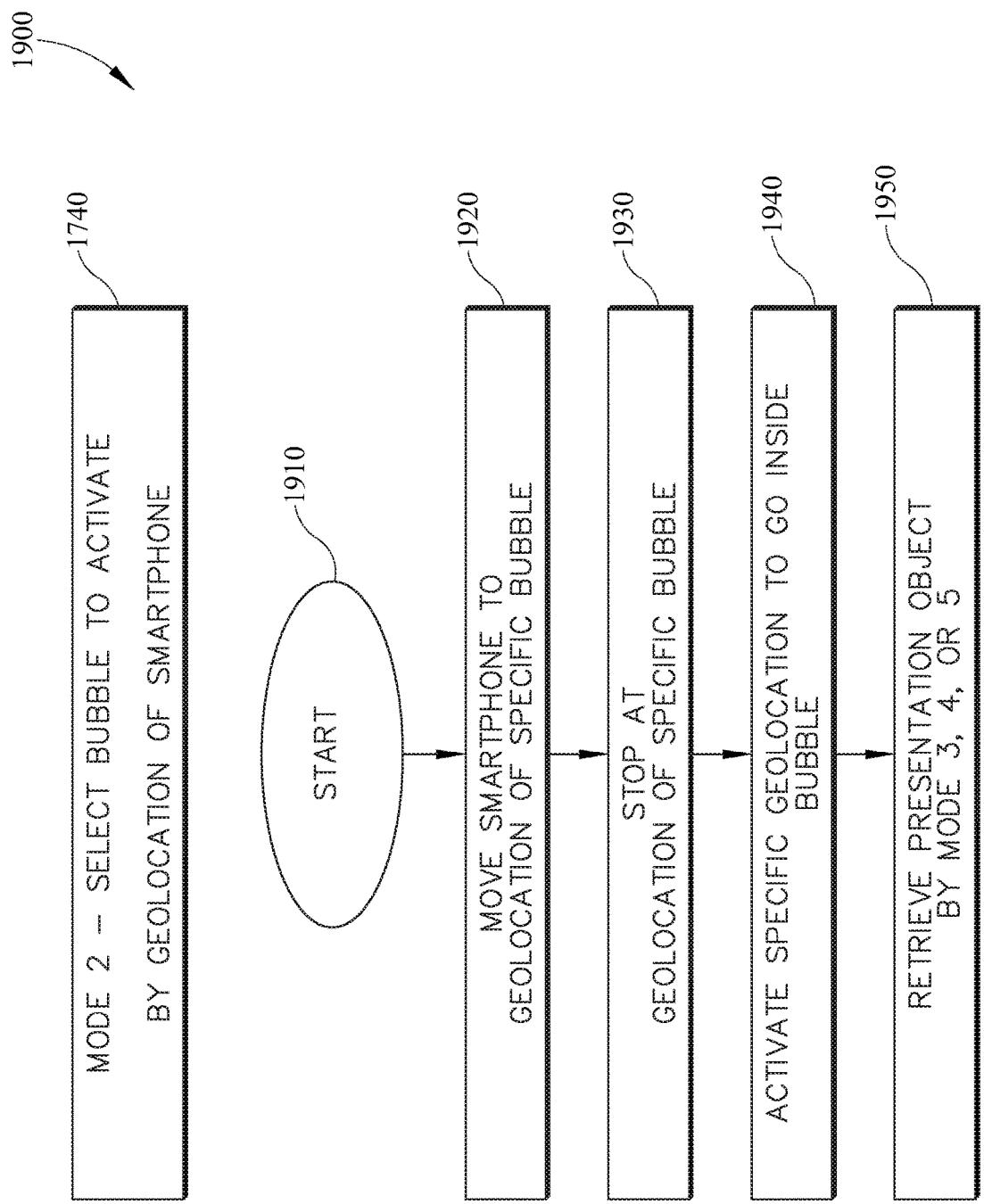
FIG. 19 illustrates a process 1900 for mode 2 1740 selection of a bubble by geolocation of a computing device.

FIG. 19 illustrates a process 1900 for mode 2 1740 selection of a bubble by geolocation of a computing device. The process begins at Start 1910. The computing device is moved 1920 to a specific geolocation of the specific bubble. At step 1930, the user stops at the geolocation of the specific bubble. At step 1940, the user activates the specific bubble to go inside that bubble. At step 1950, the user retrieves a presentation object in the selected bubble by activation of modes 3, 4, or 5, for example.

Figure 20:
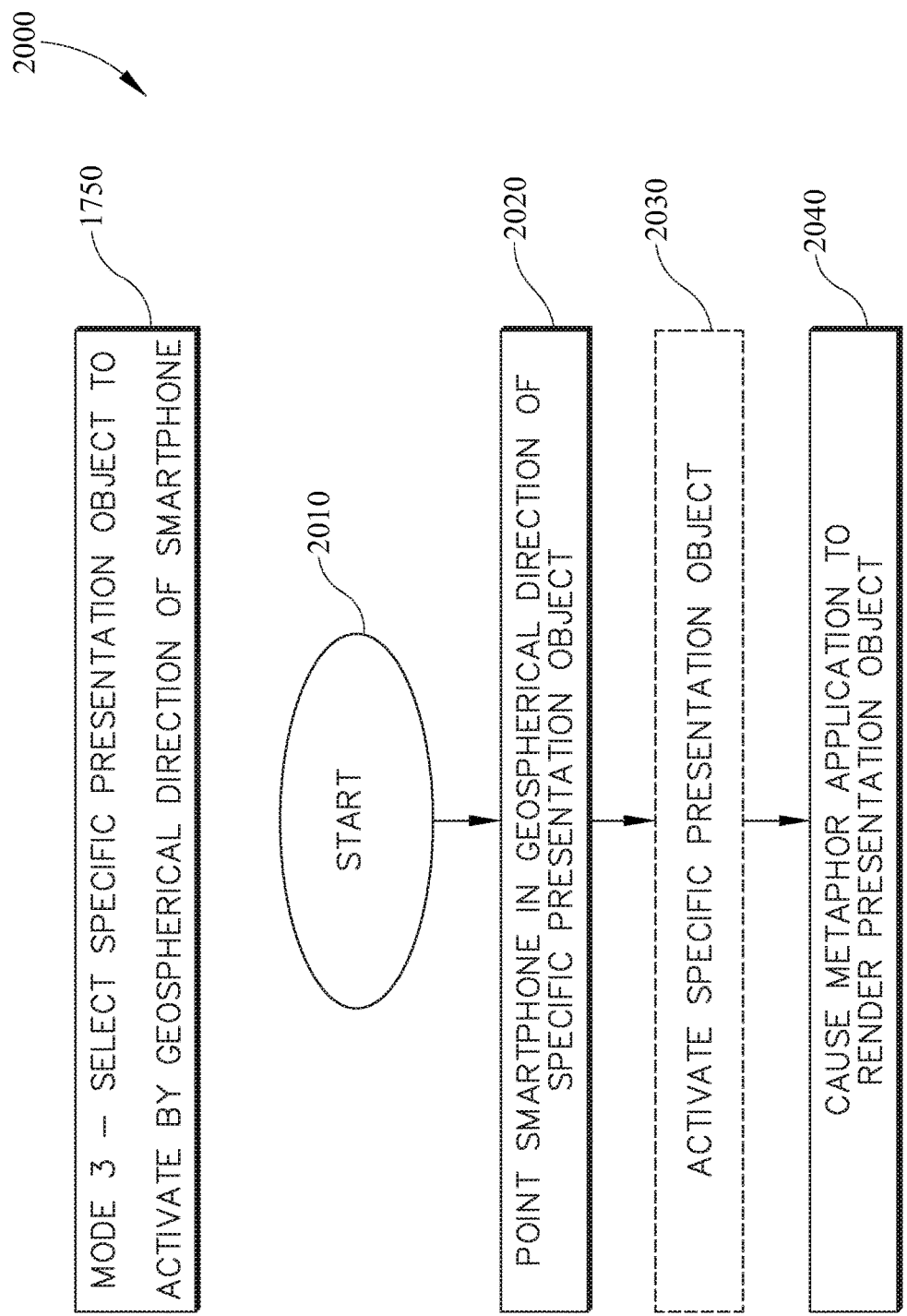
FIG. 20 illustrates a process 2000 for mode 3 1750 selection of presentation object by geospheric direction of computing device.

FIG. 20 illustrates a process 2000 for mode 3 1750 selection of presentation object by geospheric direction of computing device. The process begins at Start 2010. At step 2010, the computing device is pointed in a geospheric direction of a desired presentation object. Step 2020 is optional to allow a user to activate the presentation object identified by the geospheric direction of the computing device. Thus, for example, if the geospheric locating of a presentation object is sensitive, this optional feature allows the user to hone in on the precise geospheric direction required for the desired presentation object. At step 2030, the metaphor application is caused to render the presentation object on the display of the computing device.

Figure 21:
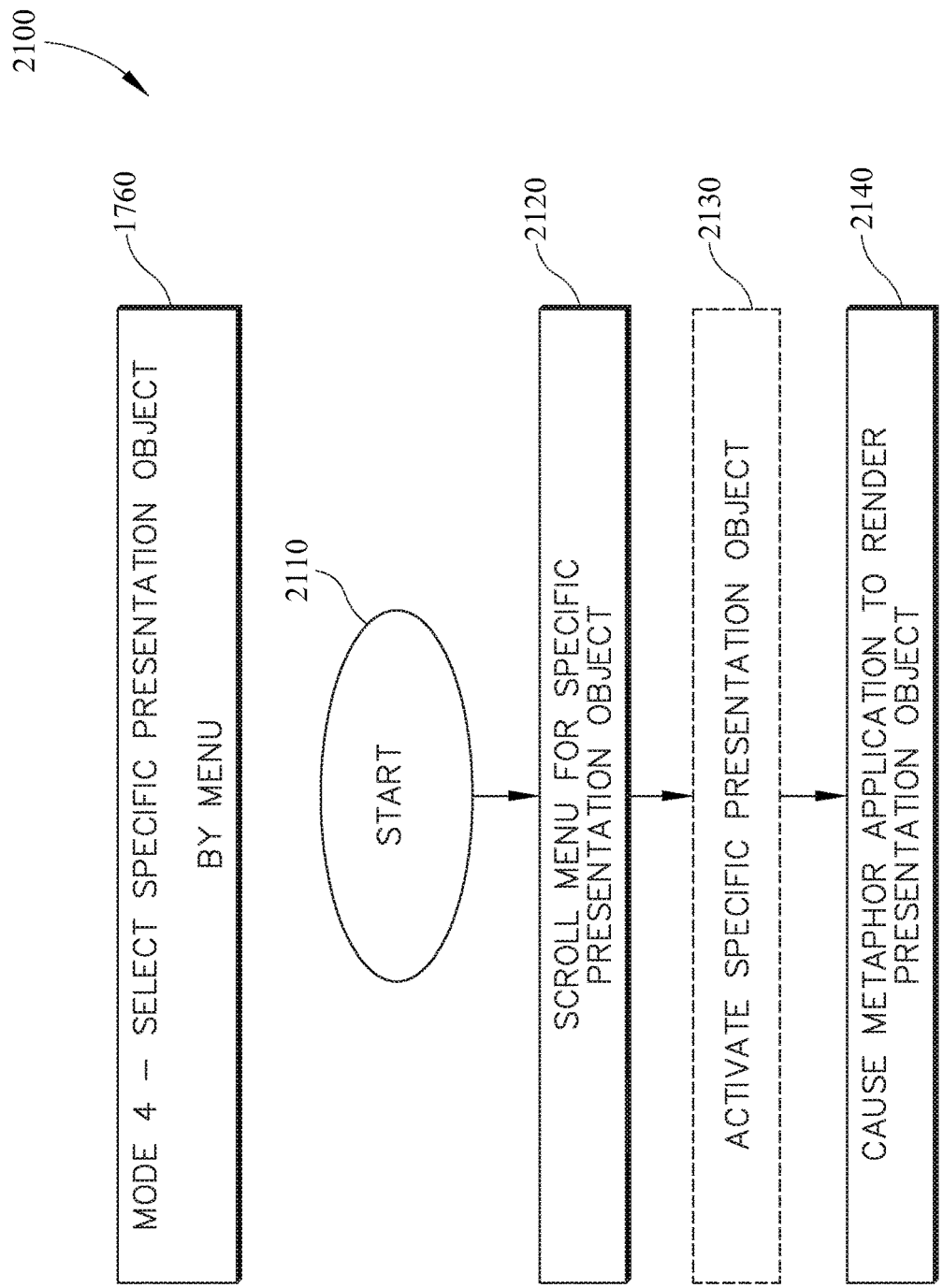
FIG. 21 illustrates a process 2100 for mode 4 1760 selection of presentation object by menu.

FIG. 21 illustrates a process 2100 for mode 4 1760 selection of presentation object by menu. The process begins at Start 2110. At step 2010, the user scrolls menu for desired presentation object. Step 2120 is optional to allow a user to activate the presentation object identified by the geospheric direction of the computing device. Thus, for example, if the menu of a presentation object is sensitive, this optional feature allows the user to hone in on the precise desired presentation object. At step 2130, the metaphor application is caused to render the presentation object on the display of the computing device.

Figure 22:
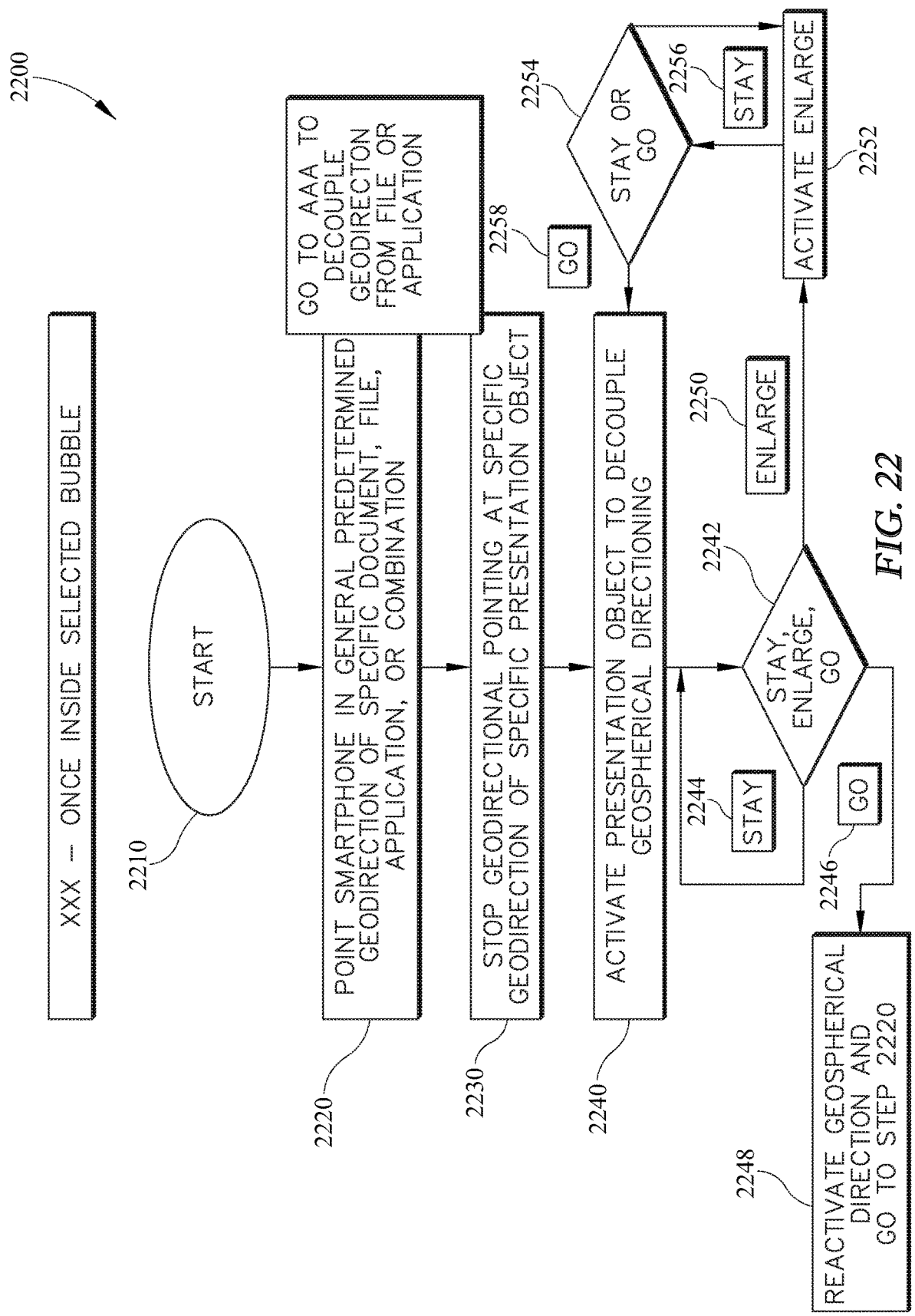
FIG. 22 depicts a process 2200 illustrating other features of this disclosure.

FIG. 22 depicts a process 2200 illustrating other features of this disclosure. The process begins at Start 2210. At step 2220, the computing device is pointed in a geospheric direction associated with a desired document, file, application, data, or combination, that is to say, the desired presentation object. In this example, the metaphor application is rendering presentation objects in real time as the user is pointing in a geospheric direction. At step 2230 the user has located and so stops further movement of the computing device since the computing device is pointing in the direction of the desired presentation object. At step 2240, a user decouples further geospheric renderings of presentation objects which allows the presentation object that was being rendered on the display to continue being displayed. At step 2242, the user may stay 2244 at the presentation object that is continually being displayed or got to step 2248 which reactivates the geospheric renderings which allows presentation objects to once again be rendered on the display according to the geospheric direction of the computing device and returns to step 2220 to allow the user to locate and display other presentation objects based on the geospheric direction of the computing device.

At step 2242, the user may also decide to enlarge 2250 (or make smaller) the presentation object rendered on the display of the computing device. At step 2252, the user may zoom out 2252 (or in) the displayed presentation object. At step 2254, the user may stay 2256 on the zoomed presentation object or return to go 2258 which returns the presentation object to its normal size and returns the process flow to step 2240.

Figure 23:
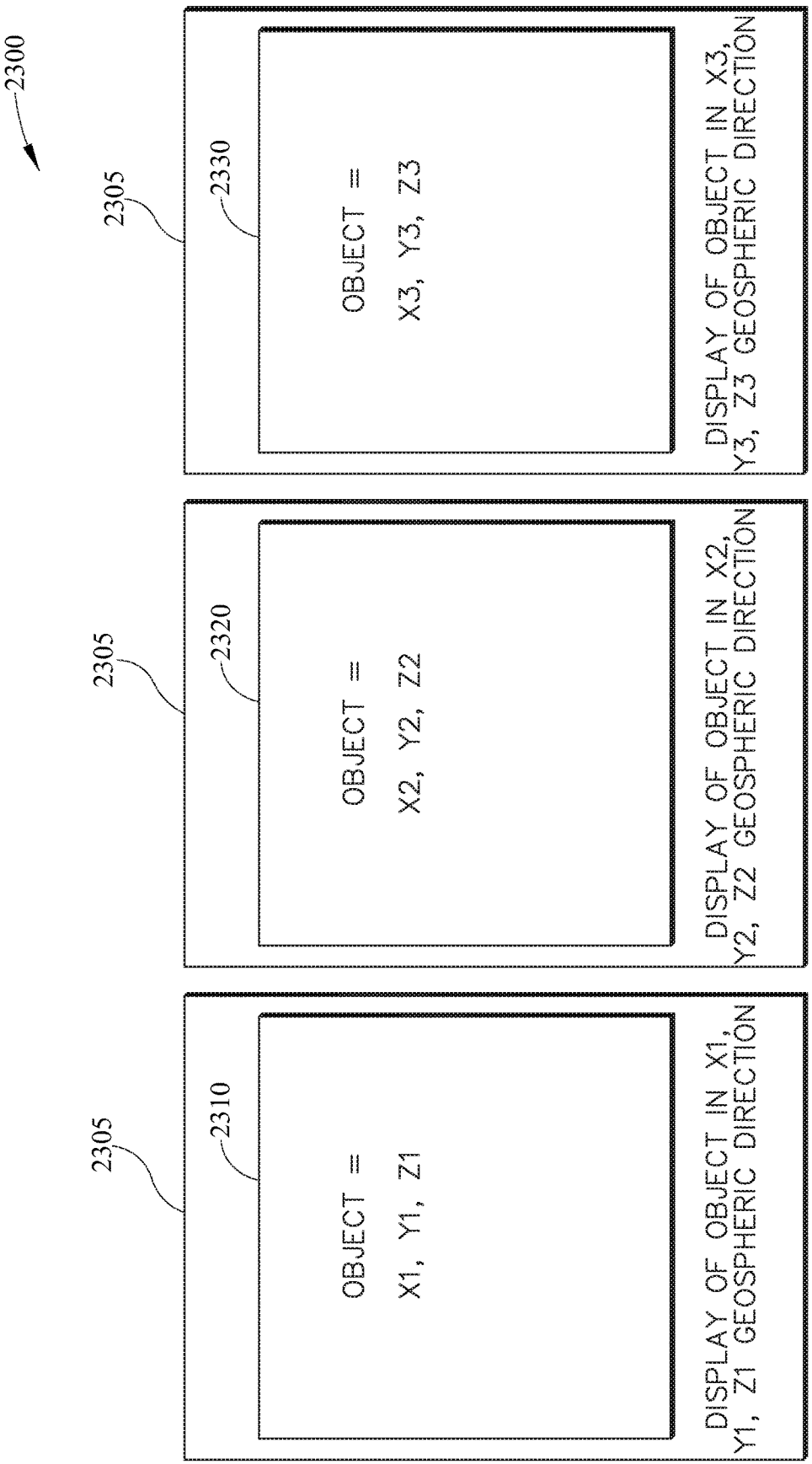
FIG. 23 depicts three different presentation objects rendered on a display of a computing device employing the metaphor application of this disclosure at different times 2310, 2320, and 2330.
Figure 24:
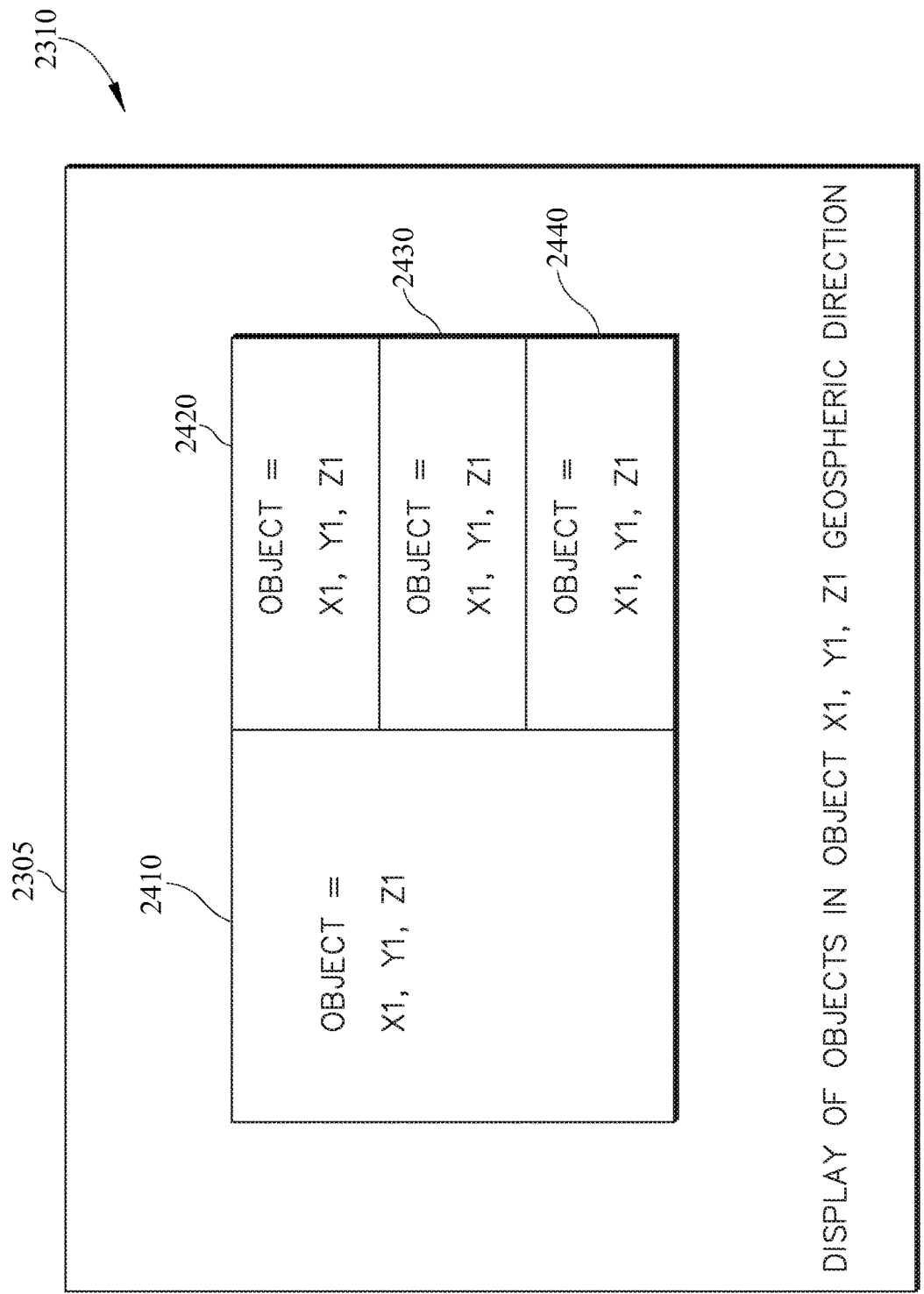
FIG. 24 depicts another embodiment where three objects 2410, 2420, 2430, and 2440 (instead of one object) are rendered on the display when the computing device is facing the X1, Y1, Z1 geospheric direction.
Figure 25:
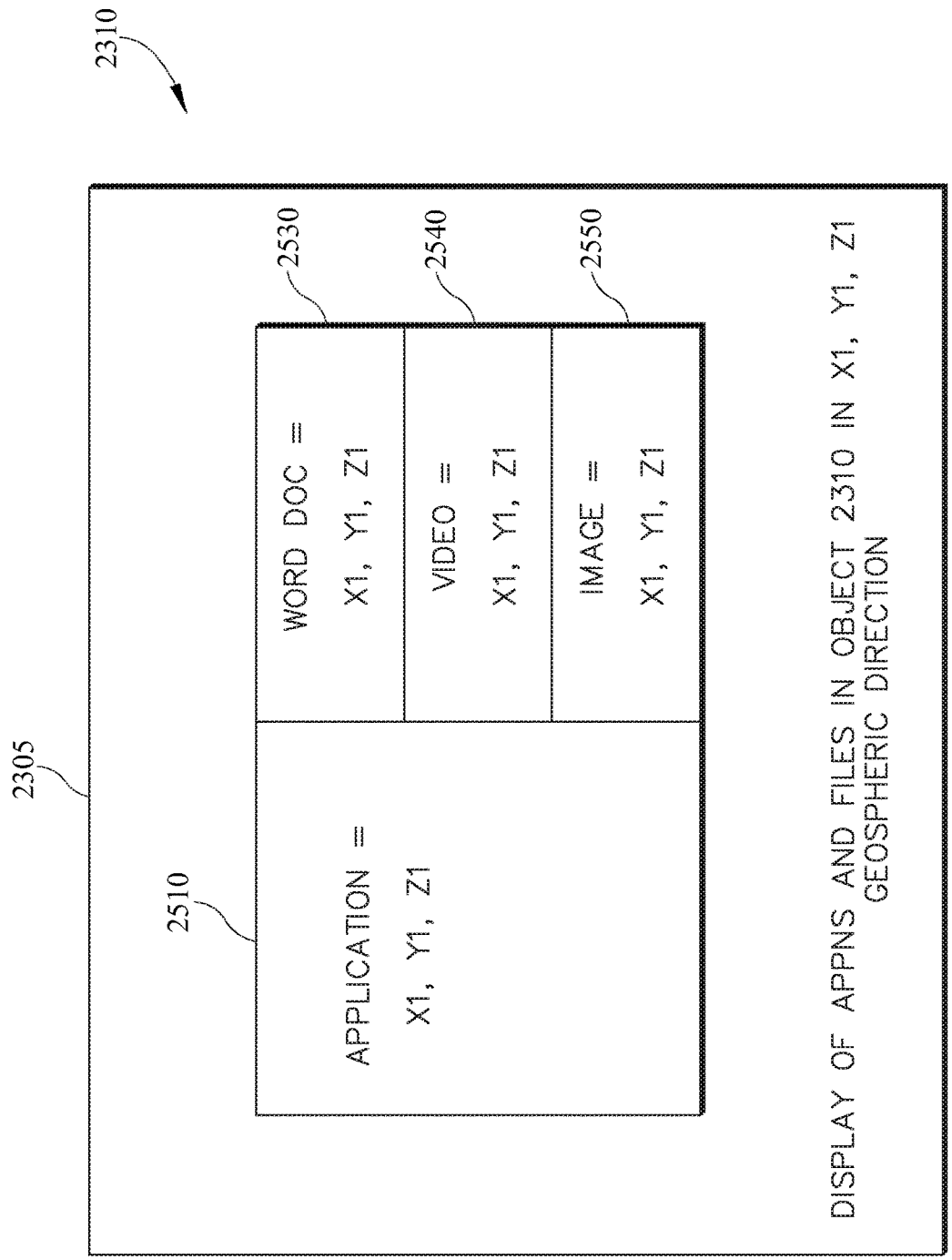
FIG. 25 depicts objects 2510, 2530, 2540, and 2550 rendered on a display of a computing device when the computing device is facing the X2, Y2, Z2 geospheric direction that are nested inside of presentation object 2320 shown in FIG. 23 after a user has clicked on presentation object 2320.
Figure 26:
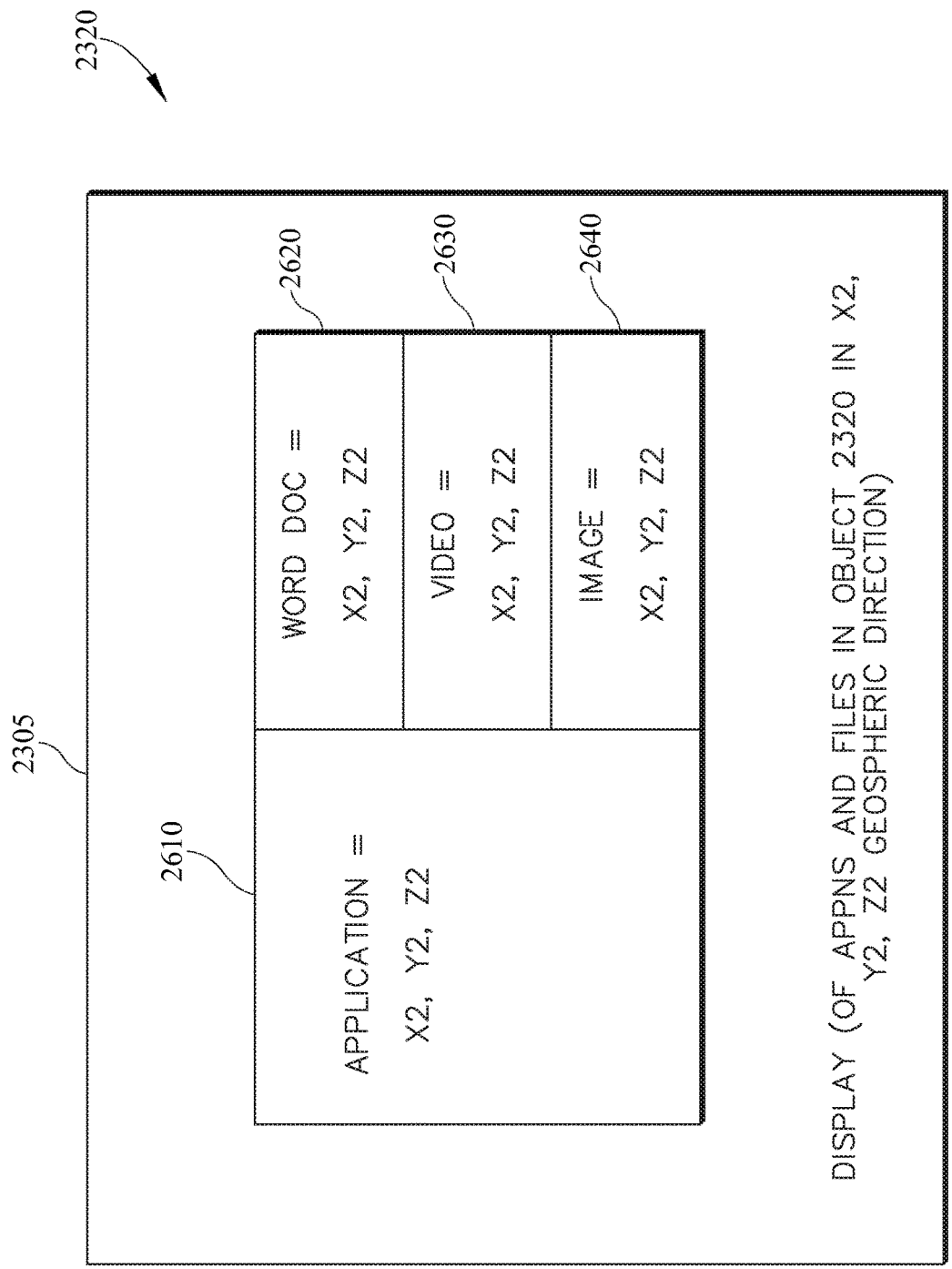
FIG. 26 depicts objects 2610, 2620, 2630, and 2640 rendered on a display of a computing device when the computing device is facing the X3, Y3, Z32 geospheric direction that are nested inside of presentation object 2330 shown in FIG. 23 after a user has clicked on presentation object 2320.

FIG. 23 depicts three different presentation objects 2310, 2320, 2330 rendered on a display of a computing device employing the metaphor application of this disclosure at different times while panning the computing device across three different geospheric directions X1, Y1, Z1; X2, Y2, Z2; and X3, Y3, Z3. FIG. 24 depicts another embodiment where three objects 2410, 2420, 2430, and 2440 (instead of one object) are rendered on the display when the computing device is facing the X1, Y1, Z1 geospheric direction. The embodiment shown in FIG. 23 may be one FIG. 25 depicts objects 2510, 2530, 2540, and 2550 rendered on a display of a computing device when the computing device is facing the X2, Y2, Z2 geospheric direction that are nested inside of presentation object 2320 shown in FIG. 23 after a user has clicked on presentation object 2320. FIG. 26 depicts objects 2610, 2620, 2630, and 2640 rendered on a display of a computing device when the computing device is facing the X3, Y3, Z32 geospheric direction that are nested inside of presentation object 2330 shown in FIG. 23 after a user has clicked on presentation object 2320. Illustratively, the user would open the objects 2310, 2320, and 2330 to open up the nested objects depicted in FIGS. 24, 25, 26 after the user has used the lock feature disclosed herein which enables the computing device to continue rendering the object even if the computing device is facing another geospheric direction. Also, the nested objects in each of FIGS. 24, 25, 26 may be objects other than those depicted in the FIGS. (i.e., they need not be the application, word document, video, and image shown in the FIGS.

Figure 27:
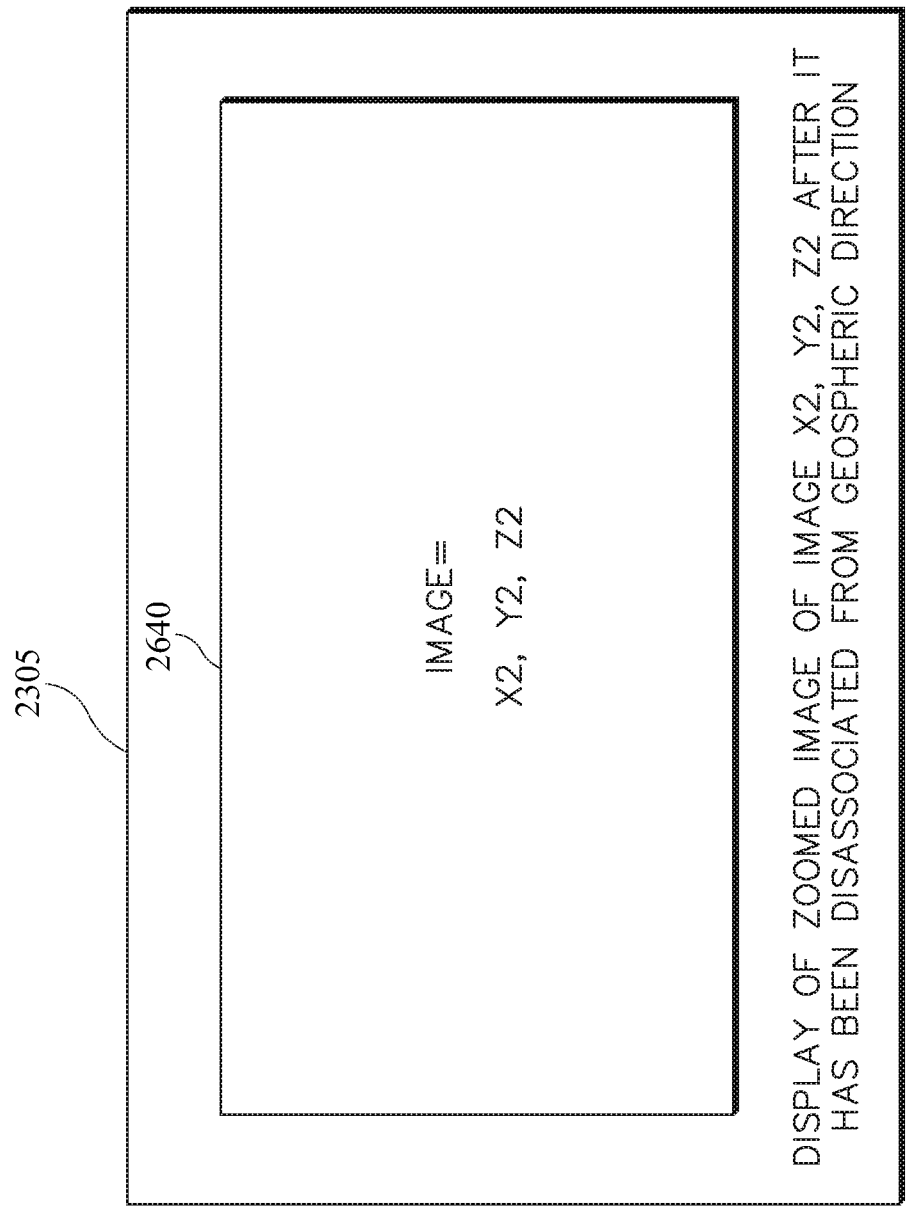
FIG. 27 depicts a presentation object 2705 taken from presentation object 2605 shown in FIG. 26 but with image 2650 of FIG. 25 depicted in a zoomed out format rendered on a display of the computing device.
Figure 28:
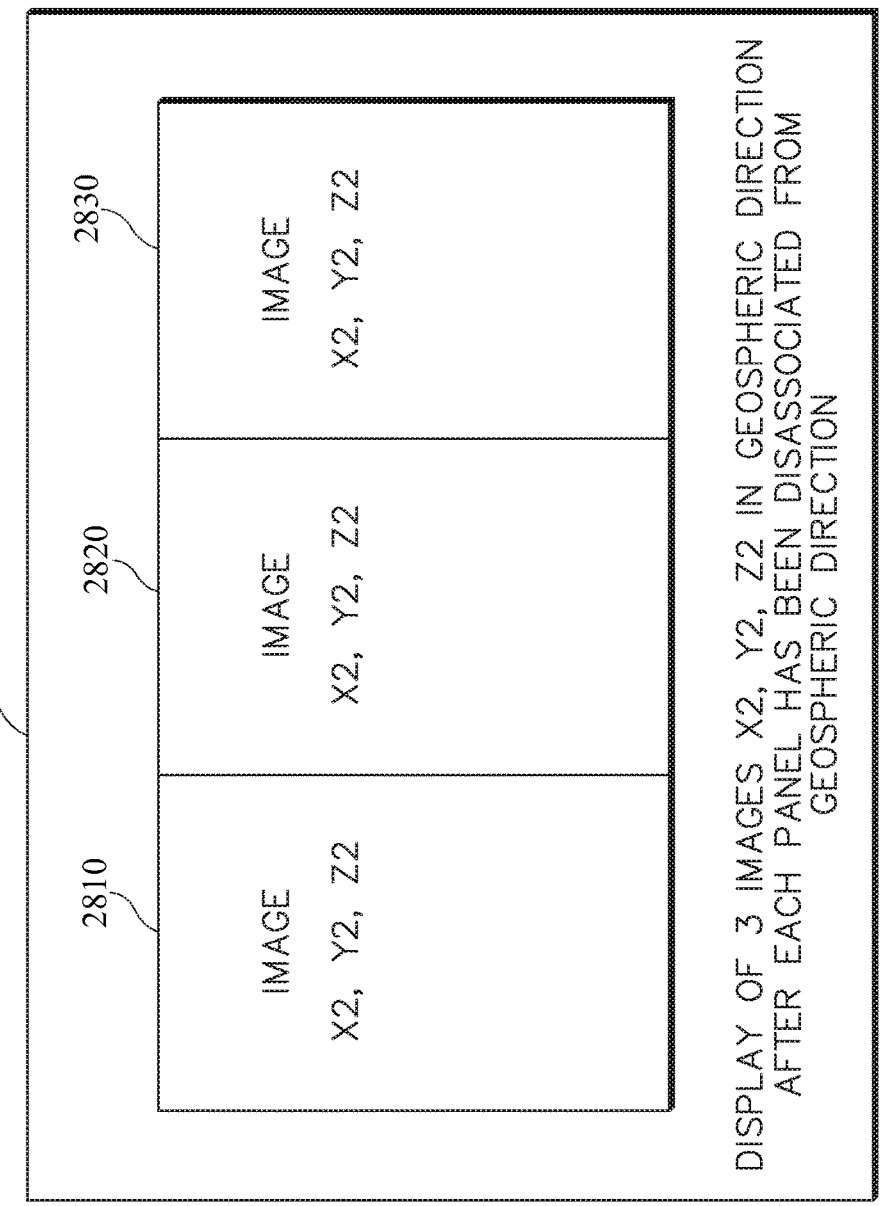
FIG. 28 depicts a presentation object 2805 with images 2810, 2820, 2830 decoupled from the geospheric direction of this disclosure so that these three images continue to be rendered on the computing device regardless of the direction the computing device is pointing.

FIG. 27 depicts a presentation object 2705 taken from presentation object 2605 shown in FIG. 26 but with image 2650 of FIG. 25 depicted in a zoomed out format rendered on a display of the computing device. FIG. 28 depicts a presentation object 2805 with images 2810, 2820, 2830 decoupled from the geospheric direction of this disclosure so that these three images continue to be rendered on the computing device regardless of the direction the computing device is pointing.

Figure 29:
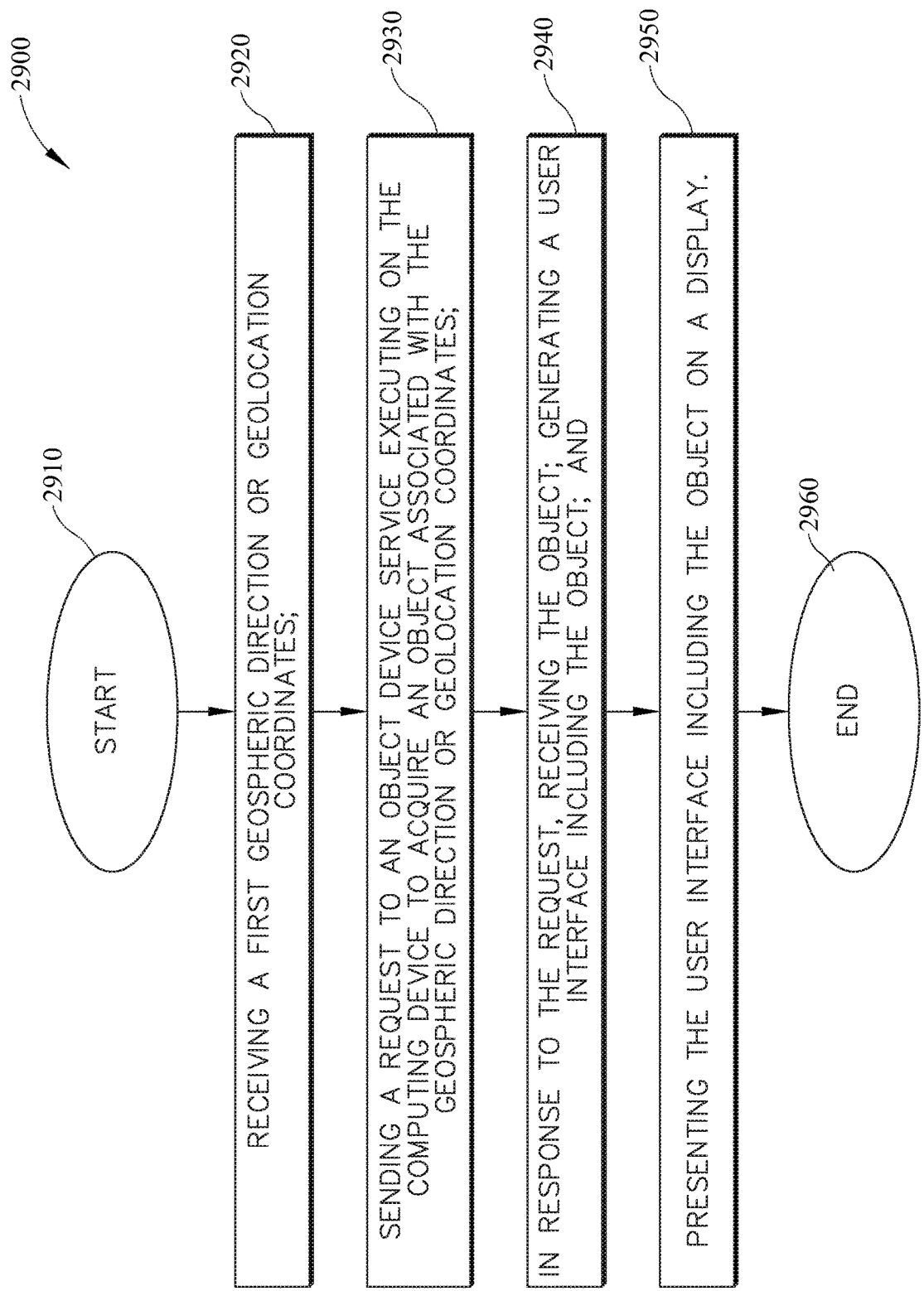
FIG. 29 depicts an illustrative method for the metaphor application of this disclosure; disclosure.

FIG. 29 depicts an illustrative method for the metaphor application of this disclosure. The process begins at Start 2910. At step 2920, the metaphor application receives a first geospheric direction or geolocation coordinate. At step 2930, the metaphor application sends a request to an object device service to acquire an object associated with the geospheric or geolocation coordinates. At step 2940, the metaphor application receives the object and generates a user interface therefor. At step 2950, the metaphor application presents the interface with objects on a display of the computing device. At step 2960, the process ends.

The advantages of this disclosure over prior art user interfaces are evident. In FIG. 4, the user displays user interface 410 on a display of the computing device. The user may also toggle between user interface 410 to either user interface 420 or 475 to display either user interface 410 or 475. By toggling between user interfaces, the user may display either user interface 410, 420, or 475 at any one time on the display of the display device. As is evident from FIG. 4 the user interface in the prior art is a static construct that displays one user interface at a time by toggle action. This disclosure allows a user to display a user interface based upon the geospheric orientation of the computing device. In other words, the geospheric direction provides a toggle for navigating between user interfaces. Whereas in FIG. 4, the user toggled to bring user interface 420 onto the display of the computing device, as shown in FIGS. 14A-F, this disclosure brings a presentation object onto the display of the computing device when the display device is oriented in the geospheric direction associated with the presentation object.

Display of presentation objects by geospheric orientation provides an intuitively simple and easy to use menu for navigating through any number of user interfaces. In addition, the metaphor of this disclosure may take unlimited shapes and sizes; further increasing the power of the user interface of this disclosure. For instance, for a metaphor in the shape of a spherical metaphor, the user may scale the size of the metaphor based upon the configuration setting for the radius. In a previous example, the radius of the spherical metaphor was set to 3 meters creating a surface area equal to about 113 meters.

Having thus described illustrative examples, there is thus disclosed an interactive software. The interactive software may provide an alternative user interface to conventional interfaces as well as providing a foundation for augmented reality.

A method of presenting an object on a computing device disclosed may include the steps of: providing a metaphor application for installation on a computing device, the metaphor application configured to organize at least one user interface based upon a metaphor, the metaphor organizing a document, a file, an application, data, or any combination thereof based upon geospheric direction; receiving a document, a file, an application, data, or any combination thereof from a data source; associating the document, the file, the application, data, or any combination thereof with a geospheric direction setting of the computing device; generating a presentation object for the document, file, application, data, or any combination thereof, the presentation object containing the document, the file, the application, the data, or any combination thereof, and the predetermined geospheric direction setting; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction associated with the presentation object.

The metaphor may further organize a document, a file, an application, data, or any combination thereof on a surface of a solid geometrical figure in three-dimensional Euclidean space; and the document, the file, the application, the data, or any combination thereof with a geospheric direction setting of the computing device may be further associated with a point on the surface of a solid geometrical figure in three-dimensional Euclidean space associated with the geospheric direction setting of the computing device;

The step of at least one of receiving, associating, generating and formatting may be performed by a transmission server, the transmission server comprising a processor and a memory, wherein the processor is configured to perform the at least one of receiving, associating, generating, and formatting steps. The method may include transmitting data from the at least one of the receiving, associating, generating and formatting over a communication channel to the computing device. In the method, the communication channel may be selected from the group consisting of a wireless communication channel, a wired communication channel, or combination thereof. The method may further include: storing user preferences for under what conditions the presentation object is to be rendered on the display of the computing device; rendering the presentation object on the display of the computing device when the setting is configured to render the presentation object on the display of the device; and rendering another presentation object on the display of the computing device when the setting is configured to render the other presentation object on the display of the device.

The providing of the metaphor application on the computing device may be taken from the group consisting of a user download, a factory download, or combination thereof. The rendering of the presentation object may be taken from the group consisting of a rendering by the metaphor application and a rendering by another application on the computing device. The method may further include the step of activating a locking configuration wherein the locking configuration locks the presentation object rendered on the display of the computing device to the geospheric direction associated with the presentation object at the time of lock such that the presentation object continues to be rendered on the display even when the computing device is pointing in a different geospheric direction. The method may further include the step of activating a zooming configuration wherein the zooming configuration enables the presentation object rendered on the display of the computing device to be zoomed in or out.

The solid geometrical figure in three-dimensional Euclidean space may be a sphere. The solid geometrical figure in three-dimensional Euclidean space may be a round body whose surface is at all points equidistant from a center. The method may associate the geospheric direction associated with the presentation object with a point along the surface of the round body. The center of the spherical metaphor may be defined by the geolocation of the computing device. The method may display no document, file, application, data, or any combination thereof if the presentation object contains no geospheric direction information.

The method may further include performing the steps of receiving, associating, generating, and formatting in connection with a first presentation object of a first document, a first file, a first application, or any combination thereof associated with a first geospheric direction setting; performing the steps for receiving, associating, generating, and formatting in connection with a first presentation object of a second document, a second file, a second application, or any combination thereof associated with a second geospheric direction setting; associating the first geospheric direction associated with the first presentation object with a first point along the surface of the round body; associating the second geospheric direction associated with the second presentation object with a second point along the surface of the round body; rendering the first presentation object on the display of the computing device when the computing device is point in the first geospheric direction; and rendering the second presentation object on the display of the computing device when the computing device is point in the second geospheric direction.

The method may further include the steps of the metaphor application being further configured to organize a document, a file, an application, data, or any combination thereof according to a geolocation; associating a document, a file, an application, or any combination thereof with a geolocation; rendering the presentation object of the document, the file, the application, or any combination thereof when the computing device is both at the geolocation associated with and pointing in the geospheric direction associated with the presentation object.

The method may further include the metaphor organizing a document, a file, an application, data, or any combination thereof on a surface of a solid geometrical figure in three-dimensional Euclidean space; and wherein the association of the document, the file, the application, the data, or any combination thereof with the geospheric setting of the computing device and the geolocation setting of the computing device is further associated with the solid geometrical figure in three-dimensional Euclidean space associated with the geolocation setting of the computing device.

The method may further include the association of the document, the file, the application, the data, or any combination thereof with the geospheric setting of the computing device, the geolocation setting of the computing device, and the solid geometrical figure in three-dimensional Euclidean space associated with the geolocation setting of the computing device may be further associated with an active button or icon rendered on the display of the computing device by the metaphor application.

The geospheric direction may be determined by a sensor taken from the group consisting of gps sensor, compass sensor, accelerometer sensor, gyro sensor, and combination thereof.

The method may further include configuring the computing device with a predetermined geolocation in order to render the presentation object associated with that geolocation on the display of the computing device when the computing device is both at the geolocation associated with and pointing in the geospheric direction associated with the presentation object. The geolocation may be a latitude and a longitude of a gps location.

The spherical metaphor may be a solid geometric figure defined by the equation $x^2+y^2+z^2=r^2$ where x, y, z are three coordinates in a three-dimensional Euclidean space and r is the radius of the solid geometrical figure; and the radius of the solid geometrical figure may be either a predetermined or configurable setting associated with the file, the application, the data, or any combination thereof. The spherical metaphor may be a solid geometric figure having a surface area defined by $S=4\pi r^2$; and the radius of the solid geometrical figure is either a predetermined or configurable setting associated with the file, the application, or any combination thereof. The solid geometrical figure in three-dimensional Euclidean space may be selected from the group consisting of a platonic solid and a Kepler-Poinset polyhedra. The platonic solid may be selected from the group consisting of a tetrahedron, a cube, an octahedron, a dodecahedron, and an icosahedron. The Kepler-Poinset polyhedral may be selected from the group consisting of a small stellated dodecahedron, a great dodecahedron, a great stellated dodecahedron, and a great icosahedron. The method may further include the step of responding by the computing device to user input by opening the document, the file, the application, or any combination thereof selected by a user.

A method of presenting an object on a computing device may include the steps of: providing a metaphor application for installation on a computing device, the metaphor application configured to organize at least one user interface based upon a metaphor, the metaphor organizing a document, a file, an application, data, or any combination thereof based upon geolocation; receiving a document, a file, an application, data, or any combination thereof from a data source; associating the document, the file, the application, the data, or any combination thereof with a geolocation setting of the computing device; generating a presentation object for the document, the file, the application, the data, or any combination thereof, the presentation object containing the data, the file, the application, the data, or any combination thereof, and the predetermined geolocation; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is in the geolocation associated with the presentation object. The metaphor may further organize a document, a file, an application, data, or any combination thereof on a surface of a solid geometrical figure in three-dimensional Euclidean space; and the document, the file, the application, the data, or any combination thereof with a geolocation setting of the computing device may be further associated with a solid geometrical figure in three-dimensional Euclidean space.

A system for presenting an object may include: a display device; one or more processors; and at least one memory coupled to the one or more processors. The at least one memory includes computer-readable instructions for execution by the one or more processors to cause said one or more processors to perform operations comprising: executing instructions of a metaphor application, the metaphor application configured to organize at least one user interface based upon a metaphor, the metaphor organizing a document, a file, an application, data, or any combination thereof based upon geospheric direction, geolocation, or both; associating the document, the file, the application, the data, or any combination thereof with a geospheric directional setting of the computing device, a geolocation setting of the computing device, or both; generating a presentation object for the data, the file, the application, the data, or any combination thereof, the presentation object containing the data, the file, the application, the data, or any combination thereof, and the geospheric direction setting of the device, the geolocation setting of the computing device, or both; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction, in the geolocation, or both associated with the presentation object.

In the system, the metaphor may further organize a document, a file, an application, data, or any combination thereof on a surface of a solid geometrical figure in three-dimensional Euclidean space; and wherein the document, the file, the application, the data, or any combination thereof may be further associated with a point on the surface of the solid geometrical figure in three-dimensional Euclidean space associated with the geospheric direction setting of the computing device, the geolocation of the computing device, or both.

The system may further include a transmission server comprising a processor and a memory that stores the received data, the file, the application, or any combination thereof and wherein the processor of the transmission server is configured to perform the at least one of receiving, associating, generating and formatting steps. The computing device and the transmission server may further comprise communication circuitry, the communication circuitry of the computing device and the transmission server configured to establish a communication channel between each other, the transmission server transmitting the at least one of receiving, associating, generating and formatting steps over the communication channel to the computing device. The memory of the computing device may be configured to store user preferences for under what conditions the presentation object is to be rendered on the display of the computing device; wherein the computing device renders the presentation object on the display of the computing device when the setting is configured to render the presentation object on the display of the device; and wherein the computing device renders another presentation object on the display of the computing device when the setting is configured to render the other presentation object on the display of the device.

The metaphor application may be downloaded on the computing device. The download may be taken from the group consisting of a user download, a factory download, or combination thereof. The system may further include another application on the computing device and wherein the presentation object is rendered by either the metaphor application or by the another application or still another application. The system may further include a roaming mode of operation configuration: wherein when the computing device is operating in the roaming mode of operation configuration, the roaming mode of operation enables the metaphor application to cause the computing device to roam through one or more documents, files, applications, data, or any combination thereof based upon the direction in which the computing device is pointing, the geolocation of the computing device, or both.

In the system, the computing device may be configurable to enable a lock mode of operation to disable the roaming mode of operation; and wherein the lock mode of operation locks the presentation object rendered on the display of the computing device to the geospheric direction, the geolocation, or both associated with the presentation object at the time of lock such that the presentation object continues to be rendered on the display even when the computing device is pointing in a different geospheric direction, in a different geolocation, or both. In the system, the computing device is configured to enable a zoom mode of operation; and wherein the zooming configuration enables the presentation object rendered on the display of the computing device to be zoomed in or out. In the system, the geospheric direction may be determined by a sensor taken from the group consisting of gps sensor, compass sensor, accelerometer sensor, gyro sensor, or combination thereof. In the system, the solid geometrical figure in three-dimensional Euclidean space may be a sphere.

In the system, the solid geometrical figure in three-dimensional Euclidean space may be a round body whose surface is at all points equidistant from a center. The system may include associating the geospheric direction associated with the presentation object with a point along the surface of the round body. In the system, the center of the spherical metaphor may be defined by the geolocation of the computing device. The system may further include displaying no document, file, application, data, or any combination thereof if the predetermined geospheric direction setting, the predetermined geolocation setting, or both contains no geospheric direction, geolocation, or both.

The system may further include a second computing device, the second computing device including a controller and a memory, the second computing device executing instructions of a metaphor application, the metaphor organizing a document, a file, an application, data, or any combination thereof based on a geospheric direction, a geolocation or both; the second computing device performing the receiving, associating, generating and formatting steps performed by the first computing device on documents, files, applications, data, or combinations thereof from the data source; wherein the data source is a metaphor residing on the transmission server; and wherein the transmission server is further configured to perform the at least one of receiving, associating, generating and formatting steps with the second computing device.

The system may further have the metaphor residing on the transmission server be a metaphor associated with the first computing device.

The system may further include a second metaphor residing on the transmission server, the second metaphor associated with the second computing device.

The system may further include a game application involving the firing of a gun in a target area, the display of the computing device providing a scope of the gun; wherein the presentation object to be rendered on the display of the scope of the gun when the computing device is pointing in a geospheric direction, located in a geolocation, or both associated with the presentation object is a view of the target area that is associated with the geospheric direction, a geolocation, or both by the metaphor application; and wherein the metaphor application causes the presentation object to be rendered on the scope of the gun when the computing device is pointing in the geospheric direction, located in the geolocation, or both associated with the presentation object.

The system may further include a gun handle, the gun handle being attached to the computing device to form the gun; the gun handle including a trigger mechanism electrically coupled to the gaming application, the trigger mechanism applying an electrical signal to the gaming application to indicate the firing of the gun.

The system may further have the metaphor application generate a different spherical metaphor for different categories of documents, files, applications, data, or combination thereof; the different categories selected from the group consisting of date, event, matter, document type, file type, application type, data type, photos, or combinations thereof.

The system may have the metaphor application generate a different spherical metaphor for different periods of time.

The system may have at least one spherical metaphor sliced into sectors correlating to months and or days of a year.

The system may have the documents, the files, the applications, the data, or any combination thereof associated with the points on the surface of the solid geometrical figure in three-dimensional Euclidean space associated with the geospheric direction setting of the computing device, the geolocation setting of the computing device, or both form a panorama. The geolocation setting of the computing device may be associated with room in a building. The panorama depicted may be selected from the group consisting of art work, natural history, science, and museum exhibits. A section of the depiction further comprises documents, files, applications, data, or combinations thereof.

The system may further include performing the steps for receiving, associating, generating, and formatting in connection with a first presentation object a first document, a first file, a first application, a first data, or any combination thereof associated with a first geospheric direction setting; performing the steps for receiving, associating, generating, and formatting in connection with a second presentation object a second document, a second file, a second application, a second data, or any combination thereof associated with a second geospheric direction setting; associating the first geospheric direction associated with the first presentation object with a first point along the surface of the round body; associating the second geospheric direction associated with the second presentation object with a second point along the surface of the round body; rendering the first presentation object on the display of the computing device when the computing device is point in the first geospheric direction; and rendering the second presentation object on the display of the computing device when the computing device is point in the second geospheric direction.

The system may further include the metaphor application being further configured to organize a document, a file, an application, data, or any combination thereof on a surface of a solid geometrical figure in three-dimensional Euclidean space according to geolocation, each geolocation being associated with a predetermined solid geometrical figure in three-dimensional Euclidean space; associating a document, a file, an application, data, or any combination thereof with a geolocation corresponding to the geolocation associated with one of the predetermined solid geometrical figures in three-dimensional Euclidean space; rendering the presentation object of the document, the file, the application, the data, or any combination thereof associated with a predetermined solid geometrical figure in three-dimensional Euclidean space when the computing device is both at the geolocation associated with and pointing in the geospheric direction associated with the presentation object.

A computer program product for use with a computer system is disclosed. The computer program product includes a computer usable medium having program code embodied in the medium, the program code comprising: program code that provides a metaphor application for installation on a computing device, the metaphor application configured to organize at least one user interface based upon a metaphor, the metaphor organizing a document, a file, an application, or any combination thereof on a surface of a solid geometrical figure in three-dimensional Euclidean space; receives a document, a file, an application, data, or any combination thereof from a data source; associates the document, the file, the application, the data, or any combination thereof with a point on the surface of the solid geometrical figure in three-dimensional Euclidean space based upon a predetermined geospheric direction setting, a predetermined geolocation setting, or both of the computing device; generates a presentation object for the document, the file, the application, the data, or any combination thereof, the presentation object containing the data, the file, the application, or any combination thereof, and the predetermined geospheric direction setting, the predetermined geolocation setting, or both; formats the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction, in the predetermined geolocation, or both associated with the presentation object.

In the computer program product, the metaphor may further organize a document, a file, an application, data, or any combination thereof on a surface of a solid geometrical figure in three-dimensional Euclidean space; and the document, the file, the application, the data, or any combination thereof may be further associated with a point on the surface of the solid geometrical figure in three-dimensional Euclidean space associated with the geospheric direction setting of the computing device, the geolocation of the computing device, or both.

The computer program product steps of at least one of receiving, associating, generating and formatting may be performed by a transmission server, the transmission server including a processor and a memory, wherein the processor is configured to perform the at least one of receiving, associating, generating, and formatting steps. The computer program product may further include transmitting data from the at least one of the receiving, associating, generating and formatting over a communication channel to the computing device. In the computer program product, the communication channel may be selected from the group consisting of a wireless communication channel, a wired communication channel, or combination thereof. The computer program may further include storing user preferences for under what conditions the presentation object is to be rendered on the display of the computing device; rendering the presentation object on the display of the computing device when the setting is configured to render the presentation object on the display of the device; and rendering another presentation object on the display of the computing device when the setting is configured to render the another presentation object on the display of the device.

In the computer program product, the metaphor application may be downloaded on the computing device. The download may be may be taken from the group consisting of a user download, a factory download, and combination thereof. In the computer program product, the rendering of the presentation object may be taken from the group consisting of a rendering by the metaphor application and a rendering by another application on the computing device. The computer program product may further include activating a locking configuration wherein the locking configuration locks the presentation object rendered on the display of the computing device to the geospheric direction, the geolocation, or both associated with the presentation object at the time of lock such that the presentation object continues to be rendered on the display even when the computing device is pointing in a different geospheric direction, in a different geolocation, or both. The computer program product may further include activating a zooming configuration wherein the zooming configuration enables the presentation object rendered on the display of the computing device to be zoomed in or out. In the computer program product, the solid geometrical figure in three-dimensional Euclidean space may be a sphere. In the computer program product, the solid geometrical figure in three-dimensional Euclidean space may be a round body whose surface is at all points equidistant from a center.

The predetermined solid geometrical figure in three-dimensional Euclidean may include a plurality of predetermined solid geometrical figures in three-dimensional Euclidean space; and wherein the associating of the geolocation associated with the presentation object with a predetermined solid geometrical figure in three-dimensional Euclidean space may be an associating of the geolocation associated with the presentation object with at least one of the plurality of predetermined solid geometrical figure in three-dimensional Euclidean space.

The computer program product may include associating the geospheric direction associated with the presentation object with a point along the surface of the round body. In the computer program product, the center of the spherical metaphor may be defined by the geolocation of the computing device. The computer program product may further include displaying no document, file, application, data, or any combination thereof if the predetermined geospheric direction setting, the predetermined geolocation setting, or both contains no geospheric direction, geolocation, or both. The computer program product may further include performing the steps for receiving, associating, generating, and formatting in connection with a first presentation object of a first document, a first file, a first application, a first data, or any combination thereof associated with a first geospheric direction setting; performing the steps for receiving, associating, generating, and formatting in connection with a second presentation object of a second document, a second file, a second application, a second data, or any combination thereof associated with a second geospheric direction setting; associating the first geospheric direction associated with the first presentation object with a first point along the surface of the round body; associating the second geospheric direction associated with the second presentation object with a second point along the surface of the round body; rendering the first presentation object on the display of the computing device when the computing device is point in the first geospheric direction; and rendering the second presentation object on the display of the computing device when the computing device is point in the second geospheric direction.

The computer program product may further include the metaphor application being further configured to organize a document, a file, an application, or any combination thereof on a surface of a solid geometrical figure in three-dimensional Euclidean space according to geolocation, each geolocation being associated with a predetermined solid geometrical figure in three-dimensional Euclidean space; associating a document, a file, an application, data, or any combination thereof with a geolocation corresponding to the geolocation associated with one of the predetermined solid geometrical figures in three-dimensional Euclidean space; rendering the presentation object of the document, the file, the application, or any combination thereof associated with a predetermined solid geometrical figure in three-dimensional Euclidean space when the computing device is both at the geolocation associated with and pointing in the geospheric direction associated with the presentation object.

The computer program product may further include rendering the first presentation object on the display of the computing device when the computing device is in the first geolocation; and rendering the second presentation object on the display of the computing device when the computing device is in the second geolocation.

In the computer program product, the geospheric direction may be determined by a sensor taken from the group consisting of gps sensor, compass sensor, accelerometer sensor, gyro sensor, and combination thereof.

The computer program product may further include configuring the computing device with a predetermined geolocation in order to render the presentation object associated with that geolocation on the display of the computing device when the computing device is both at the geolocation associated with and pointing in the geospheric direction associated with the presentation object.

The computer program product may further include rendering the presentation object associated with the predetermined geospheric direction setting, the predetermined geolocation setting, or both on the display of the computing device when the computing device is in a predetermined geospheric direction setting, a predetermined geolocation setting, or both.

In the computer program product, the geolocation may be a latitude and a longitude of a gps location. In the computer program product, the spherical metaphor may be a solid geometric figure defined by the equation $x^2+y^2+z^2=r^2$ where x, y, z are three coordinates in a three-dimensional Euclidean space and r is the radius of the solid geometrical figure; and wherein the radius of the solid geometrical figure is either a predetermined or configurable setting associated with the file, the application, the data, or any combination thereof.

In the computer program product, the spherical metaphor may be a solid geometric figure having a surface area defined by $S=4\pi r^2$; and wherein the radius of the solid geometrical figure may be either a predetermined or configurable setting associated with the file, the application, the data, or any combination thereof. In the computer program product, the solid geometrical figure in three-dimensional Euclidean space may be selected from the group consisting of a platonic solid and a Kepler-Poinset polyhedra. In the computer program product, the platonic solid may be selected from the group consisting of a tetrahedron, a cube, an octahedron, a dodecahedron, and an icosahedron. In the computer program product, the Kepler-Poinset polyhedral may be selected from the group consisting of a small stellated dodecahedron, a great dodecahedron, a great stellated dodecahedron, and a great icosahedron.

While this disclosure provides illustrative examples wherein the metaphor application is configured to organize at least one user interface based upon a metaphor, the metaphor organizing a document, a file, an application, data, or any combination thereof on a surface of a solid geometrical figure in three-dimensional Euclidean space, it will be appreciated that this disclosure allows for bubbles inside of bubbles or solid geometrical figure in three-dimensional Euclidean space inside of solid geometrical figures in three-dimensional Euclidean space. Take, for instance, the illustrative example wherein the spherical metaphor may be a solid geometric figure defined by the equation $x^2+y^2+z^2=r^2$ where x, y, z are three coordinates in a three-dimensional Euclidean space and r is the radius of the solid geometrical figure; and the radius of the solid geometrical figure may be either a predetermined or configurable setting associated with the file, the application, the data, or any combination thereof. In one illustrative embodiment, a first presentation object of a document, a file, an application, data, or any combination thereof may be presented on a surface of a first sphere having a radius 1 feet whereas a second presentation object may be presented on a surface of a second sphere having a radius of 2 feet. In this case, both spheres would be centered at the computing device so that the first sphere would lie inside the second sphere. In this example, the same geospheric direction may be associated with different presentation objects with each presentation object associated with a different radius.

In another illustrative example, the metaphor application may organize a first set of documents, files, applications, data, or any combination thereof according to a first solid geometrical figure in three-dimensional Euclidean space and organize a second set of documents, files, applications, data, or any combination thereof according to a second solid geometrical figure in three-dimensional Euclidean space. The user could configure the first solid geometrical figure in three-dimensional Euclidean space to lie inside the second solid geometrical figure in three-dimensional Euclidean space. This allows different sets of presentation objects to be organized and presented in different ways. For example, a solid geometrical figure in three-dimensional Euclidean space in the shape of a sphere could be used to lay-out a first set of documents, files, applications, data, or any combination thereof. A solid geometrical figure in three-dimensional Euclidean space in the shape of a;

receiving a document, a file, an application, data, or any combination thereof from a data source; associating the document, the file, the application, the data, or any combination thereof with a point on the surface of the solid geometrical figure in three-dimensional Euclidean space based upon a predetermined geospheric direction setting of the computing device; generating a presentation object for the data, the file, the application, the data, or any combination thereof, the presentation object containing the document, the file, the application, the data, or any combination thereof, and the predetermined geospheric direction setting; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction associated with the presentation object.

A method of presenting an object on a computing device comprising the steps of: providing a metaphor application for installation on a computing device, the metaphor application configured to organize at least one user interface based upon a metaphor, the metaphor organizing a document, a file, an application, data, or any combination thereof on a surface of a solid geometrical figure in three-dimensional Euclidean space; receiving a document, a file, an application, data, or any combination thereof from a data source; associating the document, the file, the application, the data, or any combination thereof with a point on the surface of the solid geometrical figure in three-dimensional Euclidean space based upon a predetermined geospheric direction setting of the computing device; generating a presentation object for the data, the file, the application, the data, or any combination thereof, the presentation object containing the document, the file, the application, the data, or any combination thereof, and the predetermined geospheric direction setting; formatting the presentation object into data blocks for rendering on a display of the computing device; wherein the computing device comprising a controller and a memory, the controller configured to render the formatted presentation object on the display of the computing device; and wherein the metaphor application causes the presentation object to be rendered on the display of the computing device when the computing device is pointing in the geospheric direction associated with the presentation object. Alternatively, the metaphor organizing a document, a file, an application, data, or any combination thereof on a surface of a figure that has other shapes, such as a cylinder.

One illustrative example of this disclosure is to visualize a set of documents, files, applications, data, or combinations thereof as a card in a deck of cards and a collection of a set of documents, files, applications, data, or both as a deck of cards. Each card may be associated with a different compass reading. Hence, if a user does a 360 degree movement with the smart phone or other computing device, different cards would be displayed depending upon the instant compass reading of the smartphone. This creates a room effect as the cards index based on which direction the phone is facing or tilted.

By this disclosure, instead of the display palette of documents, files, applications, data, or combinations thereof being limited to the size of a computer screen or phone screen, the display palette of the user is defined by the universe around the user.

Figure 30:
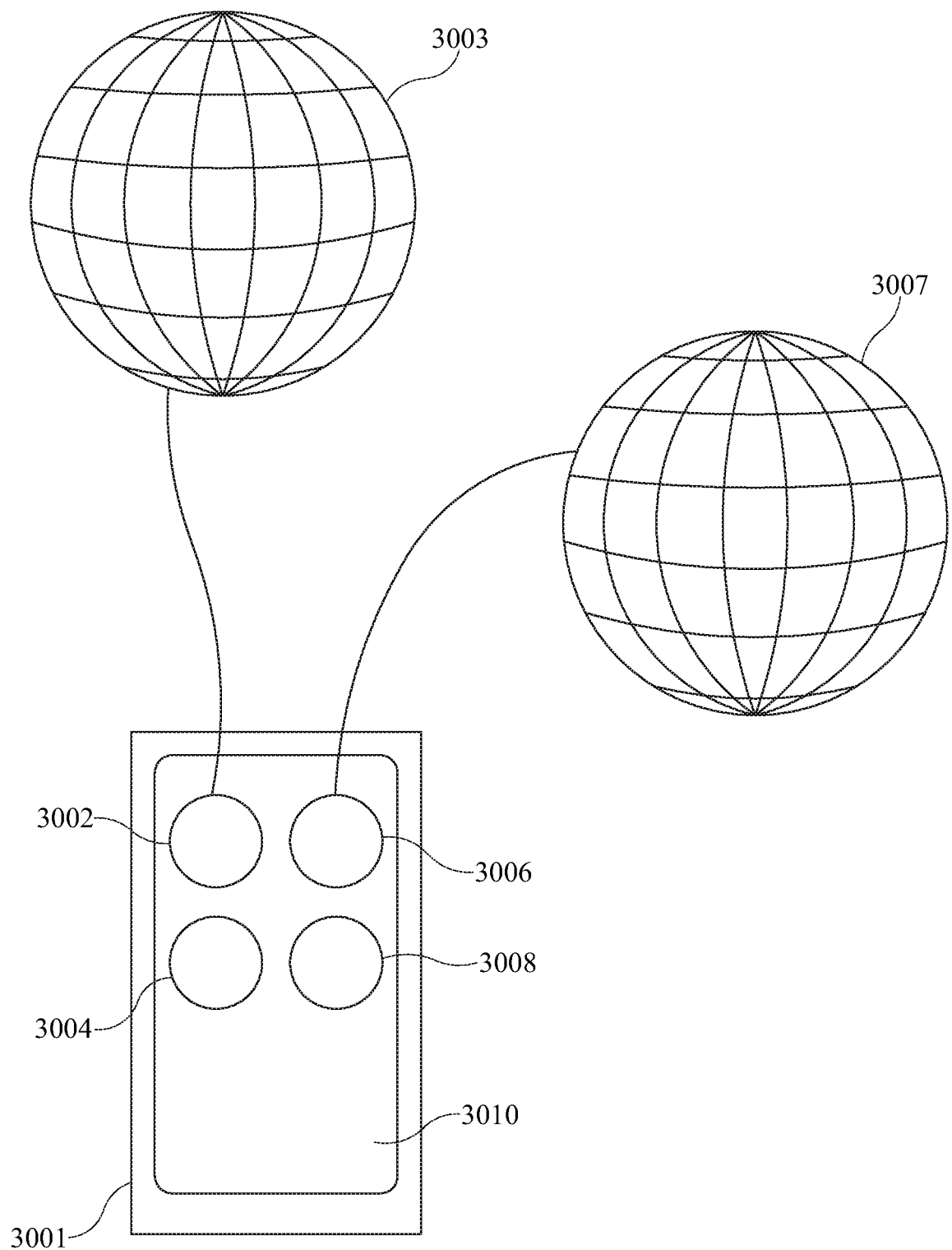
FIG. 30 depicts a rendering by the metaphor application on the computing device display of one or more active regions, each of which may open up a universe of documents, files, applications, data, or combinations thereof.

In another embodiment, as shown in FIG. 30, the metaphor application may render on the computing device display one or more active regions, each of which may open up a universe of documents, files, applications, data, or combinations thereof. The active regions may appear as a button or an icon, such as an icon in a particular shape. For example, FIG. 30 shows icons may be in the shape of spherical "bubbles" 3002, 3004, 3006, 3008. Each button or icon may activate a particular metaphor associated with that bubble. For example, a user may select spherical metaphor or "bubble" 3002 or 3006 and click on it to zoom inside of that bubble. This places the user inside that specific sphere where the user may keep all of his work product, family photos, or anything.

As another example of what may lie inside the spherical metaphors or bubbles, by this disclosure, the family photos and videos may be placed inside the bubbles and spread across the surface of the bubbles in a 360 circle. This spreading occurs by the association of different geospheric directions to different photos such that pointing the computing device in different geospheric directions will cause different photos to appear on the display of the computing device. The user may physically turn the computing device causing the computing device to pan across different geospheric directions; each geospheric direction causing the metaphor application to display the photo or photos that have been associated with the specific geographic direction in which the computing device and hence the geographic direction setting of the phone registers. In this way, the user can readily pan across different photos by simply panning the computing device across different geospheric directions. By this disclosure, a user can call up and render a particular photo on the display of the computing device by facing a specific direction. By pointing the computing device in different directions, the user may view any one of the photos in the sphere. Which photo the user sees depends upon the direction the user is pointing the computing device and which photo has been assigned the geospheric direction for that geospheric direction setting of the computing device.

As previously explained, FIG. 30 depicts a metaphor application of this disclosure creating several metaphors 3002, 3004, 3006, 3008 for rendering on the display screen 3010 of a computing device 3001 different universes of documents, files, applications, data, or combinations thereof. In this illustrative example, the metaphor application may after organizing a document, a file, an application, data, or any combination thereof on a surface of one or more a plurality of predetermined solid geometrical figures in three-dimensional Euclidean space, further organize icons, or active buttons to enter the one or more predetermined solid geometrical figures in three-dimensional Euclidean space on a display screen of the computing device. In this embodiment the metaphor application has associated a document, a file, an application, data or combination thereof not only with a geospheric direction, a geolocation, or both. But the metaphor application has associated with a specific metaphor or geometric figure like a sphere or bubble.

As one illustrative example of the power of this disclosure, this disclosure may associate a different spherical metaphor to a different set of family pictures. For example, and still referring to FIG. 30, a first spherical metaphor 3002 may be used to house the photos from a family vacation in one year (e.g., 2014) and a second spherical metaphor 3006 may be used to house the photos from a family vacation in another year (e.g. 2015). By clicking on one of these two metaphors, a user may readily see all of the photos for that year. For example, by clicking on metaphor 3002, the user opens up the universe 3003 created by metaphor 3002 when activated to see all the photos for 2014. Each photo of 2014 is rendered on the display according to the geospheric direction that has been associated with that photo. Once inside universe 3003, the user may turn the phone in a geospheric direction to call up different photos taken in 2014. By clicking on metaphor 3007, the user opens up the universe 3007 created by metaphor 3007 to allow the user to see the photos from 2015 by simply panning the computer in different geospheric directions.

Figure 31:
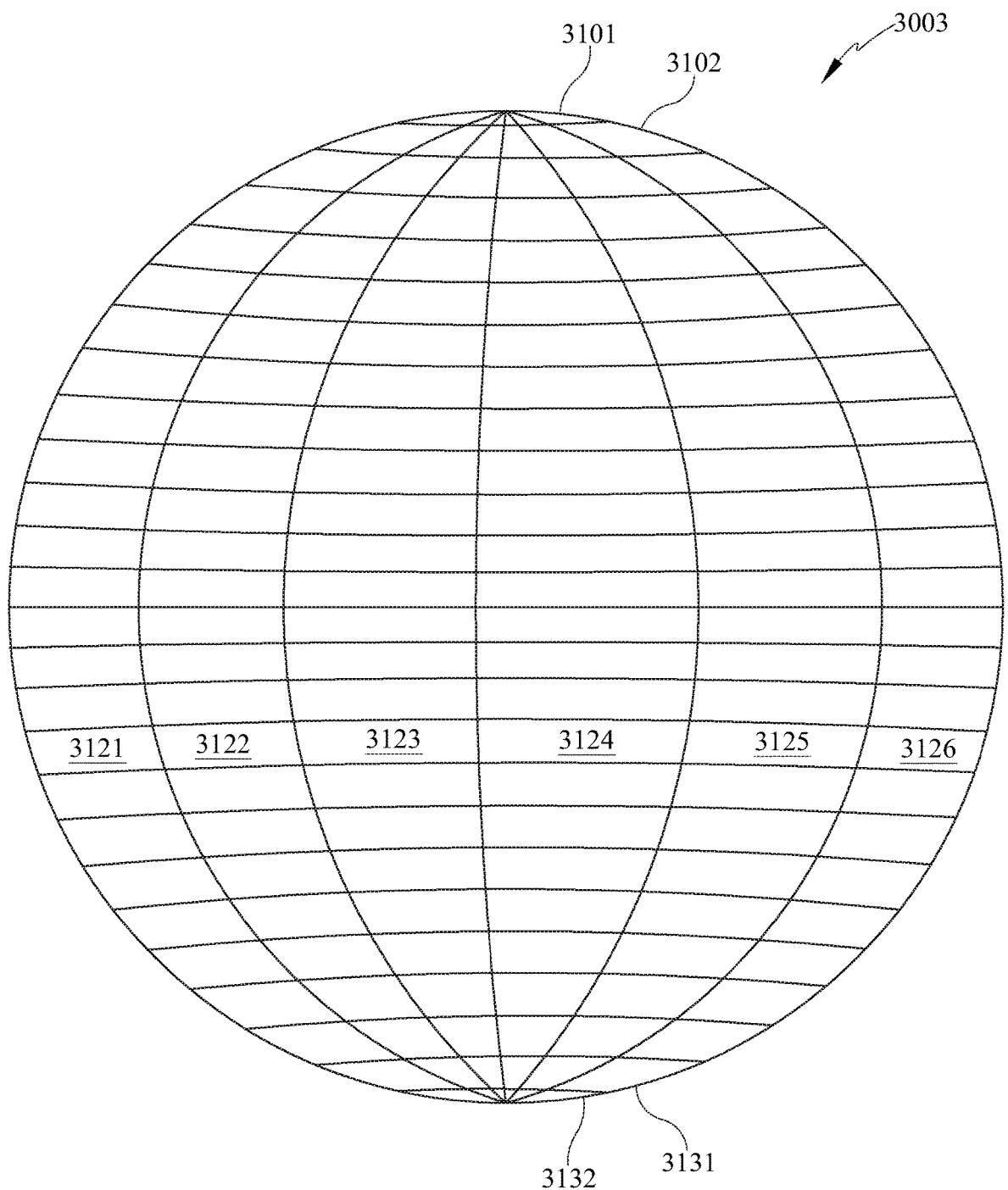
FIG. 31 depicts a metaphor for rendering photos.

The illustrative embodiment of FIG. 31 further metaphor 3003 from FIG. 30 illustratively sliced up longitudinally in 12 slices 3121-3126 on the visible side with the remaining six slices on the far side of the metaphor. Metaphor 3003 has also been sliced up latitudinally in 32 slices 3101-3132. The 12 longitudinal slices 3121-3126 (and the six on the other side of the metaphor) may correlate to the 12 months of the year and the 32 latitudinal slices 3101-3132 may correlate to 31 days in a month with an additional longitudinal slice to spare. Of course, in months of the year having fewer than 31 days, there would be additional longitudinal slices to spare. This shows one way in which a metaphor may be sliced up to further ease navigability by the user. In this case the slicing allows for an easy organization of photos taken on different days of the year to be spread across the surface of the universe. By panning the computing device to the different slices of metaphor 3003, the user may cause the metaphor application to render photos that have been associated with the different slices. In this case the pan may cause the computing device to pan through pictures taken on different days of the year with the user calling up the metaphor application to display photos on any given day by pointing the computing device in the geospheric direction of the slice of the metaphor 3003 associated with that day of the year. The spare slices may be associated with special photos or scrap photos or other photos of the user's choosing.

The metaphor application may render a menu on the screen of the computing device that allows documents, files, applications, data, or combination thereof to be easily uploaded into the metaphor application. The menu may also allow the user to configure the metaphor application to associate a geospheric direction, a geolocation, or combination thereof with the uploaded document, file, application, data, or combination thereof. A geospheric configuration may be set by keyboard entry. Alternatively, a geospheric configuration may be set by orientation of the computing device in the geospheric direction and then accepting that reading into the metaphor application. As another example, the geospheric configuration may be set by queries from the metaphor application concerning what surface of the sphere or other shape should the document, file, application, data, or combination thereof be located. For example, in the example with the photos to be rendered in the universe depicted in FIG. 31, the metaphor application may query what day and month was the picture taken. The metaphor application may then associate that picture with the sector of metaphor 3003 that represents the day and month entered. When the metaphor application is run, the metaphor application may execute to perform the functions as explained herein.

As taught by this disclosure, the two spherical metaphors may be activated manually by menu or be geolocation of the computing device. In the latter case, the first spherical metaphor may be associated with a first geolocation and the second spherical metaphor may be associated with a second geolocation. In this example, the user may sit in one chair at a family table to view the first set of photos and in another chair to view another set of photos. In this example, the computing device would be configured to recognize the first and second chairs as two geophysical locations.

By this disclosure, once a metaphor application has been activated to lock a particular rendering on the display of the computing device, a user may touch and drag any document or file or application or data in order to allow the user to interact with the file or application. For instance, a user may activate this lock feature for the purpose of editing a picture or a document. In this manner, any document, file, application, or data may be locked for editing or for other manipulation. After unlocking the metaphor application, the computing device is again free to pan any universe represented by a metaphor in order to locate, study, or perhaps edit other documents, files, applications, data, or combination thereof.

Additionally, a user may zoom in and out of a file or application that has been locked onto the display. If a file or application has not been locked, or has been locked and is subsequently unlocked, the user may point the computing device in different geospheric directions or move to different geolocations to activate different spherical metaphors or bubbles to further navigate the files or applications according to the teachings of this disclosure.

Conventional interface solutions have many restrictions. The interface of this disclosure may provide a more natural look and feel since it allows a user to move through one or more universes of documents, files, applications, data, or combinations thereof by geospheric directioning or geolocating the computing device.

Conventional interfaces lead to market segmentation which is why there tend to be either Android People or iPhone People. It may be frustrating and difficult to learn either interface. This disclosure may be more intuitive and may look and feel more natural thereby enabling more people to find it easy and fun to use. Whether it be using this disclosure to play games or simply calling up, studying, editing, and so on documents, files, applications, data, or combinations thereof, being able to call up these documents, files, applications, data, and combinations thereof; package them into presentation objects; and rendering them on a display of a computing device along one or more universes of metaphor shapes depending on the geospheric direction setting of the computing device, the geolocation setting of the device, or both allows streaming of documents, files, applications, data, or both. This brings them to life in addition to providing a fascinating paradigm for future user interface modeling.

Mobile and other computing devices already using indexing cards or screens to organize icons in different areas. This disclosure introduces a way to use that system on a larger scale and allows the direction & location of the mobile or other computing device to setup an interactive augmented reality desktop.

In another illustrative example, in some instances, such as sitting on an airplane, a user wouldn't want to get up and turn around to grab his email. In an illustrative example, this disclosure provides a "Stationary" mode that still allows a user to use the teachings of this disclosure but transforms the spherical metaphor to a flattened circle much like the sphere of the earth may be depicted as a flattened circle. As part of this flattening, the metaphor application would transform 3-d coordinates of geospheric direction into 2-d coordinates in a manner well known in the art. This enables the user to see documents, files, applications, and data on a flattened circle in front of him. This allows a user to turn the computing device around a pivot point in front of the user in order to call up documents, files, applications, data, or combinations thereof according to the direction of the computing device with respect to the pivot point.

This disclosure may be used with conventional operating systems, and provides a user interface for conventional documents, files and applications such as programs. The user interface of this disclosure may also provide an augmented reality for games downloaded to a computing device such as a smart phone.

In another example, if a user wants a certain file from a certain category the user turns to that direction (such as South) to grab that file and bring it to the desk in front of him, locks the metaphor application, and examines the file. When the user is finished the user may unlock the metaphor application and turn to a different direction to place the file right back where he got it from. Alternatively, the user may, while the metaphor application is locked, edit the application to put it into a different place he would like the file to be located within the metaphor. For example, an editor in the metaphor application may allow the geospheric direction associated with the file to be changed. The user may then manually change the geospheric direction associated with that file so that the file will now be located at a different point on the surface of the spherical metaphor. As another example, the metaphor may be cubicle to emulate a cubicle or a room.

A user may also use the metaphor application of this disclosure to go to other rooms or universes or metaphors in the solar system of files, documents, applications, data, or combination thereof that he has set up using the metaphor application of this disclosure. The user may enter such other rooms or universes or metaphors by geolocation setting of the computing device if such metaphors are associated with geolocation. Alternatively, if icons of the metaphors are rendered on the display of the computing device, the user may go to different rooms or universes or metaphors by activating different icons representing the different metaphors that are rendered on the display.

Figure 32:
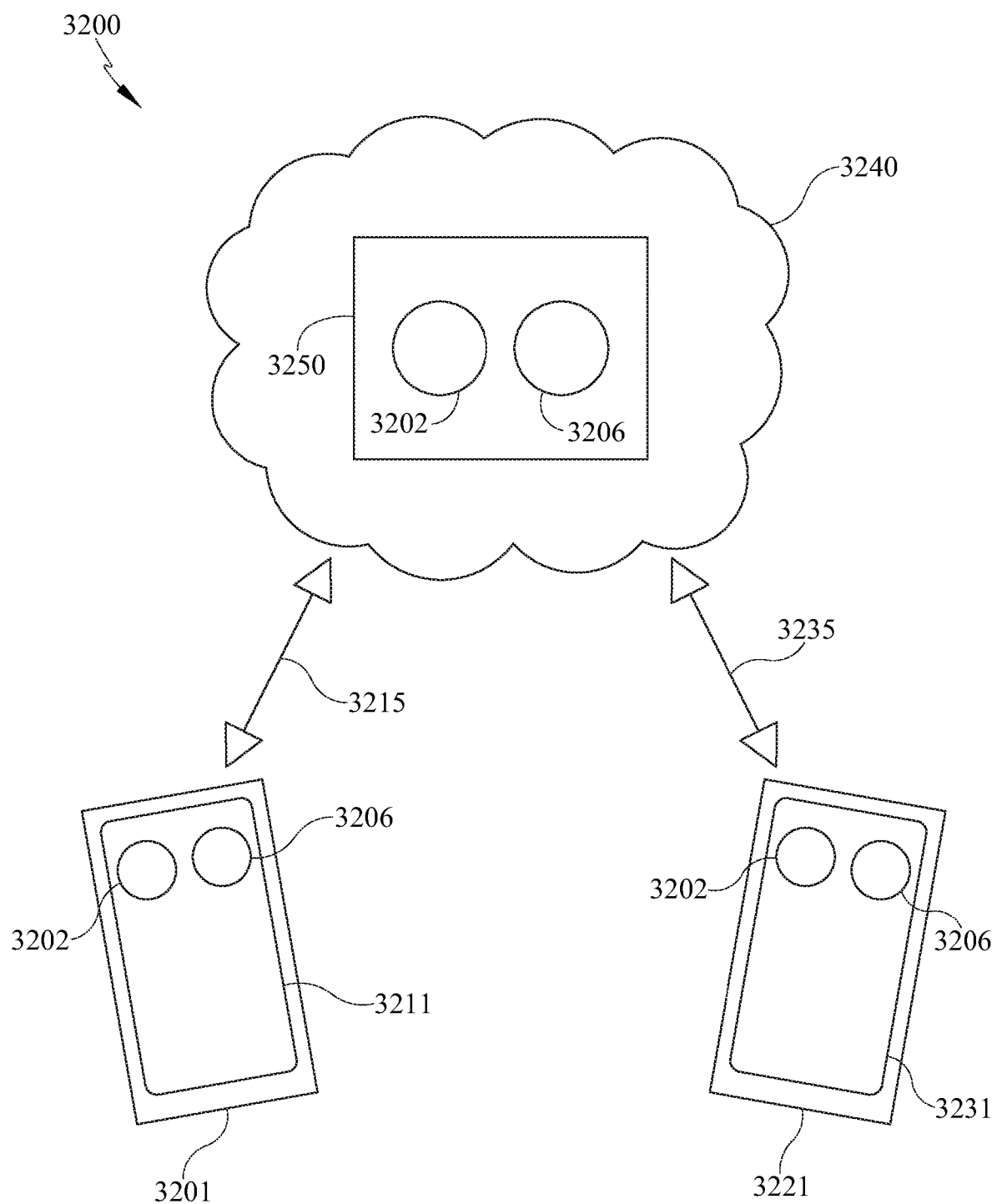
FIG. 32 depicts a networked system 3200, the icons 3202, 3206 of metaphors rendered on a display 3211 of a computing device 3201 which may be associated with metaphors in part or in whole residing on a computing device 3250 in the cloud 3240 and which may also be shared with another user.

In another embodiment depicted in FIG. 32, in a networked system 3200, the icons 3202, 3206 of metaphors rendered on a display 3211 of a computing device 3201 may be associated with metaphors in part or in whole residing on a computing device 3250 in the cloud 3240.

In a further embodiment, the cloud computing device 3250 may be a computer shared by a plurality of users 3201, 3221. In this example, a first icon 3202 of a metaphor may represent a universe of documents, files, applications, data, or combinations thereof of a first user 3201 and a second icon 3206 of a metaphor may represent a universe of documents, files, applications, data, or combinations thereof of a second user 3221. Through such a shared network both first and second users may access first and second icons to access the universes or metaphors of the other, and hence the documents, files, applications, data, or combinations thereof of each other. By clicking on the icon 3206 of the second user, the first user 3201 may enter the universe or metaphor of the second user 3221. Once inside that universe, the first user may pan through documents, files, applications, data or combinations thereof by panning the computing device through geospheric directions or by moving the computing device to a different geolocation, or combination thereof. It is thus seen that if the computing device of the user is networked, the user may also go to other people's cubicles and place a file or retrieve a file from there.

Figure 33:
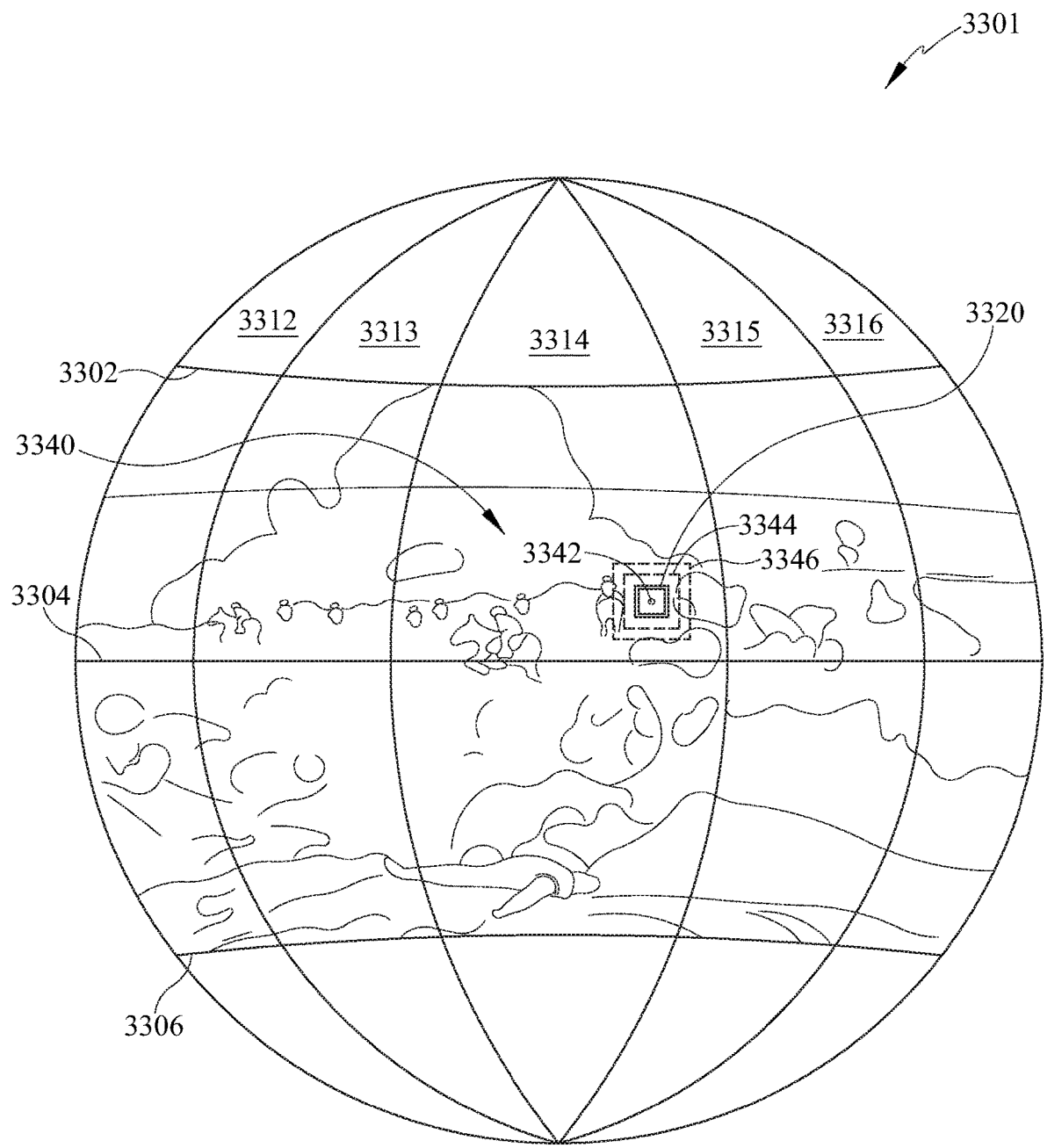
FIG. 33 depicts one section of a panorama of the Battle of Waterloo in a panorama at Waterloo, Belgium.

One skilled in the art will appreciate the myriad uses for this disclosure. As another example, art is sometimes depicted in panorama form about the inside of a building such that a visitor may stand in the center of the room and turn 360 degrees to observe the changing art in the panorama. The artwork depicting the Battle of Waterloo in a panorama at Waterloo, Belgium is one example of such art. FIG. 33 depicts one section of this panorama. The bubble is illustratively sliced latitudinally 3302, 3304, 3306 and longitudinally 3312, 3313, 3314, 3315, 3316 to form sectors. Only sector 3340 is numbered to illustrate this embodiment. Each section of the panorama covers an area made up of a plurality of points each defined by a geospheric direction. In this example, the bubble may be one universe organized by a metaphor on a metaphor application of this disclosure. By moving the computing device having the metaphor application of this disclosure, the user may pan across the panorama of the Battle of Waterloo. As the computing device pans the panorama, the user may see rendered on the display of the computing device different data, each associated with a different location on the surface of the sphere associated with a different geospheric direction associated.

In previous embodiments, it was explained that a document, file, application, data, or combination thereof may be associated with a point on the surface of the sphere. Where the association is of a document, file, application, it may be easy to call up the document, file, application and render it on the display of the computing device. Using the lock feature of this disclosure, the user may easily open a document, for example, and scroll through the document enabled by scrolling capability known in the prior art. Using the zoom feature of this disclosure, the user may enlarge or shrink a document in order to manipulate the document for the purpose sought to be served with this document.

In some cases though, such as with data, the association of a data with a location on a surface of a sphere organized by a metaphor of this disclosure may not provide the user with enough information to be useful. This is apparent in the panorama of FIG. 33 where a particular location on the sphere may only display a data point of the picture of the panorama. That data point may contain information about the qualities of a painting at that point such as color qualities such as hue, saturation, and brightness or texture. Such data may not without more be meaningful to the user.

The foregoing is illustrated in FIG. 33 by point 3342 on the panorama which contains the information on the qualities of the panorama picture previously explained at that point. FIG. 33 further shows at that location a presentation object 3320 which may contain a document, a file, an application, data, or combination thereof. By using the locking feature of this disclosure, the user may open a document, for example, in the presentation object and read more about what happened in the Battle of Waterloo at this point in the panorama. The presentation object may contain a video file that a user may activate and view to see a video on some aspect of the Battle of Waterloo relevant at this point, such as the life of the soldier who died at that place in the battle. Any of the activated objects may be zoomed in or out and scrolled. While only one presentation object 3320 is shown in FIG. 33, the panorama may be provided with a plurality of presentation objects across the surface of the sphere in order to allow a user to interact with documents, files, application, data, or combinations thereof. As another example, an application may allow for face time with a historian or tour guide or other person in real time or in a pre-recorded session. Application of the foregoing and other features of this disclosure enable the user to enjoy a richer experience when viewing the panorama.

In order to provide for a more meaningful presentation of the data at the location 3342 in the panorama, the metaphor of the metaphor application of this disclosure may further associate clusters of points on a surface, such as a sphere, with a single data point. For example, the cluster of points located inside area 3344 may be associated with location 3342 on the surface of the sphere. Alternatively, the cluster of points located inside area 3346 may be associated with location 3342 on the surface of the sphere. As yet another example, the cluster of point located inside sector 3340 of the surface of the sphere may be associated with location 3342 on the surface of the sphere. The number and arrangement of points located inside the cluster is a matter of design choice. When a user is using this clustering feature of this disclosure and in a mode of operation of a computing device operating the metaphor application of this disclosure in which he is scanning a panorama, for example, when the user points the computing device in the direction of location 3342, the user may see rendered on the display of the computing device the cluster of data points associated with location 3342. This may be either cluster 3344, 3346, or 3340, depending upon which cluster setting the metaphor is set to, the cluster setting defining the area of the cluster to be associated with a particular location on the surface of the sphere. With the cluster feature of this disclosure, a user may pan across the panorama and instead of seeing individual data points, the user may see clusters of data points that have been associated with that location of the sphere. The cluster feature may allow for more data to be rendered on the display so that the user will have more contextual information rendered on the display to process; thereby enriching the viewing experience of the user.

Figure 34:
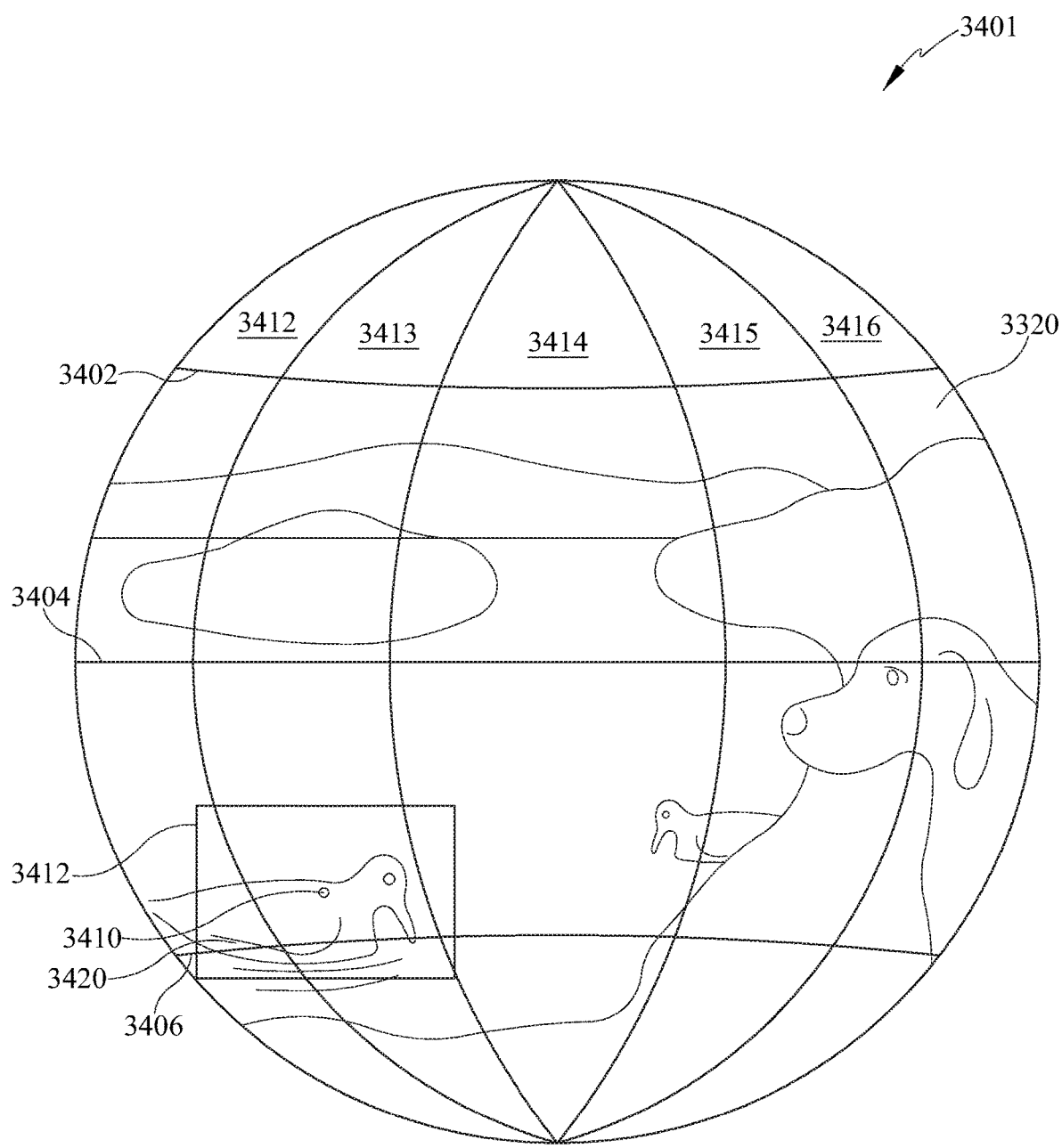
FIG. 34 depicts one section of a panorama of a hunting site in a gaming application according to this disclosure.

Another embodiment of this disclosure is a gaming application. FIG. 34 shows a bubble depicting imagery of a hunting site. Latitudinal 3402, 3404, 3406 and longitudinal 3412, 3413, 3414, 3415, 3416 slices are as described in FIG. 33 like latitudinal and longitudinal slices described in FIG. 33 with the numbering of the slices increased by 100. Also, as in FIG. 33, one or more sectors may be provided with documents, files, applications, data, or combinations thereof at one or more points to provide interactive information accessible by the gamer in the manner previously described.

Figure 35:
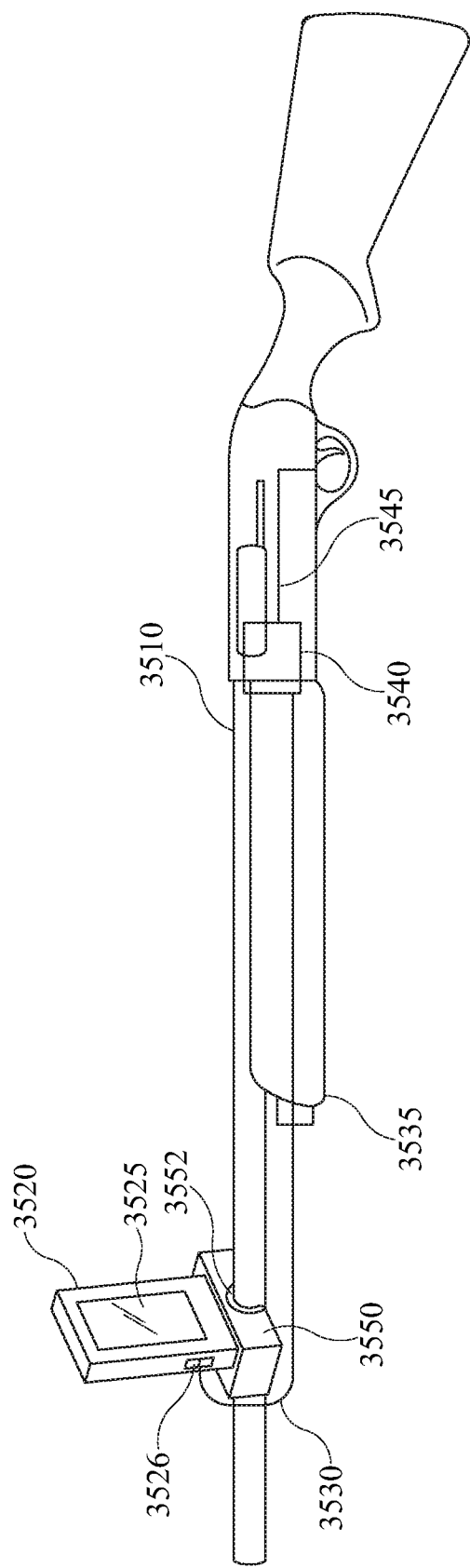
FIG. 35 depicts an assembly of gun with a computing device downloaded with a metaphor application for use in playing a hunting game.

In the game example of FIG. 34, a user may attach a plastic gun handle 3510 shown in FIG. 35 to his phone 3520 and use the display 3525 of the computing device as the scope of the gun. The computing device may include and run the metaphor application of this disclosure including a metaphor that organizes visuals of a hunting site in a manner similar to the depiction of the panorama in FIG. 33. In another embodiment, a gaming application may track the location and activity including shots fired and accuracy. The computing device 3520 may be received by a mount 3550 with a channel 3552 that may slip around the barrel to hold the computing device to the barrel in tight engagement. An electrical lead 3552 may connect on one end to an electrical input port 3526 of the computing device and on another end to an electrical switch 3540 which is also connected by an electrical lead 3545 to the trigger of the gun. The user may look through the display on his computing device to find his target. He may point the computing device in different geospheric directions with each direction displaying a different image from the spherical metaphor. For example, if the game is a hunting for ducks, the spherical metaphor may display a hunting ground with near a lake as shown in FIG. 34. Each slice of the surface of the spherical metaphor may display a different portion of that hunting sight when viewed from one point (e.g., the location of the computing device) in all directions of the sphere. For example, a north direction would display the hunting sight when the computing device is facing north; a south direction would display the hunting sight when the computing device is facing south; a 90 degrees angle in the north direction would display the hunting sight when the computing device is facing 90 degrees angle in the north direction; and so on. Thus, when the computing device with plastic gun handle is facing 90 degrees angle in the north direction, it would see the display that is associated with the spherical metaphor in the 90 degrees angle in the north direction.

Further the display that is associated with each section of the spherical metaphor may change as the user moves the computing device to a different geolocation. For example, a spherical metaphor in a first location may display a spherical picture of the hunting site associated with the first location and a second spherical metaphor in a second location may display a spherical picture of the hunting site associated with the second location. When the gamer moves from the first geolocation to the second geolocation, the spherical display depicted on the spherical metaphor may change. In addition, a spherical display in one geolocation may itself be changing over time on account of changes that may be made to the content of the visual data stream being projected. Hence, a gamer waiting in one geolocation over a period of time may see the geospherical image changing. For example, in one period of time, there may be no duck in the visual and in another a duck may be seen begin a flight. Alternatively, the gamer may move to other geolocations in search of a duck. When a duck is located, a gamer may zoom in on the duck using the zooming feature of this disclosure and fire by pulling a trigger that generates an electrical signal applied to the computing device and detected by the metaphor application or a gaming application cooperating therewith or other software cooperating therewith. The gaming application may detect if the gun shot struck the duck and award points to the gamer based on the accuracy of the gunshot. The gaming application may be bundled together with the metaphor application or be provided separately.

In this example, when the user enters the spherical metaphor with the duck and points in the geospheric direction in which the target is located, the user may aim and shoot. Instead of moving a mouse or joysticks and unnaturally aiming, the user would be able to literally "aim & shoot". Effectively, the user interface of this disclosure has configured the computing device to act as a mouse by geospheric directioning and geolocational positioning.

The metaphor application of this disclosure may be used with any number of games that may enable the user to have a richer experience from the organization of documents, files, applications, data and combinations in accordance with the metaphors of this disclosure.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of presenting an object on a display comprising the steps of:
providing a metaphor application for installation on a computing device, the metaphor application configured to organize at least one user interface based upon a metaphor, the metaphor organizing a data, a document, a file, an application, or any combination thereof based upon geospheric direction and geolocation;
associating a first data, a first document, a first file, a first application, or any combination thereof with a geospheric direction setting of the display associated with a first geolocation;
generating at the first geolocation a first presentation object for the first data, the first document, the first file, the first application, or any combination thereof, the first presentation object containing the first data, the first document, the first file, the first application, or any combination thereof, and the geospheric direction setting of the display associated with the first data, the first document, the first file, the first application, or any combination thereof at the first geolocation;
formatting the first presentation object into data blocks for rendering on the display of the computing device;
wherein the controller of the computing device is configured to render the formatted first presentation object on the display of the computing device;
wherein the metaphor application causing the first presentation object to be rendered on the display of the computing device when the display is associated with the geospheric direction and first geolocation associated with the first presentation object.

2. The method of claim 1 further comprising:
associating a second data, a second document, a second file, a second application, or any combination thereof with a geospheric direction setting of the display associated with a second geolocation;
generating at the second geolocation a second presentation object for the second document, the second file, the second application, or any combination thereof, the second presentation object containing the second document, the second file, the second application, or any combination thereof, and the geospheric direction setting of the display associated with the second document, the second file, the second application, or any combination thereof at the second geolocation;

formatting the second presentation object into data blocks for rendering on the display of the computing device;

wherein the computing device comprising a controller and a memory, the controller configured to render the formatted second presentation object on the display of the computing device;

wherein the metaphor application causing the second presentation object to be rendered on the display of the computing device when the display is associated with the second geospheric direction and geolocation associated with the second presentation object.

3. The method of claim 1 further comprising:

panning of the computing device at the first geolocation through geospheric directions causing the metaphor application at each geospheric direction of the computing device at the first geolocation to render on the display of the computing device the first data, the first document, first file, the first application, or any combination thereof associated with the geospheric direction of the computing device at the first geolocation.

4. The method of claim 1 further comprising:

locking of a rendering on the display of the computing device of the first data, the first document, the first file, the first application, or any combination thereof associated with the geospheric direction of the computing device at the first geolocation at the time of the lock causing the metaphor application to continue to render the first data, the first document, first file, the first application, or any combination thereof associated with the geospheric direction of the computing device at the first geolocation on the display of the computing device at the time of the lock regardless of the geospheric direction of the computing device.

5. The method of claim 4 further comprising:

zooming of a rendering on the display of the computing device of the first data, the first document, the first file, the first application, or any combination thereof associated with the geospheric direction of the computing device at the first geolocation at the time of the lock.

6. The method of claim 1 wherein the computing device of the metaphor application is a computing device in a cloud network of computing devices;

accessing the metaphor application on the cloud computing device by a networked computing device; and causing the presentation object of the accessed metaphor to be rendered on the display of the networked computing device accessing the accessed metaphor when the display of the networked computing device is associated with the geospheric direction and geolocation associated with the presentation object of the accessed metaphor.

7. The method of claim 1:

wherein the metaphor application for installation on a computing device comprising at least a first metaphor application and a second metaphor application;

wherein the computing device of either the first metaphor application, the second metaphor application, or both is a computing device in a cloud network of computing devices;

the method further comprising:

associating the first metaphor application with a first user;

associating the second metaphor application with a second user;

accessing either the first metaphor application, the second metaphor application, or both on the cloud computing device via a networked computing device of either or both the first user and the second user;

wherein the accessed first metaphor application, the accessed second metaphor application, or both residing on the cloud computing device causing the presentation object of the accessed metaphor application to be rendered on the display of the networked computing device accessing the accessed metaphor application when the display of the accessing networked computer is associated with the geospheric direction and geolocation associated with the presentation object of the accessed metaphor application.

8. The method of claim 1 further comprising:

associating at least one of the first data, the first document, the first file, the first application, or any combination thereof associated with a first cluster of geospheric directions at the first geolocation; and causing the presentation object of the at least one of the first data, the first document, the first file, the first application, or any combination thereof to be rendered on the display of the computing device when the display of the computing device is associated with the geospheric direction of the first cluster at the first geolocation.

9. The method of claim 2 wherein at least one of the first data, the first document, the first file, the first application, or any combination thereof and at least one of the second data, the second document, the second file, the second application, or any combination thereof are the same document, the same file, the same application, or any combination thereof.

10. The method of claim 1 further comprising:

changing over time the first data, the first document, the first file, the first application, or any combination thereof associated with a geospheric direction setting of the display associated with a first geolocation to a different data, a different document, a different file, a different application, or any combination.

11. The method of claim 1 further comprising:

organizing the first data, the first document, the first file, the first application, or any combination thereof on at least one point on a surface of a solid geometrical figure in three-dimensional Euclidean space associated with the geospheric direction setting of the computing device at the first location.

12. The method of claim 11 wherein the solid geometrical figure in three-dimensional Euclidean space is a sphere.

13. The method of claim 12 wherein the center of the sphere is defined by the geolocation of the computing device.

14. The method of claim 1 wherein the providing of the metaphor application on the computing device is a download selected from the group consisting of a user download and a factory download, or combination thereof.

15. A system for presenting an object, comprising: a computing device; one or more processors; and at least one memory coupled to the one or more processors, the at least one memory comprising computer-readable instructions for execution by the one or more processors to cause said one or more processors to perform operations comprising:

executing instructions of a metaphor application, the metaphor application configured to organize at least one user interface based upon a metaphor, the metaphor organizing a data, a document, a file, an application, data, or any combination thereof based on a geospheric direction and geolocation;

associating a first data, a first document, a first file, a first application, or any combination thereof with a geospheric direction setting of the display associated with a first geolocation;

associating a second data, a second document, a second file, a second application, or any combination thereof with a geospheric direction setting of the display associated with a second geolocation;

generating at the first geolocation a first presentation object for the first data, the first document, the first file, the first application, or any combination thereof, the first presentation object containing the first data, the first document, the first file, the first application, or any combination thereof, and the geospheric direction setting of the display associated with the first data, the first document, the first file, the first application, or any combination thereof at the first geolocation;

generating at the second geolocation a second presentation object for the second document, the second file, the second application, or any combination thereof, the second presentation object containing the second document, the second file, the second application, or any combination thereof, and the geospheric direction setting of the display associated with the second document, the second file, the second application, or any combination thereof at the second geolocation;

formatting the first presentation object and the second presentation object into data blocks for rendering on the display of the computing device;

wherein the computing device comprising a controller and a memory, the controller configured to render the formatted first presentation object and the formatted second presentation object on the display of the computing device;

wherein the metaphor application causing the first presentation object to be rendered on the display of the computing device when the display is associated with the geospheric direction and first geolocation associated with the first presentation object; and wherein the metaphor application causing the second presentation object to be rendered on the display of the computing device when the display is associated with the second geospheric direction and geolocation associated with the second presentation object.

16. The system of claim 15 wherein the computing device of the metaphor application is a computing device in a cloud network of computing devices and wherein the computer-readable instructions for execution by the one or more processors to cause said one or more processors to perform operations further comprising:
  accessing the metaphor application on the cloud computing device by a networked computing device; and
  causing the presentation object of the accessed metaphor to be rendered on the display of the networked computing device accessing the accessed metaphor when the display of the networked computing device is associated with the geospheric direction and geolocation associated with the presentation object of the accessed metaphor.

17. The system of claim 15 wherein said computer-readable instructions for execution by the one or more processors to cause said one or more processors to perform operations comprising further comprising:
  associating a third data, a third document, a third file, a third application, or any combination thereof with a geospheric direction setting of the display associated with a third geolocation;
  generating at the third geolocation a third presentation object for the third document, the third file, the third application, or any combination thereof, the third presentation object containing the third document, the third file, the third application, or any combination thereof, and the geospheric direction setting of the display associated with the third document, the third file, the second application, or any combination thereof at the third geolocation;
  formatting the third presentation object into data blocks for rendering on the display of the computing device;
  wherein the metaphor application causing the third presentation object to be rendered on the display of the computing device when the display is associated with the third geospheric direction and geolocation associated with the third presentation object.

18. The system of claim 15 wherein the computer-readable instructions for execution by the one or more processors to cause said one or more processors to perform operations comprising further comprising:
  panning of the computing device at the first geolocation through geospheric directions causing the metaphor application at each geospheric direction of the computing device at the first geolocation to render on the display of the computing device the first data, the first document, first file, the first application, or any combination thereof associated with the geospheric direction of the computing device at the first geolocation; and
  wherein panning of the computing device at the second geolocation through geospheric directions causing the metaphor application at each geospheric direction of the computing device at the second geolocation a rendering on the display of the computing device of the second data, the second document, second file, the second application, or any combination thereof associated with the geospheric direction of the computing device at the second geolocation.

19. The system of claim 15 wherein the computer-readable instructions for execution by the one or more processors to cause said one or more processors to perform operations comprising further comprising:
  locking of a rendering on the display of the computing device of the first data, the first document, the first file, the first application, or any combination thereof associated with the geospheric direction of the computing device at the first geolocation at the time of the lock causing the metaphor application to continue to render the first data, the first document, first file, the first application, or any combination thereof associated with the geospheric direction of the computing device at the first geolocation on the display of the computing device at the time of the lock regardless of the geospheric direction of the computing device; and
  locking of a rendering on the display of the computing device of the second data, the second document, the second file, the second application, or any combination thereof associated with the geospheric direction of the computing device at the second geolocation at the time of the lock causing the metaphor application to continue to render the second data, the second document, second file, the second application, or any combination thereof associated with the geospheric direction of the computing device at the second geolocation on the display of the computing device at the time of the lock regardless of the geospheric direction of the computing device.

20. The system of claim 19 wherein the computer-readable instructions for execution by the one or more processors to cause said one or more processors to perform operations further comprising:

zooming of a rendering on the display of the computing device of the first data, the first document, the first file, the first application, or any combination thereof associated with the geospheric direction of the computing device at the first geolocation at the time of the lock; and zooming of a rendering on the display of the computing device of the second data, the second document, the second file, the second application, or any combination thereof associated with the geospheric direction of the computing device at the second geolocation at the time of the lock.

* * * * *